(12) United States Patent
Miller

(10) Patent No.: US 11,814,565 B2
(45) Date of Patent: Nov. 14, 2023

(54) ELECTROTHERMIC COMPOSITIONS AND COMPOSITES

(71) Applicant: Intelli Particle Pty Ltd, Marrickville (AU)

(72) Inventor: Cole Miller, Marrickville (AU)

(73) Assignee: Intelli Particle Pty Ltd, Marrickville (AU)

( * ) Notice: Subject to any disclaimer, the term of this patent is extended or adjusted under 35 U.S.C. 154(b) by 639 days.

(21) Appl. No.: 16/649,394

(22) PCT Filed: Sep. 24, 2018

(86) PCT No.: PCT/AU2018/051046
§ 371 (c)(1),
(2) Date: Mar. 20, 2020

(87) PCT Pub. No.: WO2019/056074
PCT Pub. Date: Mar. 28, 2019

(65) Prior Publication Data
US 2020/0248059 A1     Aug. 6, 2020

(30) Foreign Application Priority Data

Sep. 22, 2017 (AU) ................................ 2017903861

(51) Int. Cl.
*C03C 4/14*     (2006.01)
*H01B 1/18*    (2006.01)
(Continued)

(52) U.S. Cl.
CPC .................. *C09K 5/14* (2013.01); *C03C 4/14* (2013.01); *C03C 8/04* (2013.01); *C03C 8/14* (2013.01);
(Continued)

(58) Field of Classification Search
CPC .... H01B 1/04; C09K 5/14; C03C 8/14; C03C 2204/00; C03C 4/14
See application file for complete search history.

(56) References Cited

U.S. PATENT DOCUMENTS

| | | |
|---|---|---|
| 3,492,197 A | 1/1970 | Olstowski |
| 3,923,697 A | 12/1975 | Ellis |
| 2016/0302260 A1* | 10/2016 | Miller ..................... H01B 1/18 |

FOREIGN PATENT DOCUMENTS

| | | |
|---|---|---|
| CN | 1123810 A | 6/1996 |
| JP | H09190873 A | 7/1997 |

(Continued)

OTHER PUBLICATIONS

International Search Report and Written Opinion in PCTIAU2018/051046, dated Dec. 17, 2018. 15 pages.
(Continued)

*Primary Examiner* — Khanh T Nguyen
(74) *Attorney, Agent, or Firm* — Meunier Carlin & Curfman LLC

(57) ABSTRACT

The present invention relates to electrothermic composite material comprising an electrothermic layer on a substrate, wherein the electrothermic layer comprises glass having a carbon component dispersed throughout, wherein the glass, the carbon component, and their relative concentrations are selected such that the electrothermic layer resists delamination from the substrate over repeated electrical heating and cooling cycles. Methods and uses of the composite materials are also described.

20 Claims, 8 Drawing Sheets

(51) Int. Cl.
*C09K 5/14* (2006.01)
*C03C 8/04* (2006.01)
*C03C 8/14* (2006.01)
*C03C 17/00* (2006.01)
*C03C 17/04* (2006.01)

(52) U.S. Cl.
CPC ............ *C03C 17/008* (2013.01); *C03C 17/04* (2013.01); *H01B 1/18* (2013.01); *C03C 2204/00* (2013.01); *C03C 2205/00* (2013.01)

(56) References Cited

FOREIGN PATENT DOCUMENTS

| WO | 9931700 A1 | 6/1999 | |
|---|---|---|---|
| WO | 2014205498 A1 | 12/2014 | |
| WO | WO 2014205498 A1 * | 12/2014 | ............... H01B 1/04 |

OTHER PUBLICATIONS

Extended European Search Report in EP18859257.0, dated May 12, 2021 (9 pages).

* cited by examiner

ELECTROTHERMIC COMPOSITIONS AND COMPOSITES

CROSS REFERENCE TO RELATED APPLICATIONS

This application is a United States National Phase Patent Application filed under 35 U.S.C. § 371 of International Patent Application Number PCT/AU2018/051046, filed on Sep. 24, 2018, which claims the benefit of priority to AU Patent Application No. 2017903861, filed on Sep. 22, 2017, both of which are incorporated by reference herein.

FIELD OF THE INVENTION

The present invention relates to electrically conductive materials comprising non-metallic conducting components which are useful in, for example, coating applications. More particularly, the invention relates to compositions or materials formed from the compositions that provide electrothermic properties, whereby the composition or material generates heat when an electrical potential is applied across the composition/material/composite, and which are useful in heating applications such as heaters and cooking surfaces. However, it will be appreciated that the invention is not limited to this particular field of use.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Thermally (heat) resistant glass is well known in the art, and is typically based on soda lime or silica. Such glasses have a very low thermal expansion coefficient and a high melting point and are designed to resist thermal shock. This type of glass is generally used in kitchens and in industrial applications, and has been tested to withstand temperature changes of up to 1000° C. A commercially-available thermally-resistant glass is SCHOTT CERAN®, which is widely used in cooktop panels. CERAN® is made of glass-ceramic, and has excellent heat resistance and stability, and can for example withstand sudden temperature shocks in the range of up to 750° C.

The principal difference between ceramic and induction cooktops is how they create heat. Ceramic cooktops contain coiled metal elements under the tempered ceramic glass. These elements are electronically heated to the desired temperature. This coil then heats the ceramic surface and, consequently, warms the pan. Induction cooktops feature high-frequency electromagnets instead of heated coils. These magnets generate a magnetic field that heats the pan and not the cooktop's surface. Induction cooktops are far more efficient than ceramic cooktops as they only heat the pan and not the surrounding air or the cooktop's surface. Both these solutions, however, are less than ideal as, in the case of a glass-ceramic cooktop, a coiled metal element is required and the efficiency of heat transfer is not ideal, and in the case of an induction cooktop the induction heating elements are relatively expensive, and not all types of pans can be inductively heated. Furthermore, in the case of Ceran® glass in particular, the coiled metal element must be placed a minimum of 6 mm away from the glass, which further imposes restrictions on the physical placement of the element and cooktop.

To date, attempts have been made to fabricate glass panels with metal and/or metal oxide impregnated conductive coatings. One prior art solution involves doping the ceramic glass substrate directly with electrically-conductive metal particles such that the doped substrate acts as a resistor. For example, some prior art solutions utilise a variety of metal salts to dope the glass substrate. The application of current across that doped glass substrate can cause the substrate to heat up and act as a heating element. However, in some circumstances electrical arcing across the substrate and the metallic cookware was found to occur due to the presence of the doping metals, which is a significant safety issue.

Electrically conductive glass sheets are known in the art, for example U.S. Pat. No. 4,778,732. However, the electrically conductive film requires a protective coating and cannot generate sufficient thermal energy in order to, for example, boil water. The electrically conductive film is based on transparent conducting oxides (TCO), such as Indium-Tin-Oxide (ITO). ITO, however, is expensive to produce and apply to a substrate, and is toxic.

Alternative materials such as carbon nanotubes, graphene, and conductive polymers have been investigated, as are nanowires or meshes of metals such as copper, silver and gold. However, these materials are generally expensive to produce, particularly in commercial quantities, and/or do not have adequate heat performance characteristics.

It is an object of the invention in a preferred form to provide an alternative to current thermally-resistant glass (or glass-ceramic) panels, such as cooktops, that has the advantages of the thermally-resistant glass (or glass-ceramic) and yet avoids the disadvantages of requiring an induction apparatus or a metal heating element to heat the glass (either positioned within or on the underside of the glass). It is an object of the invention in another preferred form to provide an alternative to current metallic panels, such as BBQ hotplates, that has the advantages of the metal and yet avoids the disadvantages of requiring a gas or electric heating element to heat the metal (either positioned within or on the underside of the metal). It is a further preferred object of the invention to provide a heating substrate which is aesthetically pleasing and is electrically safe.

A preferred object of the invention in certain embodiments where a coating is applied to a substrate such as glass or metal is that the coating resists delamination from the substrate over a wide range of service temperatures, and/or over repeated cycles of electrical heating and cooling.

In addition to the above-mentioned general problems associated with prior art coatings, performance issues make large scale commercial use not practical. For example, heat output can be difficult to control, and prior art electrothermic coatings can show great variation in their day-to-day electrical conductivity and heat generation. It is a further preferred form of the invention to ameliorate one or more of these problems.

It would be desirable to provide alternative electrothermic compositions that are one or more of highly conductive, self-regulating, do not "run away", do not deteriorate over long periods of time, and can be formed into useful products.

It is an object of the present invention to overcome or ameliorate at least one of the disadvantages of the prior art, or to provide a useful alternative.

SUMMARY OF THE INVENTION

According to a first aspect the present invention provides an electrothermic composite material comprising an electrothermic layer on a substrate, wherein the electrothermic layer comprises glass having a carbon component dispersed throughout, wherein the glass, the carbon component, and their relative concentrations are selected such that the electrothermic layer resists delamination from the substrate over repeated electrical heating and cooling cycles.

According to a second aspect the present invention provides an electrothermic composite material comprising an electrothermic glass layer on a substrate, wherein the electrothermic layer comprises at least a percolation-threshold concentration of a carbon component in the form of discrete particles dispersed throughout the layer, and such that the resistance of the coating is less than 400Ω at 25° C.

In one embodiment of the first or second aspects, the carbon component is a graphite. In another embodiment of the first or second aspects, the carbon component is a mixture of a first graphite and a second graphite. In another embodiment of the first or second aspects, the carbon component is a mixture of a graphite and a carbon black. In a further embodiment of the first or second aspects, the carbon component is a mixture of a first carbon black and a second carbon black. In another embodiment of the first or second aspects, the carbon component is a graphite, a mixture of a first graphite and a second graphite, a mixture of a graphite and a carbon black or a mixture of a first carbon black and a second carbon black. In yet another embodiment of the first or second aspects, the carbon component comprises a graphite, e.g., is a mixture of two or more graphites or a mixture of one or more graphites and one or more carbon blacks.

In one embodiment the glass is formed by firing a mixture of the carbon component in a glass frit.

In one embodiment the glass comprises, on a solids basis, 1-65 wt % of a carbon component. In another embodiment the glass comprises, on a solids basis, 3-45 wt % of a carbon component. In a further embodiment the glass comprises, on a solids basis, 5-30 wt % of a carbon component.

In one embodiment the glass comprises, on a solids basis, 35-99 wt % of a glass frit. In another embodiment the glass comprises, on a solids basis, 55-97% of a glass frit. In a further embodiment the glass comprises, on a solids basis, 70-95% of a glass frit.

In one embodiment the carbon component is selected from the group consisting of: a single graphite, a mixture of two or more graphites, a single carbon black, a mixture of two or more carbon blacks, and a mixture of one or more graphites with one or more carbon blacks. In one embodiment the carbon component is a graphite.

In one embodiment the carbon component is a mixture of a graphite and a carbon black. In a further embodiment the carbon component is a mixture of a graphite and a carbon black in a relative proportion of graphite:carbon black of between 7:1 and 5:1.

In one embodiment the graphite has a nitrogen surface area (NSA) of between 5 and 300 m²/g. In another embodiment the graphite has a nitrogen surface area (NSA) of between 5 and 100 m²/g. In a further embodiment the graphite has a nitrogen surface area (NSA) of between 5 and 50 m²/g.

In one embodiment the graphite has a particle size of between 1 and 20 µm.

In one embodiment the graphite has a CTE of between 5 and 7 ppm/K between 25 and 350° C.

In one embodiment the graphite is selected from the group consisting of: natural graphite, synthetic graphite, amorphous graphite, calcined petroleum coke, crystalline flake graphite, natural flake graphite, surface enhanced flake graphite, expandable graphite, purified flake graphite, purified crystalline flake graphite, purified petroleum coke, purified synthetic graphite, purified-vein graphite, synthetic graphite, primary artificial graphite, secondary artificial graphite, spherical natural graphite, and vein graphite.

In one embodiment the graphite is a surface enhanced flake graphite.

In one embodiment the graphite has a crystallinity of at least 80%.

In one embodiment the graphite is present in the glass at a concentration on a solids basis of between 10 and 30%.

In one embodiment the carbon component comprises one or more carbon blacks. In one embodiment the carbon blacks have a nitrogen surface area (NSA) of between 5 and 300 m²/g. In one embodiment the carbon blacks have a nitrogen surface area (NSA) of between 5 and 100 m²/g.

In one embodiment at least one of the carbon blacks has a particle size of between 1 and 100 nm.

In one embodiment the or each carbon black is selected from the group consisting of: conventional thermal blacks, furnace blacks, lamp blacks, channel blacks, highly purified carbons, surface-modified carbon blacks, surface functionalised carbon blacks, heat-treated carbons, and nano carbons.

In one embodiment the carbon black is present in the glass at a concentration on a solids basis of between 1 and 20%.

In one embodiment at least one of the carbon blacks has a surface area between 1 and 100 times greater than at least one other carbon black.

In one embodiment the glass frit is a zinc borosilicate glass frit.

In one embodiment the glass frit has a firing temperature in air of between 650 and 720° C.

In one embodiment the glass frit has a CTE of between 7 and 12 ppm/K at 25° C.

In one embodiment the glass frit is devoid of titanium dioxide pigment.

In one embodiment the glass frit is a mixture of two or more glass frits having different firing temperatures.

In one embodiment the glass coating is devoid of elemental metal particles.

In one embodiment the substrate comprises a layer of glass or glass-ceramic. In one embodiment the substrate is a sheet of glass or glass-ceramic.

In one embodiment the glass or glass-ceramic is a low thermal expansion glass or glass-ceramic having a CTE of 0±1 ppm/K between 20 and 400° C.

In one embodiment the glass or glass-ceramic is high temperature fused-quartz based glass or glass-ceramic.

In one embodiment the substrate comprises a layer of metal or alloy lowermost and a layer of insulating glass uppermost with respect to the glass coating. In this embodiment, the insulating glass is sandwiched between the layer of metal or alloy and the glass coating of the invention. In one embodiment, the substrate comprises one or more intermediate layers of insulating glass between the layer of metal or alloy and the uppermost layer of insulating glass. In one embodiment the metal or alloy is selected from the group consisting of: stainless steel, steel, bronze, brass and copper. In one embodiment the alloy is steel or stainless steel.

In one embodiment the substrate comprises a layer of low thermal expansion glass or glass-ceramic having a CTE of 0±1 ppm/K between 20 and 400° C. lowermost and a layer of insulating glass uppermost with respect to the glass coating.

In one embodiment the insulating glass is made from a zinc borosilicate glass frit.

In one embodiment the glass coating has a coefficient of thermal expansion (CTE) that is within 10 ppm/K of the CTE of the substrate at 25° C.

In one embodiment the glass coating has a coefficient of thermal expansion (CTE) that is within 10 ppm/K of the CTE of the substrate at 400° C. In one embodiment the glass coating has a CTE of between 7 and 12 ppm/K at 25° C. In one embodiment the glass coating has a CTE at 25° C. that is less than the CTE of the glass frit at 25° C.

In one embodiment the glass coating has a thermal coefficient of resistance (TCR) of zero between 25 and 200° C.

In one embodiment the repeated electrical heating and cooling cycles comprises at least 5 cycles heating from 25 to 200° C. In one embodiment the repeated electrical heating and cooling cycles comprises between 5 and 100, 200, 300, 400, 500, 600, 700, or 1000 cycles heating from 25 to 200° C., or from 25 to 350° C.

In one embodiment the glass coating has a heat output after 10 heating/cooling cycles that is within 5% of the heat output of the coating after 1 heating/cooling cycle.

In one embodiment the glass coating adheres to the substrate and maintains its structural integrity when heated 6 times from 25 to 200° C.

In one embodiment the glass coating adheres to the substrate without cracking or delaminating when heated 6 times from 25 to 200° C.

In one embodiment the glass coating has a resistance at 25° C. of less than 400Ω. In one embodiment the glass coating has a resistance at 25° C. of less than 100Ω.

In one embodiment the glass coating has a thickness of between 1 and 200 μm. In one embodiment the glass coating has a thickness of between 20 and 2000 μm.

According to a third aspect the present invention provides an electrothermic composite material comprising an electrothermic layer on a low thermal expansion glass/glass-ceramic substrate, wherein the electrothermic layer comprises glass having a carbon component dispersed throughout, wherein the glass, the carbon component, and their relative concentrations are selected such that the electrothermic layer resists delamination from the low thermal expansion glass/glass-ceramic substrate over repeated electrical heating and cooling cycles. In one embodiment the glass coating comprising, on a solids basis, 1-65 wt % of a carbon component and 35-99 wt % of a glass frit.

According to a fourth aspect the present invention provides an electrothermic heating device, comprising, on a solids basis, 1-65 wt % of a carbon component and 35-99 wt % of a glass frit.

According to a fifth aspect the present invention provides use of a composition according to the first or second aspects to make an electrothermic glass coating.

Use of a composition according to the first or second aspects in an electrothermic composite material.

According to a sixth aspect the present invention provides a method for making a composite material, the method comprising the steps of:
  combining a carbon component and a glass frit to produce a glass coating composition;
  applying the glass coating composition to a substrate; and
  firing the glass coating composition to produce an electrothermic glass coating on the substrate,
    wherein the glass frit, the carbon component, and their relative concentrations are selected such that the electrothermic glass coating resists delamination from the substrate over repeated electrical heating and cooling cycles.

According to a seventh aspect the present invention provides a method of preparing an electrothermic composite material comprising the steps of:
  providing a base layer;
  applying an insulating glass composition to the base layer form a coating, film or layer thereon, wherein the insulating glass composition comprises a glass frit and is devoid of a carbon component;
  applying suitable firing conditions to substantially melt the insulating glass composition to form an insulating glass layer, thereby forming a two-layered substrate;
  combining a glass frit and a carbon component;
  applying the resultant mixture to the two-layered substrate to form a coating, film or layer thereon; and
  applying suitable firing conditions to substantially melt the glass coating composition to the glass layer to form a glass coating.

In one embodiment the method comprises combining, on a solids basis, 1-65 wt % of a carbon component and 35-99 wt % of a glass frit to produce the glass coating composition.

In one embodiment bus-bars are coated or applied to mutually opposed sides or edges of the substrate, such that the glass coating is applied to the substrate and into electrical communication with the bus-bars.

In one embodiment the multiple layers of glass coating are applied to the substrate, either side-by-side and/or in a stacked arrangement.

According to an eighth aspect the present invention provides a composite material made by the method according to the seventh aspect.

According to a ninth aspect the present invention provides a method for generating heat, the method comprising the steps of:
  (a) providing a composite material according to any one of the first or second aspects;
  (b) placing electrodes in electrical communication with the glass coating;
  (c) connecting the electrodes to a source of electricity; and
  (d) energising the source of electricity,
  thereby generating heat from the glass coating.

According to a tenth aspect the present invention provides use of the composite material of any one of the first or second aspects as a heating element.

FIGURES

Figure 10:
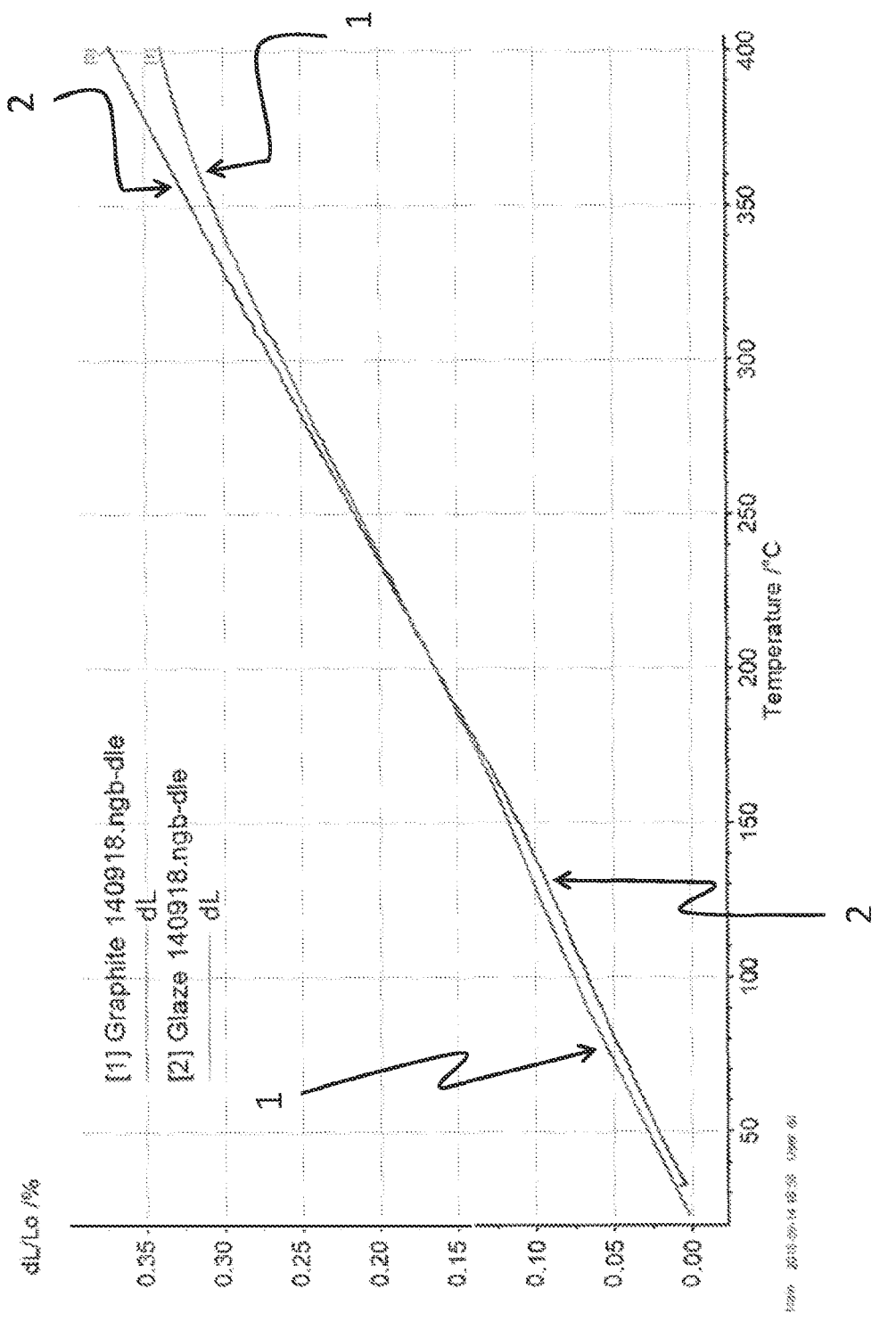

FIG. 10 shows the thermal expansion characteristics of a glass frit glaze (Line 2; Ferro® SGF WHITE INT 19 4011 AL-6476 per Table 9) and a coating of the invention (Line 1; per Example 1A) as measured on a Netzch DIL 402 dilatometer (25-400° C., ramp rate 5.0° C./min, air atmosphere, sample lengths ~23 mm). The data show that the glass frit has a CTE of about 9.8 ppm/K between 25 and 400° C., and that a composite of the same glass frit and graphite has a lower CTE of about 8.7 ppm/K between 25 and 400° C.

DEFINITIONS

In describing and claiming the present invention, the following terminology will be used in accordance with the definitions set out below. It is also to be understood that the terminology used herein is for the purpose of describing particular embodiments of the invention only and is not intended to be limiting. Unless defined otherwise, all technical and scientific terms used herein have the same meaning as commonly understood by one having ordinary skill in the art to which the invention pertains.

Unless the context clearly requires otherwise, throughout the description and the claims, the words 'comprise', 'comprising', and the like are to be construed in an inclusive sense as opposed to an exclusive or exhaustive sense; that is to say, in the sense of 'including, but not limited to'.

To provide a more concise description, some of the quantitative expressions given herein are not qualified with the term 'about'. It is understood that whether the term 'about' is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value. In what follows, or where otherwise indicated, '%' will mean 'weight %', 'ratio' will mean 'weight ratio' and 'parts' will mean 'weight parts'. The examples are not intended to limit the scope of the invention.

The recitation of a numerical range using endpoints includes all numbers subsumed within that range (e.g., 1 to 5 includes 1, 1.5, 2, 2.75, 3, 3.80, 4, 5, etc.).

The terms 'preferred' and 'preferably' refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "coating of the invention" and related terms such as "glass coating", "electrothermic layer" and "electrothermic glass layer" as used herein will be understood to refer to a glass layer produced by firing a glass frit having one or more carbon components dispersed therein. For example, a glass coating of the invention may comprise on a solids basis: 1-65 wt % of a carbon component and 35-99 wt % of a glass frit. The carbon component may be a single graphite component or a mixture of two or more graphite components, a mixture of a graphite and carbon black component, a single carbon black component, or a mixture of two or more carbon black components. The glass coating is applied to a substrate as a frit/carbon mixture (optionally with other components such as solvents, viscosity modifiers, vehicles, etc.) and is fired to produce the glass coating. Therefore, for the avoidance of doubt, the term "glass frit" refers to the pre-fired glass matrix and the term "glass coating" refers to a fused or fired glass coating, i.e., the post-fired product comprising a carbon component. Unless the context indicates otherwise, the term "glass coating composition" refers to the mixture of glass frit and carbon component (and optionally other components such as viscosity modifiers, etc) prior to firing.

The term "composite of the invention" and related terms will be understood to refer to composite products comprising a substrate (which can itself comprise one or more layers) and a coating of the invention. Composites of the invention may optionally also include one or more overcoat layer(s) and/or plate(s).

The term "glass frit" and related terms such as "frit" used herein refer to preparations containing a powdered or finely ground glass. A glass frit is usually a paste containing glass powder, organic binder, inorganic fillers and solvent(s). Persons of skill in the art will understand that alternative terms such as glass paste, glass ink, glass powder, glass glaze, vitreous enamel, vitreous glaze, glossy glaze, enamel glass frit, and the like may also be used to describe glass frits or coatings produced from glass frits.

For the avoidance of doubt, the term "carbon component" refers to graphite(s) or carbon black(s), or mixture(s) of the two.

The term "delaminating" and related terms "delaminate", etc as used herein refer to a characteristic whereby layers of a composite—in this case, an electrothermic glass coating on a substrate—separate or fracture partially or fully at or in the plane where the layers meet.

The term "maintaining structural integrity" as used herein refers to the coating of the invention retaining functionality as an electrothermic coating (be that by maintaining electrical conductivity and/or thermal conductivity and/or heat capacity and/or by maintaining its macroscopic appearance) and being free from macroscopic signs of mechanical deformity such as peeling, cracking, and crumbling. In some instances, such as when the performance of the electrothermic coating is negatively affected, the term may additionally refer to the coating being free from microscopic deformities, such as microscopic cracks.

DETAILED DESCRIPTION

In its broadest aspect, the present invention provides a composite material comprising an electrothermic glass coating on a substrate wherein the electrothermic layer comprises glass having a carbon component dispersed throughout, wherein the glass, the carbon component, and their relative concentrations are selected such that the electrothermic layer resists delamination from the substrate over repeated electrical heating and cooling cycles. The coating and substrate may have substantially equivalent coefficients of thermal expansion (CTEs). The coating may have a TCR of zero.

It will be appreciated that the present invention is a significant advance over the prior art, in that the glass coating is electrothermic and remains bonded to a substrate during service (repeated electrical heating and cooling cycles) and does not delaminate. This combination of properties has not been suggested in the prior art or delivered by prior art solutions. A further significant advantage is that the glass composite itself acts as a heating element, and no separate induction apparatus is required, or no separate electrical heating element is required to generate heat. This represents a significant cost saving and therefore a significant advance over commercially-available cooktop devices. Additionally, a further advantage is that the glass coating is aesthetically pleasing. Additionally, a further advantage of the coating of the invention is that the possibility of electrocution by contact with the glass coating is reduced or eliminated entirely, and therefore the composite of the invention is safe.

Glass Coating and Glass Coating Compositions

The present invention relates to a carbon component being blended with vitreous enamel materials or glass frits to form pastes which then are applied to (e.g. coated onto) substrates and fired to form a non-metallic electrical element in the form of an electrothermic glass coating. The present invention further provides a means by which to allow glass coatings to be applied indirectly to positive thermal expansion materials such as metals so as to reduce the likelihood of delamination of the glass coating, and in some embodiments, prevent delamination of the glass coating during service (repeated electrical heating and cooling cycles). The invention is formulated such that the carbon component does not burn out of the glass layer.

The glass coatings of the invention are electrically conductive and exhibit electrothermic properties when activated. Activation may be by way of applying alternating current (AC) or direct current (DC) either directly to the coating or through electrodes in electrical communication with the coating. Activation may also be by way of microwave radiation (e.g., 900 MHz-2.4 GHz) of the coatings, or by way of induction heating of the coatings (e.g., though use of induction coils, solenoids, magnets, or the like).

Carbon Component

The carbon component in the glass coating described herein may be a graphite, or it may comprise a mixture of two different graphites, or a mixture of a carbon black and a graphite, or a mixture of two different carbon blacks, as described further below.

For example, the carbon component may be a mixture of one carbon black and one graphite. Alternatively, the carbon component may be a mixture of one carbon black and two or more different graphites. Alternatively, the carbon component may be a mixture of two or more different carbon blacks and one graphite. Alternatively, the carbon component may be a mixture of two or more different carbon blacks and two or more different graphites. Accordingly, the carbon component may comprise or consist of one, or two or more different, graphites, optionally in combination with one, or two or more different, carbon blacks, or may comprise or consist of two or more different carbon blacks.

The nature of the carbon component and quantity thereof in the coating affects the properties of the coating, in particular the thermal, chemical, and physical properties of the coating. For example, one or more of the carbon component loading, carbon component surface area, and carbon component particle size may exert a significant effect on the glass coating. Without wishing to be bound by theory, the inclusion of a carbon component in a glass frit may make the glass coating of the invention sufficiently compliant to accommodate mechanical stresses generated during use (heating and cooling cycles). The compliance may comprise greater strain properties to accommodate interfacial stresses between the glass coating and the substrate, such that the glass coating can surprisingly be bonded to a variety of different substrates having different thermal expansion characteristics without delaminating or cracking. In other words, the graphite-modified glass frit coating has a greater toughness than the unmodified glass frit. Further, again without wishing to be bound by theory, the inclusion of a carbon component in a glass frit appears to cause a chemical reaction in the glass frit during firing such that functional groups in the glass frit are reduced at the interface between the glass coating and the substrate, resulting in the glass coating having a more metallic behaviour at the interface. Without wishing to be bound by theory, the addition of a carbon component in the glass frit may provide improved covalent bonding to the substrate, or improved ionic bonding, or hydrogen bonding, depending on the substrate.

The surface area of the carbon component generally determines the ease at which it can be incorporated into the glass frit prior to firing, with lower surface area carbon components being generally easier to incorporate into glass frits, including being easier to incorporate at higher loadings, than higher surface area carbon components. However, higher surface area carbon components tend to exhibit better conductivities than lower surface area carbon components, hence conductivity of the glass coating may be improved by increasing the loading of higher surface area carbon components. Without wishing to be bound by any theory, the addition of a carbon component in the glass frit may alter the thermal characteristics of the glass coating such that the thermal characteristics are similar to the substrate to which it is applied, and may have similar coefficients of expansion and contraction, and may affect any thermal hysteresis. The thermal, chemical, and physical properties of the coating can be "tuned" to suit the properties of the substrate to which it is applied. Without wishing to be bound by theory, it is contemplated that a sufficient concentration of carbon/graphite is included to achieve the percolation threshold in order to provide electrical conductivity through the glass coating, and which also surprisingly affects one or more of the characteristics mentioned above (thermal, chemical, and physical properties) which enables the glass coating to adhere to the substrate and simultaneously resist delamination over repeated electrical heating and cooling cycles.

A principal of general application disclosed herein is the use of a sufficient quantity of carbon/graphite in a glass frit/glaze to obtain electrothermic properties and to simultaneously obtain bonding of the glass layer to a variety of substrates, and which resists delamination after repeated electrical heating and cooling cycles. Without wishing to be bound by any theory, the inventor contemplates that the carbon/graphite particles are substantially sealed or encapsulated by the glass frit melting around the particles during the melting phase of the curing cycle, which may prevent them from being oxidised during use, leading to a robust electrothermic coating. Without wishing to be bound by any theory, it is contemplated that the graphite causes the frit to be more wettable on the substrate, contributing to an improved bond between the glass coating and the substrate relative to bonding of the frit alone.

Where the carbon component comprises a mixture of two or more different graphites (optionally further in combination with one or more carbon blacks), the graphites may be present at any suitable ratio, for example, a first and second graphite may be present at a ratio of 1:100, 10:90, 20:80, 30:70, 40:60, 50:50, 60:40, 70:30, 80:20, 90:10 or 100:1.

Where the carbon component comprises a mixture of two or more different carbon blacks in combination, the carbon blacks may be present at any suitable ratio, for example, a first and second carbon black may be present at a ratio of 1:100, 10:90, 20:80, 30:70, 40:60, 50:50, 60:40, 70:30, 80:20, 90:10 or 100:1.

Where the carbon component is a mixture of one or more carbon blacks and one or more graphites, the carbon black: graphite ratio may be between 10:1 and 1:10, or between 1:2 and 1:5, or between 1:4 and 1:8, or between 1:5 and 1:10, or between 2:1 and 5:1, or between 4:1 and 8:1, or between 5:1 and 10:1, or 10:1, 9:1, 8:1, 7:1, 6:1, 5:1, 4:1, 3:1, 2:1, 1:1, 1:2, 1:3, 1:4, 1:5, 1:6, 1:7, 1:8, 1:9 or 1:10. For example, the carbon black:graphite ratio in the glass coating may be between about 1:5 to 1:7, e.g., 1:6.

It has been discovered that use of higher structured (i.e., smaller particle size) carbon blacks enables higher ratios of graphite to be used in the formulation, such as 1:3, 1:4, 1:5, 1:6, 1:7, 1:8, 1:9, or 1:10. This enables higher temperatures to be achieved by the electrothermic coatings.

The total amount of the carbon component incorporated in the glass frit is between 1 and 65 wt %, and preferably between 4 and 55 wt %. For example, the total amount of carbon component may be between 2 and 45, or between 3 and 45, or between 5 and 10, or between 10 and 15, or between 15 and 20, or between 20 and 25, or between 15 and 30, or between 10 and 20, or between 20 and 30, or between 25 and 35, or between 25 and 40, or between 30 and 45, or between 4 and 30, or between 20 and 50, or between 30 and 60 wt %, e.g., at a concentration of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 50, 55, 60, or 65 wt %. The total carbon component may be the amount of graphite (where the only carbon component is one or more graphites). The total carbon component may be the amount of carbon black (where the only carbon component is one or more carbon blacks). The total carbon component may be the amount of carbon black and graphite (where the carbon component is one or more carbon blacks and one or more graphites). Carbon component concentrations of below 1% generally do not provide adequate conductivity to the coatings of the invention.

Graphite

The nature and concentration of the graphite component influences the current loading of the glass coating of the invention, as well as influencing the CTE of the resultant glass coating. In particular, the graphite component may be utilised to produce a glass frit-graphite composite having a lower CTE than the glass frit alone (without graphite), such that the CTE of the glass coating containing graphite is closer in value to the CTE of a substrate, e.g., low thermal expansion glass. Without wishing to be bound by theory, it is understood that the nature and concentration of the graphite contributes to the flexural strength of the glass coating by rendering the glass coating sufficiently compliant to accommodate interfacial stresses between the coating and the substrate, especially those generated upon heating and cooling of the composite. The graphite may also act to chemically reduce the frit in part (e.g., by removing oxygen from the siloxane groups during firing) such that the frit exhibits greater wettability at the interface with the substrate.

Graphite in the glass coating of the invention may have an average particle size in the range of between about 10 nm to 350 μm, e.g., of 10 nm to 1 μm, or of 1 μm to 65 μm, or of 100 nm to 10 μm. For example, nanographites having an average particle size of between about 10 nm and 1000 nm may be used, e.g., nanographites having an average particle size of between 10 nm and 100 nm, or between 50 nm and 250 nm, or between 200 and 500 nm, or between 500 and 1000 nm, or between 400 and 750 nm, e.g., of 10 nm, 50 nm, 100 nm, 500 nm or 1000 nm may be used. Graphites having an average particle size in the range of between about 1 μm to 350 μm may also be used, e.g., graphites having an average particle size of from 1 μm to 45 μm, or from 40 μm to 60 μm, or from 20 μm to 40 μm, or from 30 μm to 50 μm, or from 40 μm to 50 μm, or from 40 μm to 60 μm, or from 50 μm to 100 μm, or from 100 μm to 250 μm, or from 200 μm to 350 μm, or of less than 300, of less than 200, of less than 100, of less than 65, less than 60, less than 55, less than 50, less than 45, less than 40, less than 35, less than 30, less than 25, less than 20, less than 15, less than 10 or less than 5 μm, or of 350, 300, 250, 200, 150, 100, 85, 65, 60, 55, 50, 45, 40, 35, 30, 25, 20, 15, 10, 5, 4, 3, 2 or 1 μm may be used.

Graphite in the glass coating of the invention may have a surface area of between from about 1 to about 400 m$^2$/g. For example, the graphite may be a low surface area graphite having a surface area of between 1 and 5, or between 1 and 10, or between 5 and 20, or between 20 and 30, or between 15 and 25, or between 1 and 30 m$^2$/g, e.g., 1, 2, 3, 4, 5, 10, 12.5, 15, 17.5, 20, 22.5, 25, 27.5 or 30 m$^2$/g. Alternatively, the graphite may be a higher surface area graphite having a surface area of between 50 and 400 m$^2$/g, e.g., between 100 and 150, or between 100 and 200, or between 50 and 200, or between 150 and 250, or between 200 and 375, or between 250 and 350, or between 300 and 400, or between 100 and 400 m$^2$/g, e.g., 50, 100, 120, 140, 160, 180, 200, 220, 240, 260, 280, 300, 320, 340, 360, 380, or 400 m$^2$/g. In some embodiments, graphites having surface areas of greater than 400 m$^2$/g may be used provided sufficient shear is used to incorporate the graphite into the glass frit during manufacture of the glass coating. However, preferably, the graphite has a surface area of less than 300 m$^2$/g, or of less than 200 m$^2$/g, or of less than 100 m$^2$/g. Graphites having a surface area of less than about 300 m$^2$/g are advantageously able to incorporate into glass frits under mild shear conditions. The surface area may be a N$_2$ (NSA) BET surface area. Nitrogen adsorption measurements at liquid nitrogen temperature may be used to characterise the total surface area of graphites (and carbon blacks) herein based on the Brunauer, Emmett, and Teller (BET) theory of multilayer gas adsorption (see also ASTM method D 6556-04).

The graphite particles are preferably heat treated prior to incorporation in the glass coatings and glass coating compositions of the invention, and preferred minimum temperatures for heat treatment are at least 3500° C., at least 3000° C., at least 2500° C., at least 2000° C., at least 1500° C., at least 1400° C., at least 1300° C., at least 1200° C., at least 1100° C., or at least 1000° C. For example, the graphite particles may be heat treated to a temperature of between 1000 and 1500° C., or between 1200 and about 3500° C., or between 1500 and 2000° C., or between 2000 and 3500° C., or between 1000 and 3000° C. Graphite particles produced by such heat treatment processes generally have a relatively higher surface area than equivalent non-heat treated graphites. They may advantageously withstand the high temperatures employed in firing glass frits to produce glass coatings of the invention without evaporating. In addition, heat treated graphites are highly conductive, so a relatively lower amount is required in the composition (compared to equivalent non-heat treated graphites) which may be advantageous when formulating the glass coatings of the invention.

The graphites used herein preferably have a crystallinity of between 60% to 99%. For example, graphites having crystallinities of between 60 and 80%, or between 75 and 90%, or between 85 and 99%, or between 90 and 99%, or between 95 and 99% are preferred, e.g., crystallinities of at least 60%, at least 70%, at least 80%, at least 85%, at least 90%, at least 95% or at least 99%, e.g., crystallinities of 60%, 70%, 80%, 85%, 90%, 95% or 99%.

Graphite particles in the glass coating preferably have a resistivity of about less than about 1.0 Ω·cm, less than about 0.8 Ω·cm, less than about 0.5 Ω·cm, less than about 0.1 Ω·cm, or less than about 0.05 Ω·cm, e.g., a resistivity of between 0.01 and 0.05, or between 0.05 and 0.10, or between 0.05 and 0.15, or between 0.10 and 0.20, or between 0.15 and 0.25, or between 0.25 and 0.4, or between 0.20 and 0.50, or between about 0.4 and 0.65, or between 0.50 and 0.75, or between 0.75 and 1.0, or of between 0.01 and 1 Ω·cm. For example, the graphite may have a resistivity of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1.0 Ω·cm.

The or each graphite may be present in the glass coating composition of the invention in a concentration (calculated as $100 \times (m_{graphite})/(m_{graphite} + m_{dry\ glass\ frit} + m_{carbon\ black\ (if\ present)} + m_{other\ non-volatile\ additives\ (if\ present)})$—i.e., on a solids basis excluding vehicles/volatiles that evolve from the coating during drying/firing/curing, where m=mass) of between 1 and 65%, and preferably between 4 and 55%. For example, the graphite component may be present in the pre-fired glass coating composition of the invention in a solids concentration of between 4 and 10%, or between 10 and 15%, or between 15 and 20%, or between 20 and 25%, or between 15 and 25%, or between 10 and 20%, or between 20 and 50%, or between 25 and 45%, or between 30 and 50%, or between 15 and 45%, or between 40 and 65%, e.g., at a concentration of about 1, 5, 6, 7, 8, 9, 10, 11, 12, 13, 14, 15, 16, 17, 18, 19, 20, 21, 22, 23, 24, 25, 28, 30, 32, 34, 36, 38, 40, 42, 44, 45, 46, 48, 50, 55, 60 or 65 wt %.

The graphite may be present in the glass coating composition of the invention in a concentration (calculated as weight parts in the pre-fired composition) of 30-50 parts glass frit (in paste form) to 3-15 parts graphite, or of 35-45 parts glass frit (in paste form) to 5-10 parts graphite, or of 38-42 parts glass frit (in paste form) to 5.5-8 parts graphite. In one embodiment, there are 40 parts glass frit (in paste form) and 7 parts graphite in the pre-fired glass coating. In another embodiment, there are 40 parts glass frit (in paste form) and 6 parts graphite in the pre-fired glass coating. In these embodiments, the glass frit (in paste form) is 76%-79% powder (solids) and 24%-21% medium, and accordingly, the aforementioned ratios may be proportionally adjusted to calculate corresponding glass frit mass ratios for glass frits having higher or lower solids loadings.

The graphite may be any suitable graphite. For example, the graphite may be natural graphite, synthetic graphite, amorphous graphite, calcined petroleum coke, crystalline flake graphite, natural flake graphite, surface enhanced flake graphite, expandable graphite, purified flake graphite, purified crystalline flake graphite, purified petroleum coke, purified synthetic graphite, purified-vein graphite, synthetic graphite, primary artificial graphite, secondary artificial graphite, spherical natural graphite, or vein graphite, or a mixture of any two or more of these. The graphite may be primary synthetic graphite or natural graphite.

The graphite may have any suitable morphology. For example, the graphite particles may have a shape such as flake-like, spherical-like, needle-like, plate-like, wire-like, tube-like, whisker-like, ball-like, nano graphites, tubes, wires, or a combination of any two or more of these. The shape of graphite particles used herein is preferably flake-like, plate-like, needle-like or wire-like, or tube-like.

Properties of graphite particles used herein may be as follows in Table 1:

TABLE 1

| Properties of graphite particles useful in the invention | | | | | | |
|---|---|---|---|---|---|---|
| Specific Gravity (—) | Specific Resistance (μΩm) | Young's Modulus (Gpa) | Flexural Strength (Mpa) | Shore Hardness (—) | C.T.E ($\times 10^{-6}/°$ C.) | Thermal Conductivity (W/mK) |
| 1.70-1.92 | 4.5-17 | 9.3-13.7 | 32.3-88.2 | 46-78 | 2.1-5.5 | 81-219 |

In one embodiment, the graphite used in the glass coating of the invention has an average particle size of between 1-40 μm, a carbon content of greater than 97%, a surface area of between 1 and 300 m²/g and is of a grade selected from: secondary artificial, primary artificial, natural amorphous, and natural crystalline flake, or a combination of two or more of these grades.

In another embodiment, a high surface area graphite is selected, e.g., graphite with a surface area of 100-400 m²/g, where the mean particle size is less than about 4 microns, and the corresponding resistivity is between about 0.05 and 0.7 Ω·cm. In such cases, it will be understood that a greater percentage of graphite is required by mass in the glass coating to achieve adequate conductivity. Alternatively, more than one layer of glass coating may be required to be applied on the same substrate.

In yet another embodiment, a lower surface area graphite may be used, e.g., graphite with a surface area of about 1 to 30 m²/g, where the mean particle size is between about 5 and 45 microns, and the corresponding resistivity is between about 0.01 and 0.15 Ω·cm. In such cases, a lower percentage of graphite is required by mass in the glass coating to achieve adequate conductivity. Alternatively, only one layer of the glass coating may be required to be applied on the chosen substrate.

As noted above, the graphite in the glass coating may be a single type of graphite having characteristics as described in this section, or may be a mixture of two or more graphites having different characteristics as described in this section, such as different surface area, and/or different average particle size, and/or different morphology, etc. For example, a mixture of high and low surface area graphite and/or small and large particle size graphite and/or high or low resistivity graphite and/or graphites having different particle morphologies may be combined in a single glass coating. The ratio of different graphite products may be used to tune the final properties of the glass coating, for example, the final conductivity and/or the final CTE.

Where two different graphites are present in the glass coating, denoted herein as a first graphite and a second graphite, the first graphite may have a surface area that is between 1 and 100 times greater than the surface area of the second graphite, e.g., between 1 and 20, or 20 and 40, or 25 and 75, or 50 and 80, or 75 and 100 times greater. The first graphite may have an average particle size that is about 1 to 50 times smaller than the average particle size of the second graphite, e.g., between 1 and 10, or 5 and 25, or 10 and 30, or 20 and 40, or 35 and 50 times smaller.

The following paragraphs are intended to provide a non-exhaustive list of suitable graphites for use in the glass coatings described herein.

Graphites from ThermoPURE™ suitable for the present invention include 1500 Series powder; 2500 Series powder; 2900 Series Crystalline Flake Graphite Oxidation Resistant; 3000 Series powder; 4200 Series powder; 4500 Series powder; 4700 Series powder; 4900 Series powder; 5000 Series powder; 5200 Series powder; 5500 Synthetic Graphite High Purity; 6500 Series powder; 7800 Series powder; 8000 Series powder and 9000 Series powder. Resilient Graphitic Carbons™ such as PureBlack™, FormulaBT™ or Desulco grades may be used in the invention. Other suitable graphites may be sourced from TIMREX® Graphite Dispersions. These graphite dispersions are water based (solvent-free). Natural and synthetic graphite materials by the manufacturer Asbury are particularly suitable for the invention. The grades in Table 2 are suitable:

TABLE 2

Suitable Asbury graphites

| Grade/Type | Size | S.A. ($m^2/g$) | Carbon (%) | Resistivity ($\Omega \cdot cm$) | Density (g/cc) |
|---|---|---|---|---|---|
| Natural Flake | | | | | |
| 3569 | −100 mesh | 5.0 | 99.9 | 0.040 | 2.26 |
| 3243 | 40 μm | 3.0 | 99.5 | 0.036 | 2.26 |
| 230U | 20 μm | 6.5 | 99.4 | 0.068 | 2.26 |
| HP230U | 20 μm | 7.0 | 99.6 | 0.066 | 2.26 |
| HPM850 | 4 μm | 13.0 | 99.8 | 0.088 | 2.26 |
| S.E.F.G - (Surfaced Enhanced Flake Graphite) | | | | | |
| 3806 | 20 μm | 23.0 | 99.4 | 0.053 | 2.21 |
| 3775 | 8 μm | 24.0 | 98.0 | 0.041 | 2.22 |
| Primary Artificial | | | | | |
| TC304 | 30 μm | 4.9 | 99.9 | 0.040 | 2.22 |
| TC303 | 20 μm | 6.0 | 99.9 | 0.050 | 2.22 |
| TC301 | 8 μm | 11.0 | 99.8 | 0.050 | 2.22 |
| Secondary Artificial | | | | | |
| 4012 | 60 × 325 mesh | 1.5 | 99.7 | 0.030 | 2.19 |
| A60 | 60%, −325 mesh | 3.8 | 99.8 | 0.040 | 2.19 |
| A99 | 20 μm | 8.5 | 99.7 | 0.050 | 2.19 |
| 4014 | 9 μm | 12.5 | 99.6 | 0.058 | 2.19 |
| Micro 450 | 5 μm | 17.0 | 99.5 | 0.070 | 2.19 |
| 4827 | 1-2 μm | 250.0 | 99.7 | 0.256 | 2.18 |
| Spherical Natural Graphite | | | | | |
| 3901 | 20 μm | 4.0 | 99.8 | 0.042 | 2.28 |
| Petroleum Cokes Regular Density | | | | | |
| CF70W | 30 μm | 11.0 | 99.6 | 0.070 | 2.04 |
| 4286 | 15 μm | 18.0 | 99.6 | 0.110 | 2.04 |
| 4023 | 5 μm | 17.0 | 99.6 | 0.110 | 2.04 |
| High Density | | | | | |
| 4830 | 30 μm | 10.0 | 99.8 | 0.100 | 2.13 |

Other surface enhanced flake graphites (SEFG) are suitable, which are a natural graphite-based material composed of particles that have flake morphology. This morphology is typically much thinner than those observed in conventional flake graphite. The grades in Table 3 by the manufacturer Asbury are suitable.

TABLE 3

Suitable Asbury surface-enhanced flake graphites

| Grade | Carbon (%) | Size | Surface Area ($m^2/g$) | Resistivity ($\Omega \cdot cm$) | Bulk Density (g/L) |
|---|---|---|---|---|---|
| 3780 | 98 | ⅛" × 0 | 19.0 | 0.026 | 176.7 |
| 3807 | 98 | 55%, −325 mesh | 17.3 | 0.039 | 136.2 |
| 3806 | 98 | 20 μm | 22.7 | 0.053 | 168.2 |
| 3805 | 98 | 15 μm | 25.3 | 0.058 | 167.0 |
| 3775 | 98 | 9 μm | 27.0 | 0.058 | 167.0 |
| 3725 | 97 | <3 μm | 170.0 | 0.228 | 84.2 |

Other suitable graphites can be sourced from Asbury. The grades in the following Table 4 are suitable for the present invention and are a unique form of primary synthetic graphite manufactured by a special treatment of the highest quality calcined needle coke. The graphite is made using a process which subjects the precursor carbon to temperatures above 2500° C. The resultant graphite is a single phase (no graphitized binder phase), open pore graphite that is high in purity, lubricious, and has excellent thermal and electrical conductivity.

TABLE 4

Suitable Asbury thermally treated graphites

| Grade | Carbon(%) | Size |
|---|---|---|
| TC300 | 99.9+ | 60 × 0 mesh |
| TC305 | 99.9+ | 80 × 0 mesh |
| TC304 | 99.9+ | −200 mesh |
| TC308 | 99.9+ | 35 μm |
| TC303 | 99.9+ | 20 μm |
| TC301 | 99.9+ | 8 μm |
| TC307 | 99.9+ | <1 μm (primary particle) (surface area 350 $m^2/g$) |
| TC309 | 99.8+ | 5 μm |
| TC312 | 99.8+ | D90, 48-65 μm |
| TC313 | 99.8+ | D90, 40-52 μm |

The grades in Table 5 from the manufacturer Asbury are also suitable for the present invention.

TABLE 5

Suitable Asbury high surface area graphites

| Grade | Type | Mean Particle Size (μm) | Surface Area ($m^2/g$) | Resistivity ($\Omega \cdot cm$) |
|---|---|---|---|---|
| 3062 | Natural | <4.0 | Nominal 120 | 0.08 |
| 4118 | Synthetic | <3.0 | 100-150 | 0.14 |
| 4119 | Synthetic | <3.0 | 100-150 | 0.14 |
| 4124 | Synthetic | <3.0 | 325-375 | 0.29 |
| 3725 | Natural | <2.5 | Nominal 180 | 0.23 |
| 2299 | Natural | <2.0 | Nominal 400 | 0.65 |
| 4827 | Synthetic | <2.0 | 225-275 | 0.21 |
| 4848 | Synthetic | <2.0 | 225-275 | 0.25 |
| 4847 | Synthetic | <1.5 | 275-325 | 0.25 |
| 4849 | Synthetic | <1.5 | 275-325 | 0.38 |
| TC 306 | Synthetic | <1.5 | 325-375 | 0.26 |
| TC 307 | Synthetic | <1.5 | 325-375 | 0.26 |

The following graphites in Table 6 are also suitable for the present invention.

TABLE 6 suitable graphites

Green Mesophase Powder products, classified by particle size

| Product | Fixed Carbon (%) | Ash Content (%) | D50 (Avg particle size) (μm) | VM (Volatile Matter) (%) |
|---|---|---|---|---|
| LGMP | Min. 90 | Max. 0.4 | 40 ± 2 | 8 ± 2 |
| GMP | Min. 90 | Max. 0.4 | 25 ± 2 | 8 ± 2 |
| GMP20 | Min. 90 | Max. 0.4 | 20 ± 2 | 8 ± 2 |
| FGMP | Min. 90 | Max. 0.4 | 13 ± 2 | 8 ± 2 |
| SGMP | Min. 90 | Max. 0.4 | 9 ± 2 | 8 ± 2 |

Mesophase Graphite Powder series, classified by particle size

| Product | Ash Content (%) | D50 (μm) | Tap Density (g/ml) | Specific Surface Area (BET) (m$^2$/g) | Discharge Capacity @ 0.1 C (mAh/g) |
|---|---|---|---|---|---|
| MGP | <0.15 | 22 ± 3 | ≥1.35 | <1.2 | >330 |
| MGP18 | <0.15 | 18 ± 3 | ≥1.35 | <1.5 | >330 |
| FMGP | <0.15 | 12 ± 2 | ≥1.20 | <2.2 | >320 |
| SMGP | <0.15 | 8 ± 2 | ≥1.20 | <2.8 | >310 |

The following nanographites in Table 7 are also suitable for the present invention.

TABLE 7 suitable nanographites

| Grade | % Carbon (Nominal) | Surface Area (Nominal) | Lamella Thickness Index* (LTI) |
|---|---|---|---|
| Nano19 | 99 | 125 m$^2$/g | 18-22 |
| Nano25 | 99 | 180 m$^2$/g | 14-15 |
| Nano27 | 99 | 250 m$^2$/g | 10-11 |
| Nano47 | 99 | 300 m$^2$/g | 8-9 |
| Nano24 | 99 | 350 m$^2$/g | 7-8 |
| Nano307 | >99.6 | 350 m$^2$/g | 7-8 |
| Nano99 | 97 | 400 m$^2$/g | 6-7 |

A surface enhanced flake graphite sold as product 5773 by Intelliparticle® and having the following properties is particularly suitable:
particle size 8-9 μm (50$^{th}$ percentile of distribution) (or between 5-10 μm)
surface area=24 m$^2$/g (or between 20 and 30 m$^2$/g)
% carbon (LOI) purity 98% (or between 97 and 100)
MT %50 (microns) 8 (or between 5-10)
MT %90 (microns) 18
%-325 mesh (44 μm) 99.99%.
manufactured from conventional natural flake graphite feedstock. The surface enhanced flake graphite (SEFG) has approximately twice the BET surface area of conventional flake of the same size.

In some embodiments, the carbon component in the coating of the invention, e.g., the graphite, may have a coefficient of thermal expansion (CTE) between 50 and 400° C. that is within about 10 ppm/K, or within about 5 ppm/K, of the CTE of the glass frit into which it is dispersed. For example, the carbon component, e.g., graphite, may have a CTE that is within about 4 ppm/K, or within about 3 ppm/K, or within about 2 ppm/K, or within about 1 ppm/K, or within about 0.5 ppm/K of the CTE of the glass frit into which it is dispersed between 50 and 400° C., or between 50 and 100° C., or between 150 and 350° C. In some embodiments, the carbon component, e.g., graphite, is incorporated into the glass frit in such a manner as to be equiaxed.

In some embodiments, the graphite used in the glass coatings of the invention have a coefficient of thermal expansion (CTE) between 50 and 400° C. that is between about 4 ppm/K and about 8 ppm/K, e.g., between 5 ppm/K and 7 ppm/K, e.g., graphite, may have a CTE that is 4 ppm/K, or 5 ppm/K, or 6 ppm/K, or 7 ppm/K, or 8 ppm/K between 50 and 400° C., or between 50 and 100° C., or between 25 and 350° C., or between 150 and 350° C., or between 20 and 750° C.

The skilled person will understand the concept of percolation threshold. The present invention utilises a minimum of a percolation-threshold concentration of graphite (or carbon, or mixture of carbon and graphite) to obtain sufficient electrical conductivity to produce an electrothermic coating—so-called "electrical percolation". Surprisingly, the coatings of the present disclosure simultaneously display bonding with a variety of substrates and resist delamination over repeated electrical heating and cooling cycles.

Carbon Black

Glass coatings of the invention may comprise a single carbon black, or one or more carbon blacks in combination with one or more graphites, or may comprise two or more carbon blacks. The use of smaller particle size carbon blacks mixed with relatively larger particle sizes of graphite or carbon black may produce improved heat production from the glass coating of the invention. Inclusion of two different carbon blacks having different particle sizes and/or surface areas in a glass coating of the invention also allows the thermal coefficient of resistance (TCR) of the glass coating to be modified, e.g., to about zero, and particularly at higher temperatures of over 350° C. Further, without wishing to be bound by any theory, it is believed that inclusion of carbon black particles may counteract the negative thermal coefficient of resistance of graphite, so that the resulting formulation can be formulated to have a TCR of zero.

Carbon black is an intense black powder made by incomplete combustion or thermal cracking of a hydrocarbon feedstock. Carbon blacks are classified as furnace blacks (produced by burning oil in 50% air), thermal blacks (produced through thermal decomposition of methane) and channel blacks (produced by direct combustion of fossil fuels or municipal waste). The majority of carbon blacks are produced using furnace processes.

Carbon black is composed of nanometer-sized primary particles which can bond together to form primary aggregates of various shapes and structures. The primary aggregates can cluster into larger agglomerates, forming fluffy, free-flowing powders, or they may be bonded into beads. A high structure carbon black is one in which the aggregates are composed of many prime particles clustered together with considerable branching and chaining. As a result, the aggregates pack more poorly reducing the inter-aggregate attractive forces. Low structure carbon blacks are more compact, allowing closer packing and thus greater inter-aggregate attractive forces which makes dispersion more difficult. The structure of carbon black is measured through an oil absorption process, called dibutylphthalate absorption (DBPA or DBP). Thus, high structure grades of carbon black are distinguished from low structure grades by their higher oil absorptions.

The particle size (fineness) of carbon blacks is generally inversely related to their surface area. Small particle size (or high surface area) carbon blacks have increased blackness, tint, UV protection, and electrical conductivity, but reduced dispersability.

Carbon blacks in the glass coating of the invention may have an average particle size in the range of between about 1 nm to 1000 nm, e.g., between about 1 nm and 100 nm, or between 1 nm and 200 nm. For example, the carbon blacks may have an average particle size of from 1 nm to 45 nm, 1 nm to 30 nm, or from 10 nm to 30 nm, or from 40 nm to 60 nm, or from 20 nm to 40 nm, or from 30 nm to 50 nm, or from 40 nm to 50 nm, or from 40 nm to 60 nm, or from 1 nm to 100 nm, or from 100 nm to 150 nm, or from 150 nm to 200 nm, or from 200 to 500 nm, or from 200 to 750 nm, or from 500 to 800 nm, or from 750 to 1000 nm, or of less than 750, of less than 500, of less than 250, of less than 100, of less than 65, less than 60, less than 55, less than 50, less than 45, less than 40, less than 35, less than 30, less than 25, less than 20, less than 15, less than 10 or less than 5 nm, or of 1000, 900, 800, 700, 600, 500, 400, 300, 200, 100, 65, 60, 55, 50, 45, 40, 35, 30, 25, 20, 15, 10, 5, 4, 3, 2 or 1 nm.

Carbon blacks in the glass coating of the invention may have a surface area of between about 5 to about 1500 $m^2/g$, preferably of between about 5 and 300 $m^2/g$, or between 5 and 700 $m^2/g$. For example, the carbon blacks may be low surface area carbon blacks having a surface area of between 5 and 300, or between 5 and 100, or between 10 and 250, or between 100 and 300, 150 and 200, or between 175 and 250, or between 200 and 275, or between 100 and 200, or between 250 and 300 $m^2/g$, e.g., of less than 300, or less than 250, or less than 200, or less than 100 $m^2/g$, e.g., of 5, 10, 20, 40, 50, 60, 80, 100, 125, 150, 175, 200, 225, 250, 275, or 300 $m^2/g$. Alternatively, the carbon blacks may be higher surface area carbon blacks having a surface area of between 800 and 1500, or between 800 and 900, or between 850 and 1050, or between 900 and 1100, or between 950 and 1250, or between 1000 and 1500, or between 1100 and 1300 $m^2/g$, e.g., 800, 850, 900, 950, 1000, 1050, 1100, 1150, 1200, 1250, 1300, 1350, 1400, 1450 or 1500 $m^2/g$. In some embodiments, high surface are carbon blacks may be used provided sufficient shear is used to incorporate the carbon blacks into the glass frit during manufacture of the glass coating. However, preferably, the carbon blacks have a surface area of less than 300 $m^2/g$, or of less than 200 $m^2/g$, or of less than 100 $m^2/g$. Carbon blacks having a surface area of less than about 300 $m^2/g$ are advantageously able to incorporate into glass frits under mild shear conditions. The surface area may be a $N_2$ BET (NSA) surface area.

Carbon blacks in the glass coating of the invention may have an oil absorption (OAN) of between about 250 and 600 mL/100 g. For example, the carbon blacks may have an OAN of between 250 and 300, between 275 and 350, between 350 and 450, between 380 and 460, between 400 and 460, between 450 and 525, or between 500 and 600 mL/100 g, e.g., of 250, 275, 300, 325, 350, 375, 400, 425, 450, 475, 500, 525, 550, 575 or 600 mL/100 g.

Carbon blacks in the glass coating of the invention may have any suitable pH. For example, the carbon black may have a pH of between about 5 and about 10, for example, between 5 and 8, or between 7 and 9, or between 6 and 9, or between 6 and 10, e.g., a pH of 5, 5.5, 6, 6.5, 7, 7.5, 8, 8.5, or 9.

The carbon blacks may have an iodine absorption number (in g/kg) of between about 1000 and 1300, or between about 1025 and 1225, or between about 1050 and 1150, or between about 1150 and 1250, e.g., of 1000, 1050, 1100, 1125, 1150, 1200, 1250, or 1300 g/kg. The carbon black particles may comprise particle aggregates of a size range characterised by having a dibutyl phthalate (DPB) absorption in the range of between about 45 to 500 ml/100 g, or between 300 and 500, or between 350 and 450, or between 75 and 220, or between 200 and 350 ml/100 g (as determined by ASTM D1510—12 Standard).

Different types of carbon blacks suitable for the present invention may have properties as set out in Table 8 below.

TABLE 8

Carbon blacks and their properties

| Sample | Surface area $m^2/g$ Total BET | Structure, DBP absorption ($cm^3$/100 g) | Micropore volume ($cm^3/g$) | Conductivity at packing fraction 0.3 (S/cm) |
|---|---|---|---|---|
| Thermal black | 13 | 39 | — | 0.0 |
| Furnace black | 99 | 115 | 0.003 | 2.0 |
| Conductex SC | 190 | 115 | 0.03 | 2.5 |
| Conductex 975 | 250 | 170 | 0.05 | 4.7 |
| Printex L | 150 | 116 | 0.04 | 3.3 |
| Printex L6 | 190 | 120 | 0.04 | 3.3 |
| Vulcan XC-72 | 245 | 178 | 0.06 | 4.5 |
| Black Pearls 2000 | 1635 | 330 | 0.59 | 2.2 |
| Printex XE-2 | 1300 | 400 | 0.03 | 12.3 |
| Graphitised black | 33 | — | — | — |

The or each carbon black may be present in the glass coating composition of the invention in a concentration (calculated as $100 \times (m_{carbon\ black})/(m_{carbon\ black}+m_{graphite}+m_{dry\ glass\ frit}+m_{other\ non-volatile\ additives\ (if\ present)})$—i.e., on a solids basis excluding vehicles/volatiles that evolve from the coating during drying/firing/curing, where m=mass) of between 1 and 65%, e.g., between 4 and 55%. For example, the carbon black component may be present in the pre-fired glass coating composition of the invention in a solids concentration of between 1 and 10%, or between 1 and 3%, or between 2 and 4%, or between 3 and 5%, or between 5 and 7%, or between 6 and 8%, or between 10 and 25%, or between 15 and 30%, or between 1 and 20%, or between 20 and 45%, or between 1 and 45%, or between 40 and 65%, or between 4 and 25%, or between 30 and 50%, e.g., at a concentration of about 1, 1.5, 2, 2.5, 3, 3.5, 4, 4.5, 5, 5.5, 6, 6.5, 7, 7.5, 8, 10, 15, 20, 25, 30, 35, 40, 45, 50, 55, 60 or 65%.

The carbon black may be present in the glass coating composition of the invention in a concentration (calculated as weight parts in the pre-fired composition) of 30-50 parts glass frit (in paste form) to 3-15 parts first carbon black to 0.1 to 8 parts second carbon black, or of 35-45 parts glass frit (in paste form) to 5-10 parts first carbon black to 1 to 5 parts second carbon black, or of 38-42 parts glass frit (in paste form) to 5-7 parts first carbon black to 1.5 to 3 parts second carbon black. In one embodiment, there are 40 parts glass frit (in paste form), 6 parts first carbon black and 1 part second carbon black in the pre-fired glass coating. The carbon black may be present in the glass coating composition of the invention in a concentration (calculated as weight parts in the pre-fired composition) of 30-50 parts glass frit (in paste form) to 3-15 parts graphite to 0.1 to 8 parts carbon black, or of 35-45 parts glass frit (in paste form) to 5-10 parts graphite to 1 to 5 parts carbon black, or of 38-42 parts glass frit (in paste form) to 5-7 parts graphite to 1.5 to 3 parts carbon black. In one embodiment, there are 40 parts glass frit (in paste form), 6 parts graphite and 1 part carbon black in the pre-fired glass coating. In these embodiments, the glass frit (in paste form) is 76% powder (solids) and 24% medium, and accordingly, the aforementioned ratios may be proportionally adjusted to calculate corresponding glass frit mass ratios for glass frits having higher or lower solids loadings.

The carbon black may be any from any suitable source, for example, may be a conventional thermal black, furnace black, lamp black, channel black, highly purified carbon, surface-modified carbon black, surface functionalised carbon blacks heat-treated carbon, nano carbon or a combination of two or more of these. Particularly preferred carbons for use with the invention are furnace blacks, lamp blacks, channel blacks, surface modified carbons, and heat-treated carbons.

However, it has been found that acetylene blacks are not suitable for use in the invention, as they produce a fume when brought up to temperatures past 150° C. Acetylene blacks are produced from acetylene gas and are not heat treated, and their chemical makeup and structure makes them different from furnace and channel blacks, which are suitable for use in the invention. The invention includes the proviso that carbon blacks generated by high temperature pyrolysis of acetylene (such as Ketjenblacks) are not used.

The carbon black particles in the glass coating may have any suitable morphology. For example, they may be flake-like, spherical-like, needle-like, plate-like, wire-like, tube-like, whisker-like, ball-like, single-wall, double-wall, multi-wall carbon nano tubes, buckyballs, quantum dots, or a combination of any two or more of these. Preferably, the carbon blacks are flake-like, spherical-like, needle-like, plate-like, wire-like, tube-like, whisker-like, or ball-like.

In one embodiment, the carbon black used in the glass coating of the invention has an average particle size of between 10-40 nm and a surface area of between 800 and 1200 $m^2/g$.

The carbon blacks present in the glass coating with one or more graphites may have a surface area that is between 1 and 100 times greater than the surface area of the graphite, e.g., between 1 and 20, or 20 and 40, or 25 and 75, or 50 and 80, or 75 and 100 times greater. The carbon black may have an average particle size that is about 1 to 1000 times smaller than the average particle size of the graphite, e.g., between 1 and 100, or 50 and 250, or 300 and 500, or 400 and 650, or 600 and 800 times smaller.

The carbon black in the glass coating may be a single type of carbon black having characteristics as described in this section, or may be a mixture of two or more carbon blacks having different characteristics as described in this section, such as different surface area, and/or different average particle size, and/or different morphology, etc. For example, a mixture of high and low surface area carbon black and/or small and large particle size carbon black and/or carbon blacks having different particle morphologies may be combined in a single glass coating. The ratio of different carbon black products may be used to tune the final properties of the glass coating, for example, the final conductivity and/or the final CTE. If two carbon blacks are used, denoted herein as a first carbon black and a second carbon black, the first carbon black may have an average particle size that is about 1 to 1000 times smaller than the average particle size of the second carbon black, e.g., between 1 and 100, or 50 and 250, or 300 and 500, or 400 and 650, or 600 and 800 times smaller.

A non-exhaustive list of suitable carbon blacks for use in the glass coatings described herein is as follows:

One useful carbon is Black Pearls® 2000 "BP2000", which has a DBP absorption of 635, a surface area of 1440 $m^2/g$, particle size of 12 nm and a pH of 7.

Another useful conductive carbon is "Aquablak® 5292", which is 22% carbon and has a solids content of 28.8%, with a pH of 9.5-11.5, and is dispersed with an anionic surfactant.

Another suitable carbon black is Printex® L conductive carbon black powder having the following properties: average particle size 23 nm, BET (NSA) surface area 150 $m^2/g$, oil absorption 120 ml/100 g (ASTM D2414), made by medium color furnace (MCF).

Another suitable carbon black is Printex® L6 conductive carbon black powder having the following properties: average particle size 18 nm, BET (NSA) surface area 270 $m^2/g$, oil absorption 126 ml/100 g (ASTM D2414), made by regular color furnace (RCF).

Another suitable carbon black is Vulcan® XC-72 conductive carbon black powder having the following properties: average particle size 50 (30-60) nm, BET (NSA) surface area 250 $m^2/g$, oil absorption 182-202 ml/100 g (ASTM D2414).

Another suitable carbon black is PRINTEX® XE2-B-ECB Conductive Carbon Black sourced from http://www.thecaryconmpany.com) and having the following properties: average particle size 30 nm, BET (NSA) surface area 1000 $m^2/g$, oil absorption 420 mL/100 g, pH 7.8, iodine absorption number 1125 g/kg.

Another suitable carbon black is Conductex® SC conductive carbon black powder having the following properties: average particle size 20 nm, BET (NSA) surface area 205 $m^2/g$, oil absorption 115 ml/100 g (ASTM D2414).

Another suitable carbon black is Columbian Raven® 3500 conductive carbon black powder having the following properties: BET (NSA) surface area 375 $m^2/g$, oil absorption 105 ml/100 g (ASTM D2414).

Other examples include Cabot XC-72R Conductive, Cabot Monarch 800, Cabot Monarch 1300, Columbian T-10189, Columbian Conductex® 975, and Conductive Columbian CC-40-220.

Surface modified or surface functionalised carbon blacks may also be used. For example, carbon blacks having certain polar surface functionalities may be used.

The skilled person will understand the concept of percolation threshold. The present invention utilises a minimum of a percolation-threshold concentration of conductive carbons to obtain sufficient electrical conductivity to produce an electrothermic coating—so-called "electrical percolation". Surprisingly, the coatings of the present disclosure simultaneously display bonding with a variety of substrates and resist delamination over repeated electrical heating and cooling cycles.

Glass Frit

The glass coating composition of the present invention comprises an enamel glass frit. A carbon component is combined with the glass frit, and this mixture is optionally further modified by mixing with viscosity modifying oils before being applied to a substrate and subsequently fired/melted to form a glass coating according to the present invention. Without wishing to be bound by theory, the present inventor believes that the glass frits described herein are particularly suitable for producing glass coatings of the invention as they may provide good wetting of the surface of a variety of substrates, and in particular, of low thermal expansion/high temperature glasses such as Ceran® or Extrema® glass.

Persons skilled in the art will be aware of suitable glass frits for use in the invention. For example, the glass frits may comprise a glass powder such as silicate, borosilicate, non-alkaline earth borosilicate, alkaline earth-containing borosilicate, high borate borosilicate, transition metal borosilicate, alkaline earth aluminosilicate, alkali aluminosilicate, alkaline-free aluminoborosilicate, alkali-lead silicate, soda lime glass (alkali alkaline earth silicate), lithium-aluminium-silicate glass ceramic, or the like, etc. In some embodiments, the frit herein is selected from the group consisting of: silicate, borosilicate, and transition metal borosilicate. In other embodiments, the frit herein is selected from the group consisting of: silicate, borosilicate, and zinc borosilicate. Common oxides used to form glasses ground into glass frits include network formers such as $B_2O_3$, $SiO_2$, $P_2O_5$, intermediates such as $Al_2O_3$, $ZrO_2$, and $TiO_2$ and network modifiers SnO, MgO, ZnO, $Li_2O$, CaO, SrO, BaO, $Na_2O$, $K_2O$. The frit may comprise a glass powder having a minimum of 40%, 50%, 60%, 70% or 80% $SiO_2$. The frit may be a borax frit, lead bisilicate frit or lead borosilicate frit. Zinc borosilicate glass frits are particularly preferred. Some suitable glass frits and their properties are given in Tables 9-14 below.

The glass component may include one or more oxides selected from the group consisting of $P_2O_5$, $Al_2O_3$, $ZrO_2$, $SiO_2$, $Na_2O$, $K_2O$, BaO, $TiO_2$, ZnO, $Co_2O_3$, NiO, $Cr_2O_3$, $MnO_2$, CuO, and combinations thereof. The glass component may also include one or more additional components such as but not limited to $Li_2O$, $Rb_2O$, $Cs_2O$, MgO, CaO, SrO, ZnO, $CeO_2$, $LaO_2$, $B_2O_3$, FeO, $Fe_2O_3$, and $Fe_3O_4$.

The glass component of the coatings preferably comprises a combination of one or more alkali oxides represented as $R_2O$, one or more alkaline earth oxides represented as RO, and one or more various transition metal oxides represented herein as MO, $MO_2$, and $M_2O_3$.

The formula $R_2O$ represents alkali oxides, preferably selected from the group consisting of $Li_2O$, $Na_2O$, and $K_2O$. The formula RO represents alkaline earth oxides, preferably selected from the group consisting of MgO, CaO, SrO, and BaO.

The formulas MO, $MO_2$, and $M_2O_3$ represent transition metal oxides. MO includes ZnO, NiO, and CuO for example. $MO_2$ includes $TiO_2$ and $ZrO_2$ for example. And, $M_2O_3$ includes $Co_2O_3$ and $Cr_2O_3$ for example. It will be understood that M can be any transition metal.

Frits suitable for use in the present invention may comprise inorganic fillers such as opacifiers or pigments. The most commonly used opacifiers are zircon, tin oxide or titania. Typical pigments include calcined stains such as zircon vanadium blue, zircon iron coral or the zircon praseodymium yellow, and oxides such as iron ($Fe_2O_3$) cobalt (CoO), chrome ($Cr_2O_3$), and manganese ($MnO_2$).

The glass frits may include an effective amount of one or more additives such as fluorine and/or $NO_2$. The additives may be present in the glass frit at a concentration of between 1-15%. Other additional components that may be present in the glass frit and/or coating are described below in the section entitled "Other components".

Various agents are commonly added to frits to control the rheology of the slurry and the application properties. Accordingly, frits suitable for use in the present invention may comprise suspending agents, flocculants, deflocculants, binders, bactericides, organic dyes, wetting agents, and antifoam agents, dispersants, surfactants, clay materials or formers such as kaolinite clays, silica, talc, silicas, and inert extenders such as, for example, titanium dioxide, zinc oxide, other metal oxides, colourants, opacifiers, inhibiting pigments, plasticizers, pigment suspending agents, flow levelling agents, catalysts, drying agents, surfactants, tinctorial pigments, or a wide variety of other conventional additives. In some embodiments, the frit used herein comprises titanium dioxide as a pigment. In other embodiments, the frit used herein is devoid of pigment and hence produces a clear glass.

The glass frit used in the present invention preferably has a firing temperature of between about 600 and 750° C. in air, e.g., between 600 and 650° C., or between 625 and 675° C., or between 650 and 750° C., or between 700 and 750° C., e.g., 600, 625, 650, 675, 700, 725 or 750° C. in air. However, frits having firing temperatures of between 600 and 900° C. in air may be suitable, e.g., between 600 and 750° C., or between 725 and 875° C., or between 750 and 900° C., or between 800 and 900° C., e.g., 600, 650, 700, 750, 800, 850, or 900° C. in air. Alternatively, the glass frit used in the present invention may have a firing temperature of between about 100 to 2500° C. in a reduced atmosphere kiln with injection of one or more inert gases such as nitrogen or argon (or a mixture of inert gases), e.g., between 100 and 500° C., or between 300 and 800° C., or between 500 and 1500° C., or between 1000 and 2000° C., or between 1500 and 2500° C., e.g., 100, 200, 300, 400, 500, 600, 700, 800, 900, 1000, 1250, 1500, 1750, 2000, 2250 or 2500° C. in a reduced atmosphere kiln with injection of one or more inert gases such as nitrogen or argon (or a mixture of inert gases). Where an inert gas is introduced into the kiln, the gas (or mixture of gases) may be introduced when the kiln is at between 650 and 1500° C.

The glass frit used in the present invention preferably has a drying temperature of between about 120 and 150° C. in air, e.g., of between 120 and 130° C., or between 125 and 135° C., or between 130 and 145° C., or between 135 and 150° C., or of 120, 125, 130, 135, 140, 145 or 150° C. in air. The drying process drives off volatile solvent carrier(s) used to form the glass frit into a paste suitable for application and is performed prior to firing the glass frit.

The annealing point of the glass frit may be between 300 and 1450° C., or between 300 and 1150° C., e.g., of greater than about 500° C., of greater than about 600° C., of greater than about 700° C., e.g., greater than 750° C., greater than 800° C., greater than 850° C., greater than 900° C., greater than 950° C., greater than 1000° C., greater than 1050° C., greater than 1100° C., or greater than 1150° C., e.g. between 700 and 1000° C., or between 850 and 1450° C., or between 550 and 1450° C., or between 600 and 1200° C., or of about 700, 750, 800, 850, 900, 950, 1000, 1050, 1100, or 1150° C. Frits having higher annealing points, e.g., above 1150° C., may be suitable for inert atmosphere firing. Frits having lower annealing points, e.g., below 1150° C., may be suitable for air firing.

The glass frit used in the glass coating of the invention preferably forms a glass having a CTE of between about 4 and 12 ppm/K after curing (without addition of a carbon component), e.g., a CTE of between 4 and 5, or 5 and 6, or 6 and 7, or 3 and 6, or 4 and 5, or 5 and 8, or 6 and 9, or 7 and 10, or 8 and 12, or 6 and 12, or 8 and 11, ppm/K e.g., a CTE of 4, 4.5, 5, 5.5, 6, 6.5, 7, 7.5, 8, 8.5, 9, 9.5, 10, 10.5, 11, 11.5 or 12 ppm/K. The CTE may be the CTE at a temperature of between 25 and 300° C., or between 25 and 125° C., or between 200 and 300° C., or between 50 and 400° C., or between 240 and 270° C., or at 260° C.

TABLE 9

Suitable glass frits and their properties (Ferro)

SGF WHITE INT 19 4011 AL-6476
(System 140, Lead and Cadmium free enamel for architectural, appliance and furniture glass)

| | |
|---|---|
| Manufacturer | Ferro |
| Enamel powder product code | White, very opaque 19 4011 |
| Medium product code/drying speed | 80 1022, medium drying speed |

TABLE 9-continued

Suitable glass frits and their properties (Ferro)

| | |
|---|---|
| Flashpoint | 86° C. |
| Surface | Semi gloss |
| Main components of powder | Flux system: $ZnO-B_2O_3-SiO_2$ |
| Pigment system | $TiO_2$ |
| Particle size | 9 μm (fineness d90, ±10%, Cilas) |
| Linear coefficient of thermal expansion (50-400° C.) | $93 \pm 2 \times 10^{-7}$ $K^{-1}$ |
| Chemical durability | No visual attack: NaOH 0.1M, 2 hr, room temp<br>Obvious matting: citric acid 10%, 2 hr, room temp |
| Fineness of grind | <20 μm (Hegman's grindometer gauge) |
| Pasting ratio | 76:24 (powder/medium) |
| Firing temperature | 670-710° C./2-5 min. (Lab-furnace temp.), 620-660° C. (glass temp) |
| Recommended thinning viscosity | 6-10 Pa * s (20° C. shear rate D = 200 $s^{-1}$, (plate cone system) for screen printing) |
| Printing | 48-77 mesh per cm, polyester screens for 40-25 μm film thickness |

GSGF ETCH 19 4021 AL-6479
(System 140, Lead and Cadmium free enamel for architectural, appliance and furniture glass)

| | |
|---|---|
| Manufacturer | Ferro |
| Enamel powder product code | White etch 19 4021 |
| Medium product code/drying speed | 80 1022, medium drying speed |
| Flashpoint | 86° C. |
| Surface | Semi gloss |
| Main components of powder | Flux system: $ZnO-B_2O_3-SiO_2$ |
| Fineness of grind | <20 μm (Hegman's grindometer gauge) |
| Pasting ratio | 79:21 (powder/medium) |
| Thinning | 80 868 slow drying thinner, 80 890 medium drying thinner, 80 1022 medium drying medium |
| Firing temperature | 670-710° C./2-5 min. (Lab-furnace temp.), 620-660° C. (glass temp) |
| Recommended thinning viscosity | 6-10 Pa * s (20° C. shear rate D = 200 $s^{-1}$, (plate cone system) for screen printing) |
| Printing | 48-77 mesh per cm, polyester screens for 40-25 μm film thickness |

TABLE 10

Suitable glass frits and their properties (Ferro vitreous low temperature Pb-based glass powders)

| | Product Code | | | |
|---|---|---|---|---|
| | EG 2928 | IP 550 | IP 530 | CF 1417 |
| | Composition Family | | | |
| | Pb—Zn—B | Pb—Si—B—Al | Pb—Si—B—Al | Pb—B—Al |
| Peak Firing Temperature (° C.) | 500 | 585 | 540 | 487 |
| Time at Peak Temp (min) | 15 | 10 | 10 | 15 |
| CTE at 260° C. ($\times 10^{-7}$/° C.) | 66.5 | 65 | 80 | 87 |
| CTE at Set Point ($\times 10^{-7}$/° C.) | 60 | 74.4 | 94 | 95 |
| Softening Point (° C.) | 470 | 551 | 498 | 427 |
| Annealing Point (Ta) (° C.) | 450 | 470 | 433 | 375 |
| Glass Transition Temp (Tg) (° C.) | 415 | 453 | 417 | 365 |
| Powder Density (g/cc) | 5.30 | 4.40 | 5.20 | 5.60 |
| Typical Powder Types | VEG | RWG | RWG | VSD |

| | Product Code | | | |
|---|---|---|---|---|
| | CF 7570 | CF 7555 | IP 510 | CF 8463 |
| | Composition Family | | | |
| | Pb—B—Al—Si | Pb—B—Zn | Pb—Si—B—Al | Pb—B—Si |
| Peak Firing Temperature (° C.) | 470 | 450 | 500 | 425 |
| Time at Peak Temp (min) | 25 | 15 | 10 | 15 |
| CTE at 260° C. ($\times 10^{-7}$/° C.) | 84.5 | 87 | 98 | 102 |
| CTE at Set Point ($\times 10^{-7}$/° C.) | 95.9 | 100 | 109 | 114 |
| Softening Point (° C.) | 447 | 415 | 425 | 388 |
| Annealing Point (Ta) (° C.) | 380 | 385 | 375 | 350 |

TABLE 10-continued

Suitable glass frits and their properties (Ferro vitreous low temperature Pb-based glass powders)

| Glass Transition Temp (Tg) (° C.) | 385 | 366 | 360 | 321 |
|---|---|---|---|---|
| Powder Density (g/cc) | 5.40 | 5.70 | 6.10 | 6.20 |
| Typical Powder Types | VSD | VSD | RWG | VSD |

TABLE 11

Suitable glass frits and their properties (Ferro crystallizing low temperature Pb-based glass powders)

| | Product Code | | |
|---|---|---|---|
| | CF 7578 | CF 7575 | CF 7572 |
| | Composition Family | | |
| | Pb—Zn—B | Pb—Zn—B Composite | Pb—Zn—B |
| Peak Firing Temperature (° C.) | 530 | 450 | 450 |
| Time at Peak Temp (min) | 60 | 60 | 60 |
| CTE at 260° C. (×$10^{-7}$/° C.) | 73 | 83 | 97 |
| CTE at Set Point (×$10^{-7}$/° C.) | 63.5 | 91.1 | 95 |
| Softening Point (° C.) | 445 | 370* | 370 |

TABLE 11-continued

Suitable glass frits and their properties (Ferro crystallizing low temperature Pb-based glass powders)

| | Product Code | | |
|---|---|---|---|
| | CF 7578 | CF 7575 | CF 7572 |
| | Composition Family | | |
| | Pb—Zn—B | Pb—Zn—B Composite | Pb—Zn—B |
| Annealing Point (Ta) (° C.) | 400 | 313 | 313 |
| Glass Transition Temp (Tg) (° C.) | 329 | 310 | 310 |
| Powder Density (g/cc) | 5.8 | 6.2 | 6.4 |
| Typical Powder Types | VSD | VSD | VSD |

TABLE 12

Suitable glass frits and their properties (Ferro low temperature Pb-based glass composites)

| | Product Code | | | | |
|---|---|---|---|---|---|
| | EG 2000 | EG 2004 | EG 3463 | EG 4000 | EG 2020 |
| | Composition Family | | | | |
| | Pb—B—Zn Composite | Pb—B—Zn Composite | Pb—B—Si Composite | Pb—B—Zn Composite | Pb—B—Zn Composite |
| Peak Firing Temperature (° C.) | 500 | 425 | 450 | 420 | 390 |
| Time at Peak Temp (min) | 10 | 10 | 10 | 15 | 10 |
| CTE at 260° C. (×$10^{-7}$/° C.) | 48 | 66.5 | 72 | 81.5 | 84 |
| CTE at Set Point (×$10^{-7}$/° C.) | 51.8 | 70 | 85 | 86 | 93.8 |
| Softening Point (° C.) of base glass | 350 | 350 | 388 | 350 | 350 |
| Annealing Point (Ta) (° C.) | 325 | 325 | 334 | 325 | 325 |
| Glass Transition Temp (Tg) (° C.) | 315 | 315 | 321 | 315 | 315 |
| Powder Density (g/cc) | 4.3 | 5.2 | 5.3 | 5.7 | 5.8 |
| Typical Powder Types | VEG | VEG | VSD | VEG | VEG |

TABLE 13

Suitable glass frits and their properties available from Ferro ®

| Code | Glass Type | Firing Condition (° C.-min) | CTE(α) ×10⁻⁷/° C. | Temp range (° C.) | Tg (° C.) | Ts (° C.) |
|---|---|---|---|---|---|---|
| ASF-102X | $SiO_2 \cdot B_2O_3$ | 850-10 | 28 | 50-350 | — | 762 |
| ASF-1094 | $Bi_2O_3 \cdot B_2O_3 \cdot SiO_2$ | 550-10 | 79 | 50-350 | 466 | 526 |
| ASF-1096 | Bi2O3•B2O3 | 400-15 | 120 | 50-350 | 355 | 405 |
| ASF-1097 | $Bi2O3 \cdot B_2O_3 \cdot Al_2O_3$ | 600-15 | 70 | 50-350 | 520 | 605 |
| ASF-1098 | $Bi2O3 \cdot B_2O_3 \cdot ZnO$ | 600-10 | 54 | 50-350 | 441 | 517 |
| ASF-1099 | $ZnO \cdot Bi2O3 \cdot B_2O_3$ | 600-10 | 42 | 50-350 | 475 | 516 |
| ASF-1100 | Bi2O3•B2O3 | 460-30 | 107 | 50-350 | 380 | 440 |
| ASF-1100B | Bi2O3•B2O3 | 460-30 | 107 | 50-350 | 382 | 439 |
| ASF-1109 | $Bi_2O_3 \cdot ZnO \cdot B_2O_3$ | 580-5 | 65 | 50-350 | 461 | 537 |
| ASF-1216 | $PbO \cdot SiO_2$ | 600-15 | 63 | 50-350 | 468 | 576 |
| ASF-1290A4 | $PbO \cdot B_2O_3$ | 430-10 | 105 | 30-300 | 332 | 394 |
| ASF-1317 | $SiO_2 \cdot BaO \cdot B_2O_3$ | 810-10 | 55 | 50-350 | 585 | 730 |
| ASF-1330 | $PbO \cdot B_2O_3$ | 500-15 | 92 | 50-350 | 380 | 445 |
| ASF-1370 | $PbO \cdot SiO_2 \cdot B2O_3$ | 650-15 | 52 | 50-350 | 465 | 615 |
| ASF-1500 | $PbO \cdot SiO_2 \cdot Al_2O_3$ | 850-15 | 59 | 50-350 | 698 | not clear |
| ASF-1560 | $SiO_2 \cdot ZnO \cdot CaO$ | 850-15 | 73 | 50-350 | 670 | 780 |
| ASF-1561 | $SiO_2 \cdot ZnO \cdot CaO$ | 850-10 | 75 | 50-350 | 640 | 750 |
| ASF-1620B | $ZnO \cdot B_2O_3 \cdot SiO_2$ | 850-15 | 55 | 50-350 | 570 | 656 |
| ASF-1700 | $SiO_2 \cdot BaO \cdot ZnO$ | 850-15 | 72 | 50-350 | 680 | 813 |
| ASF-1702 | $BaO \cdot SiO_2 \cdot ZnO$ | 950-15 | 119 | 50-350 | 679 | 807 |
| ASF-1717 | $SiO_2 \cdot BaO \cdot ZnO$ | 850-10 | 35 | 50-350 | 677 | 808 |
| ASF-1761 | $SiO_2 \cdot RO$ | 1000-15 | 69 | 50-350 | 710 | 870 |
| ASF-1780 | $SiO_2 \cdot B_2O_3 \cdot BaO$ | 850-15 | 52 | 50-350 | 538 | 783 |
| ASF-1891 | $ZnO \cdot B_2O_3 \cdot SiO_2$ | 800-10 | 66 | 50-350 | 488 | 587 |
| ASF-1891F | $ZnO \cdot B_2O_3 \cdot SiO_2$ | 800-10 | 63 | 50-350 | 495 | 589 |
| ASF-1898B | $BaO \cdot B_2O_3 \cdot ZnO$ | 600-10 | 106 | 50-350 | 442 | 526 |
| ASF-1930 | $SiO_2 \cdot TiO_2 \cdot R_2O$ | 800-15 | 113 | 50-350 | 570 | 660 |
| ASF-1939 | $BaO \cdot SiO_2 \cdot B_2O_3$ | 850-15 | 88 | 50-350 | 620 | 716 |
| ASF-1941B | $BaO \cdot SiO_2 \cdot B_2O_3$ | 700-15 | 90 | 50-350 | 591 | 683 |
| ASF-4001B | $Bi_2O_3 \cdot ZnO \cdot B_2O_3$ | 520-10 | 90 | 50-350 | 406 | 472 |
| JP-1 | $PbO \cdot SiO_2$ | 865-30 | 40 | 50-600 | 637 | 829 |
| K-301 | $RO \cdot B2O3 \cdot SiO_2$ | 800-10 | 90 | 30-300 | 561 | 665 |
| K-304 | $RO \cdot B2O3 \cdot SiO_2$ | 490-60 | 106 | 30-250 | 444 | 525 |
| K-807 | $BaO \cdot SiO_2 \cdot B_2O_3$ | 1100-10 | 75 | 30-300 | 657 | 780 |
| K-808 | $BaO \cdot SiO_2 \cdot B_2O_3$ | 950-10 | 70 | 30-300 | 666 | 795 |
| K-835 | $ZnO \cdot B_2O_3$ | 680-10 | 35 | 50-350 | 545 | not clear |
| KF9173 | Bi2O3•B₂O₃•ZnO | 520-10 | 98 | 30-300 | 403 | 480 |
| KP312 | $SnO \cdot P_2O_5$ | 430-10 | 128 | 30-250 | 280 | 352 |
| LS-5-300M | $SiO_2 \cdot BaO \cdot Li_2O$ | 620-15 | 105 | 30-300 | 490 | 610 |
| SK-231-300 | $Bi_2O_3 \cdot BaO \cdot B_2O_3$ | 620-15 | 84 | 30-300 | 491 | 580 |
| 1991Y10 | $SiO_2 \cdot R_2O \cdot TiO_2$ | 600-10 | 150 | 50-350 | 410 | 529 |
| 200GF | $SiO_2 \cdot R_2O \cdot BaO$ | 750-30 | 105 | 50-300 | 472 | 648 |

TABLE 14

Suitable clear glass frits and their properties (Ferro ®)

| | Product Code | | |
|---|---|---|---|
| | AU20180823-1 | 107810 | 107813 |
| | Composition Family | | |
| | Flux system: ZnO—$B_2O_3$—$SiO_2$ | $ZnO \cdot B_2O_3 \cdot SiO_2$ | $BaO \cdot SiO_2 \cdot ZnO$ |
| Peak Firing Temperature (° C.) | 650-750 | 850-1000 | 850-1000 |
| Time at Peak Temp (min) | 10 mins | 10 mins | 10 mins |
| CTE at 50° C. (×10⁻⁷/° C.) | 85-95 | 70-80 | 70-80 |
| Softening Point (° C.) | 640 | 710 | 750 |
| Annealing Point (Ta) (° C.) | 690 | 815 | 807 |
| Glass Transition Temp (Tg) (° C.) | 710 | 850 | 850 |

The glass frit may be a mixture of two or more different, compatible glass frits. For example, the glass frit may be a mixture of any two or more of the frits described herein. In some embodiments, where a mixture of two different glass frits is used, each glass frit has a different firing temperature. For example, a frit having a firing temperature of 650° C. may be mixed with a frit having a firing temperature of 850° C. in any suitable proportion, e.g., between 1:10 and 10:1, e.g., from 1:10 to 1:1, or from 1:1 to 1:10, or between 60:40 and 10:90, or between 70:30 and 80:20, or between 75:25 and 85:15, e.g., about 60:40, 65:35, 70:30, 75:25, 80:20, or 85:15

The glass frit may be provided in the form of a paste. The paste may have any suitable solids loading, but for example, may be between about 60:40 solids:medium and about 85:15 solids:medium, e.g., between 60:40 and 70:30, or between 70:30 and 80:20, or between 75:25 and 85:15, e.g., about 60:40, 65:35, 70:30, 75:25, 80:20, or 85:15, where the medium is any suitable medium. For example, the medium may be an oil such as pine oil.

The glass frit may be present in the glass coating composition of the invention in a concentration (calculated as $100\times(m_{dry\ glass\ frit})/(m_{carbon\ black\ (if\ present)}+m_{graphite}+m_{dry\ glass\ frit}+m_{other\ non-volatile\ additives\ (if\ present)})$—i.e., on a solids basis excluding vehicles/volatiles that evolve from the coating during drying/firing/curing, where m=mass) of between 35 and 99%, e.g., between 65 and 96%. For example, the glass frit component may be present in the pre-fired glass coating composition of the invention in a solids concentration of between 70 and 75%, or between 75 and 80%, or between 80 and 85%, or between 85 and 90%, or between 75 and 85%, or between 80 and 90%, or between 35 and 50%, or between 70 and 90%, or between 75 and 96%, or between 65 and 90%, e.g., at a concentration of about 30, 35, 45, 50, 55, 60, 65, 67.5, 70, 72.5, 75, 77.5, 80, 82.5, 85, 87.5, 90, 92.5 or 95%.

The glass frit may be mixed with one or more carbon components such that the glass frit (including carrier/medium) comprises between 15 and 75 wt % of the total mixture. In such embodiments, the glass frit may be provided in the form of a paste having a solids loading of, for example, between about 60:40 solids:medium and about 85:15 solids:medium, in particular, 75:25 solids:medium. For example, the glass frit paste component may be present in the pre-fired glass coating composition at between 15 and 30 wt %, or between 20 and 40%, or between 30 and 60%, or between 50 and 75%, or between 65 and 75%, or between 30 and 70%, e.g., at a concentration of about 15, 20, 25, 30, 35, 40, 45, 50, 55, 60, 65, 70 or 75%.

Figure 2:
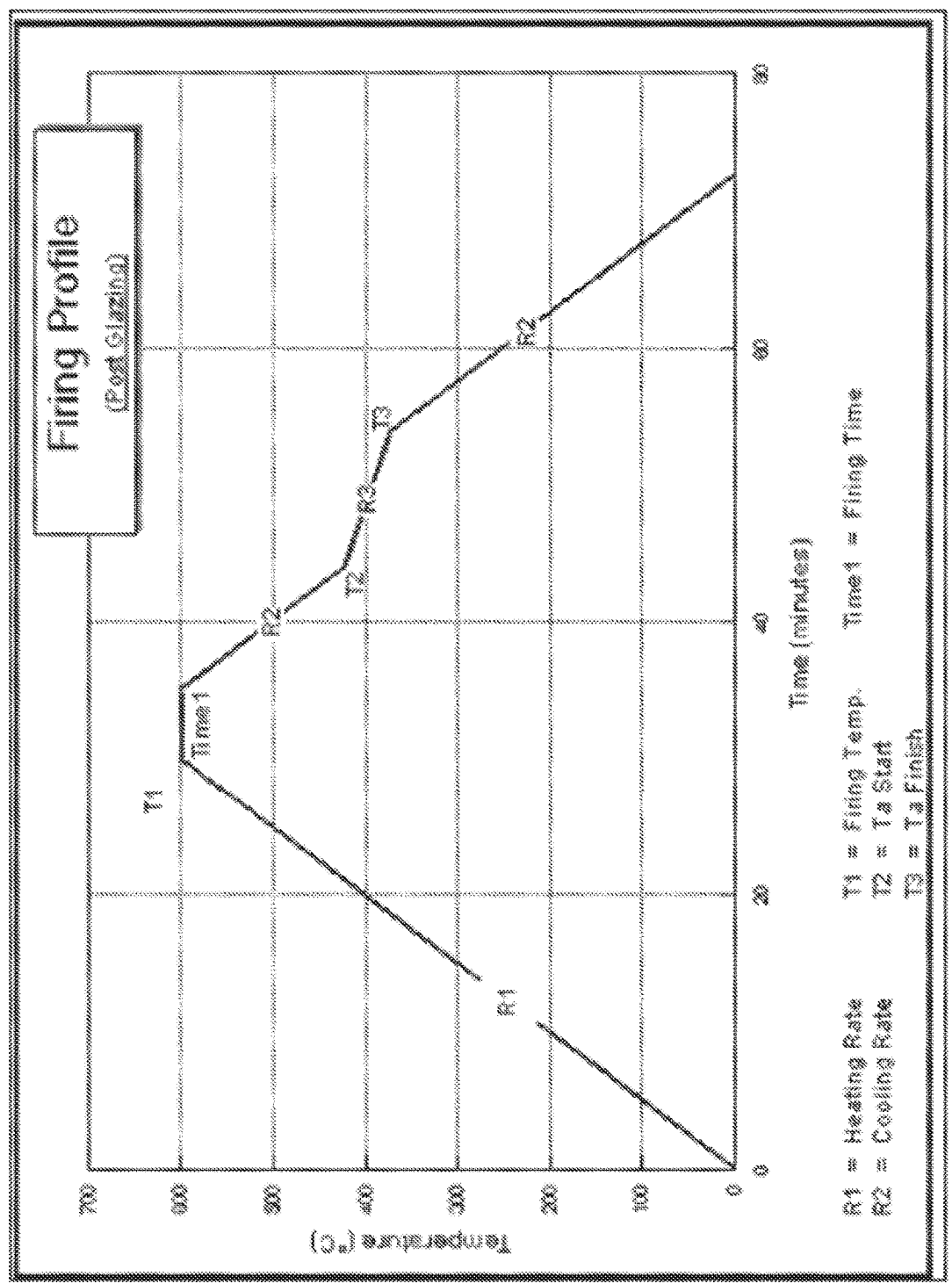
FIG. 2 shows a possible firing profile (post-glazing) for the glass coating in certain embodiments of the invention.
Figure 3:
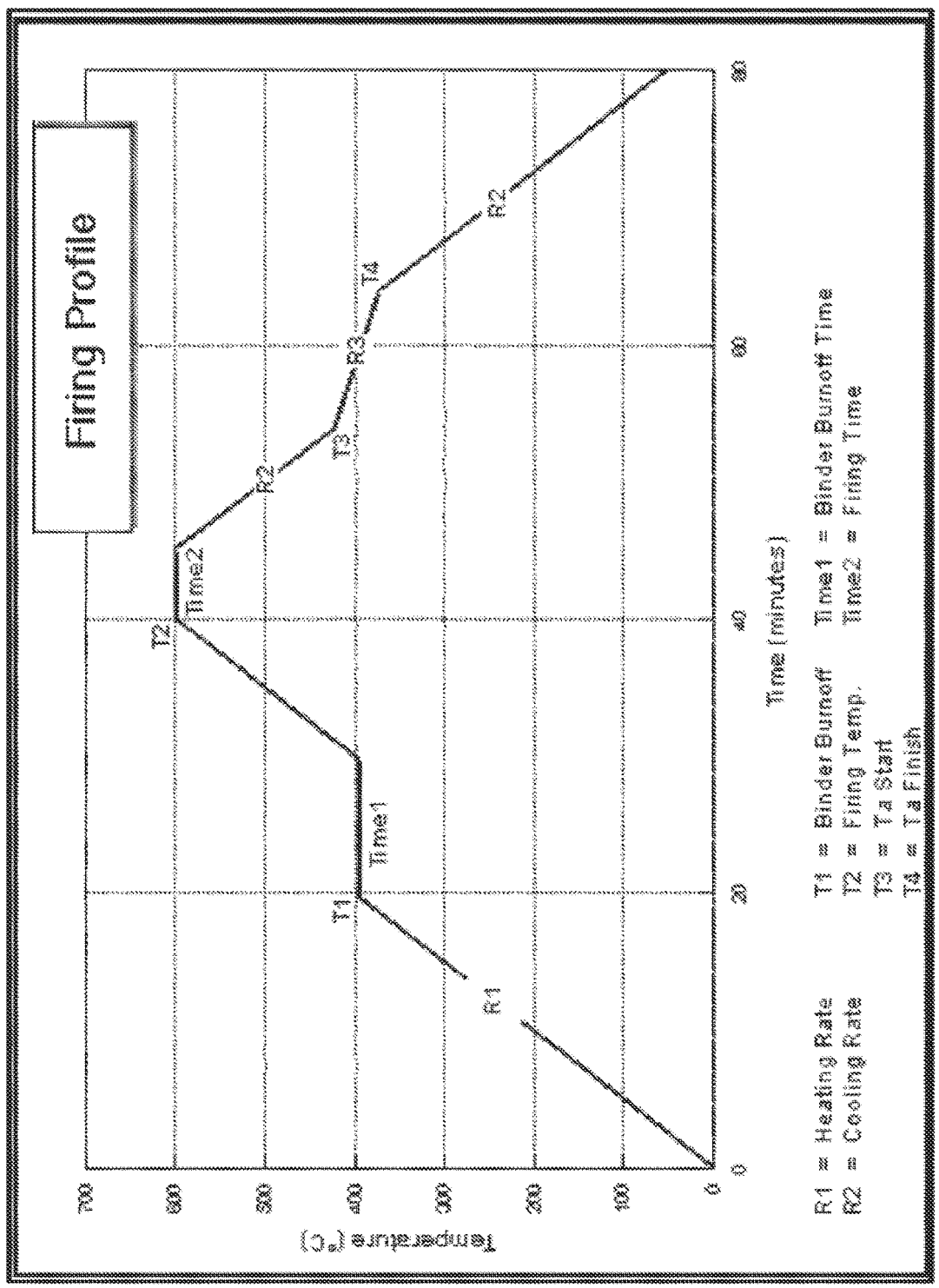
FIG. 3 shows a possible alternative firing profile for the glass coating in certain embodiments of the invention.

Curing of the glass frits can be baking/firing at a temperature for a suitable period to effect curing, drying or melting of the frit as described in the following methods section. Curing/firing conditions are well known to persons skilled in the art of such materials. For example, suitable glazing and firing temperature profiles for the glass frits described in this section are presented in FIGS. 1-3. These thermal profiles are particularly suitable for the glazes produced by Ferro, such as GSGF ETCH 19 4021 AL-6479 and GSGF WHITE INT 19 4011 AL-6476.

The frits described in this section are all suitable for use with graphites and carbon blacks as described herein to make electrothermic coating compositions suitable for application to a range of substrates such as low thermal expansion glass and prepared metal substrates. In some embodiments, the coatings have a CTE closely matched to the CTE of the substrate. The coatings formed from these frits are non-metallic conductive glass heating elements, and can be coated onto a variety of substrates, such as Ceran® glass, Nextrema® glass, and a variety of other glass substrates as discussed in the following section "Substrates". As discussed herein, more than one carbon component can be utilised with the glass frits described in this section in the glass coating of the invention.

Other Components

The glass coating of the present invention may comprise one or more metals. The metal may be a Group I or Group II metal, or a transition metal. For example, the metal may be copper, zinc, nickel, or silver. The metal may be present in elemental form. The metal may be present in oxide form, e.g., titanium dioxide. The metal may be in the form of metal particles. The metal may be present in the glass coating composition in any suitable amount, e.g., in an amount of from 1 to 20 wt % by weight of the glass coating composition on a solids basis, or below 10 wt %, or 9, 8, 7, 6, 5, 4, 3, 2, 0.5, 0.25, or 0.1 wt %. Preferably, where the glass coating comprises metal particles, the metal particles are present in a concentration which is below that at which arcing can occur between the glass coating of the invention and an article brought into close proximity to, or touching, the surface of the glass coating of the invention.

The glass coating described herein may be completely devoid of elemental metal particles, and thus the present invention may alternatively include the proviso that the glass coating does not contain any elemental metal particles. Alternatively, the glass coating described herein may be substantially devoid of elemental metal particles The glass coating described herein may be completely devoid of metal oxide pigment particles, and thus the present invention may include the proviso that the glass coating does not contain any metal oxide pigment particles. Alternatively, the glass coating described herein may be substantially devoid of metal oxide pigment particles. The glass coating described herein may be completely devoid of metal oxide pigment particles and elemental metal particles, and thus the present invention may include the proviso that the glass coating does not contain any metal oxide pigment particles or any elemental metal particles.

The glass coating described herein may comprise components other than graphite, carbon black and metal particles that possess negative or positive electrical properties. For example, the coating may comprise metallic nanowires, nanozincs, nickels, carbon nanotubes and/or graphene.

The glass coating composition may be combined with a rheology modifying substance (or vehicle) to facilitate application to a substrate. This may be the same as, or may be in addition, to the vehicle or medium in the glass frit discussed above in the section entitled "Glass frit". The rheology modifying substance may be any suitable rheology modifier known in the art, such as an alcohol (including glycols), an ester of an alcohol such as an acetate, propionate or phthalate, for instance dibutyl phthalate, or a terpene such as pine oil, terpineol and the like. More specific vehicles suitably include diethylene glycol monbutyl ether, terpineol, isopropanol, tridecanol, water, and/or 2,2,4-trimethyl-1,3-pentanediol monoisobutyrate.

Glass Coatings

The glass coatings of the invention are electrothermic, in that they heat up on application of electrical current. Other methods of inducing heat in the coatings will, however, also be evident to persons skilled in the art.

The glass coatings of the invention are preferably able to bond to (or "wet") metal as well as non-metal (glass, ceramic) substrates by selection of a suitable glass frit (e.g., to provide wetting to the surface) and carbon component (e.g., to provide compliance when the physical and chemical properties of the substrate vary). The coatings of the invention are thus able to bond or adhere strongly to a range of different substrates without delaminating, even under extreme temperature variations. Without wishing to be bound by theory, the glass coating herein may be highly stable for stress fatigue by maintaining surface tension, bondage & adhesion during thermal cycling.

Infusion of a carbon component in a glass frit as described herein is understood to influence the bondage of the resultant glass coating such that it can bond to multiple substrates with different CTEs. The carbon component is understood to influence the CTE of the glass frit and is very 'forgiving', which allows the proven bondage and adhesion of the glass coatings to metals and ceramics/glasses. The bondage and adhesion is understood to be a physical, chemical and structural bond to the various substrate. The glass coatings of the invention described herein are understood to expand the compression and surface tension creating the bond to multiple substrates. The carbon component in the frit is understood to affect the crystalline structures formed during firing, thus promoting crystalline formation. Inclusion of a carbon component in the frit permits higher temperature function with less degeneration.

The glass coatings of the invention may have a stable electrical resistance, that is, they show substantially no increase or decrease in resistance with changes of temperature, as discussed further below in the section entitled "Thermal Coefficient of Resistance (TCR)". Such coatings would therefore have a thermal coefficient of resistance or TCR of about zero.

The overall resistance in ohms per square cm ($\Omega/cm^2$) of the glass coatings of the invention are preferably invariant with temperature changes, with varying voltage, or over time. The coatings may thus have a TCR of about zero. The coatings thus preferably show no "start-up" amperage or current surges. In addition, they may be conductively stable over time.

The glass coatings of the invention preferably have resistances of less than 400Ω, e.g., less than 350, less than 300, less than 250, less than 200, less than 180, less than 150, less than 130, less than 100, less than 90, less than 80, less than 70, less than 60, less than 50, less than 40, less than 30, less than 20, less than 10, less than 5 or less than 1Ω, e.g., resistances of between 0.1 and 5Ω, or between 0.1 and 10Ω, or between 1 and 30Ω, or between 0.5 and 50Ω, or between 10 and 100Ω, or between 0.1 and 200Ω, or between 10 and 150Ω, or between 50 and 200Ω, or between 25 and 75Ω, or between 100 and 200Ω, or between 100 and 400Ω, or between 10 and 400Ω, or between 200 and 300Ω, or between 300 and 400Ω, or between 150 and 350Ω, or between 240 and 120Ω, or between 100 and 0.5Ω. Resistances of less than 400Ω advantageously allow the coatings to generate heat on application of stimulus (electricity, radiation, etc). Indeed, temperatures of up to 800° C., or up to 700° C., or up to 600° C. or up to 500° C., or up to 400° C., or up to 300° C., or up to 200° C., or up to 100° C., e.g., temperatures of between 100 and 600° C., or between 50 and 300° C., or between 50 and 800° C., or between 400 and 800° C., e.g., temperatures of 100, 150, 200, 250, 300, 350, 400, 450, 500, 600, 700, 800 or 900° C. can be achieved stimulating (e.g., electrifying) coatings having resistances of less than 400Ω, and preferably less than 240Ω, or less than 200Ω, and even more preferably less than 120Ω, and still more preferably less than 50Ω. The resistance of the glass coating of the invention may be decreased, for example, by increasing the amount of graphite in the glass coating. The maximum output temperature of the coating may be increased, for example, by increasing the amount of graphite in the glass coating.

The glass coatings of the invention may have a coefficient of thermal expansion (CTE) that is within about 10 ppm/K of the CTE of the substrate to which it is applied as described in the following section.

The glass coatings of the invention may have any suitable thickness. However, thicknesses of between about 1 μm and about 200 μm are preferred. For example, the glass coating preferably has a thickness of between about 1 and 40 μm, or between 20 and 100 μm, or between 20 and 200 μm, or between 50 and 150 μm, or between 10 and 150 μm, or of 1, 5, 10, 20, 50, 100 or 200 μm after firing.

The glass coating may be fired as a single layer. The single layer may comprise one, or two, or three or more, stacked screen printed layers of the glass coating composition (glass frit and carbon component) so as to achieve a desired thickness of the pre- or post-fired layer. Each screen printed layer is preferably the same glass coating composition.

Alternatively, the glass coating may comprise two or more sequentially fired layers. Each layer may comprise one, or two, or three or more, stacked screen printed layers of the glass coating composition (glass frit and carbon component) so as to achieve a desired thickness of the pre- or post-fired layer. Each screen printed layer is preferably the same glass coating composition. Each fired glass coating layer may be identical or may be different.

In one embodiment, there are a plurality of glass coatings or glass coating compositions on the substrate in a stacked configuration. In embodiments where there are multiple layers of glass coating or glass coating composition on the substrate, it will be appreciated that the overall conductivity may increase as further layers are added, and therefore the thermal properties of the electrothermic composite of the invention can be tailored to suit a variety of requirements. For example, as the glass coating thickness increases, so too may the maximum temperature reached by the coating under a constant voltage, and so too may the heat emitted (as measured in, e.g., Watts). This may be because the current drawn by a thicker glass coating is greater than the current drawn by a thinner one at a constant voltage.

The glass coatings of the invention may be in compression throughout cooling across the temperature range $T_{max}$ to room temperature (25° C.), where $T_{max}$ represents the maximum firing temperature of the glass coating, e.g., $T_{max}$ may be 400, 500, 600, 625, 650, 675, 700, 725, 750, 800, 850, 900, 1000, 1250, 1500, 1750, 2000, 2250 or 2500° C. This advantageously produces a glass coating that is in compression during service (i.e., use, e.g., when an electrical current is applied to the coating) up to a service temperature of up to 50, 100, 200, 300, 400, 500, 600, 650, 700, 750, 800, 850, 900, 1000, 1250, or up to 1500° C. The temperature at which the glass coating transitions from being under compression to being under tension (during service) may be the thermal crossover temperature. The thermal crossover temperature of the glass coatings herein may be at least 50, 100, 200, 300, 400, 500, 600, 650, 700, 750, 800, 850, 900, 1000, 1250, or up to 1500° C., e.g., between 50 & 900° C., or between 150 and 650° C., or between 500 and 1000° C. Higher crossover temperatures may advantageously result in glass coatings having higher functional operational temperatures, especially on metal substrates.

The thermal conductivity of the glass coatings herein may be between 0.01 to 20 $Wm^{-1}K^{-1}$, e.g., between 0.1 and 10, or between 5 and 15, or between 1 and 10, $Wm^{-1}K^{-1}$ at 25° C.

Coefficient of Thermal Expansion (CTE)

The coefficient of thermal expansion (CTE) quantifies the change in size of an object as the temperature changes. Specifically, it corresponds to the fractional change in the size of an object per degree change in temperature. The CTE can be calculated along a single dimension (the coefficient of linear thermal expansion, CLTE), for an area, or for the volume of an object. The CTE can be constant or approximately constant over a predefined temperature range, or can be variable, changing as a function of temperature. As used herein, and unless the context clearly indicates otherwise, CTE and CLTE are taken to be interchangeable. Accordingly, all discussion of CTE values herein, unless the context indicates otherwise, is taken to apply to CLTE values also.

The CTE of a material in ppm/K may be calculated using the following formula:

$$CTE \text{ (ppm/K)} = (L-L_0)/L_0 \times 1/(T-T_0) \times 10^6$$

where L is the dimension at temperature T and $L_0$ is the dimension at temperature $T_0$.

Most solid materials expand upon heating, which means they have a positive CTE. Most solids, including metals, alloys, concrete and polymers have CLTEs in the order of $0\text{-}50 \times 10^{-6} K^{-1}$ ($1 \times 10^{-6} K^{-1} = 1$ ppm/K), and glasses typically have CLTEs in the order of 0-5 ppm/K, at 20° C. For example, borosilicate glass has a CLTE of approximately 3.3 ppm/K at 20° C., and Ceran® (Schott) has a CLTE of approximately 0 ppm/K over the temperature range 25 to 700° C. Other glasses, such as Nextrema® (Schott) have a CLTE of between approximately −0.8 and 0.9 ppm/K over the temperature range −50 to 300° C., and a CLTE of between approximately 0.1 and 1.6 ppm/K over the temperature range 300 to 700° C. As used herein, the term "low thermal expansion" in relation to substrates, and in particular glass, refers to substrates having a CTE of between −1 and +1 ppm/K over the temperature range 25 to 300° C.

The glass coatings described herein may have a coefficient of thermal expansion (CTE) of within ±20 ppm/K of the CTE of the substrate on which they are coated. Accordingly, in some embodiments, the glass coatings described herein have a CTE of within ±1.0 ppm/K, ±2.0 ppm/K, ±3.0 ppm/K, ±4.0 ppm/K, ±5.0 ppm/K, ±6.0 ppm/K, ±7.0 ppm/K, ±8.0 ppm/K, ±9.0 ppm/K, or ±10.0 ppm/K, or ±11.0 ppm/K, or ±13.0 ppm/K, or ±13.0 ppm/K, or ±14.0 ppm/K, or ±15.0 ppm/K, or ±16.0 ppm/K, or ±17.0 ppm/K, or ±18.0 ppm/K, or ±19.0 ppm/K, or ±10.0 ppm/K of the CTE of the substrate. Advantageously, a glass coating having a CTE of within ±20 ppm/K of the CTE of the substrate may assist in maintaining structural integrity of both the coating and the substrate as the coating and substrate are heated and reheated over a broad temperature range. Indeed, previous attempts in the prior art to apply metallic coatings to glass surfaces have been unsuccessful as the metal layer expands with increasing temperature at a much greater rate than the underlying glass substrate, causing the coating to crack and delaminate from the glass surface. The presence of cracks in the conductive surface presents a safety hazard, as electric current can then be transmitted to a metal object such as a pot or pan on the stove, and to any metal utensils in contact with the pot or pan, thereby forming electrical arcs capable of causing electrocution. Such panels are therefore unsuitable for stovetop cooking applications.

For the purposes of determining whether a glass coating has a CTE within a defined ppm/K of a substrate CTE, the CTE should be calculated by measuring the change in dimension of the glass coating and the substrate separately over the same temperature range. Where the dimensions of the glass coating and/or substrate increase linearly (or approximately linearly) with increasing temperature, the CTE will be constant over that temperature range. The CTE of the glass coating can thus be compared with the CTE of the substrate throughout the entire temperature range over which their CTEs are constant. For convenience, the temperature range may be between 0 and 650° C. or any sub-range within this range, e.g., between 20 and 100° C., between 25 and 200° C., between 25 and 300° C., between 100 and 300° C., or between 200 and 450° C., or between 25 and 500° C., or between 25 and 400° C., or between 150 and 500° C., or between 300 and 600° C., or between 350 and 650° C., or between 200 and 650° C., or between 200 and 500° C., or between 250 and 450° C., etc.

Where the CTE of the glass coating and/or substrate varies with temperature, the CTE is preferably within ±20 ppm/K, e.g., within ±10 ppm/K, over some specific temperature range. This specific temperature range may be between 0 and 800° C., e.g., between 0 and 650° C., or any sub-range within this range, e.g., between 20 and 100° C., between 25 and 200° C., between 25 and 300° C., between 100 and 300° C., or between 200 and 450° C., or between 25 and 400° C., or between 25 and 500° C., or between 150 and 500° C., or between 300 and 600° C., or between 350 and 650° C., or between 200 and 650° C., or between 200 and 500° C., or between 250 and 450° C., or between 500 and 800° C., or between 600 and 750, etc. Where the CTE is not constant (i.e., the dimension of the composition and/or substrate does not vary linearly with temperature due to phase transitions or other physical phenomena), the CTEs of the glass coating and substrate should be compared at the same temperature or over the same temperature interval for the purposes of determining whether the CTEs are within ±5 ppm/K.

The temperature range throughout which the CTEs of the glass coating and substrate are compared preferably corresponds to the temperature range of a conventional electric coil and/or electric stovetop with a glass-ceramic cover or the temperature range of a stainless steel, vitreous enamel or cast iron BBQ hotplate. It preferably covers a temperature range required for boiling or cooking food and drink.

Accordingly, in some embodiments, the CTE of the glass coating of the invention is within ±20 ppm/K, or +10 ppm/K, or ±5 ppm/K of the CTE of a substrate to which the composition is applied over at least part of the temperature range 0 and 650° C., or over the entire temperature range 25 to 300° C. In preferred embodiments, the glass coatings described herein have a CTE that is within ±20 ppm/K, or +10 ppm/K, or ±5 ppm/K of a substrate to which they are applied over the entire temperature range 0 to 650° C. The CTE of the glass coating of the invention may be within ±20 ppm/K, or +10 ppm/K, or ±5 ppm/K of the CTE of a substrate to which the composition is applied over, or over at least part of, the temperature range 100 and 800° C.

In certain embodiments, the CTE of a glass coating as described herein is less than or equal to the CTE of the substrate to which it is applied. Accordingly, glass coatings described herein may have a CTE, that is equal to or up to 20 ppm/K, or 10 ppm/K, or 5 ppm/K lower than the CTE of the substrate. For example, the glass coatings described herein may have a CTE of equal to or up to 1 ppm/K, 2 ppm/K, 3 ppm/K, 4 ppm/K, 5 ppm/K, 6 ppm/K, 7 ppm/K, 8 ppm/K, 9 ppm/K, 10 ppm/K, 12 ppm/K, 14 ppm/K, 16 ppm/K, 18 ppm/K, or 20 ppm/K, lower than the CTE of the substrate. In some embodiments, the glass coating may have a negative CTE. When the glass coating has a CTE of less than the CTE of the substrate to which it is applied, the glass coating is advantageously under compression during cooling of the composite.

In other embodiments, the CTE of a glass coating as described herein is greater than or equal to the CTE of the substrate to which it is applied. Accordingly, glass coatings described herein may have a CTE, that is equal to or up to 20 ppm/K greater than the CTE of the substrate. For example, the glass coatings described herein may have a CTE of equal to or up to 1 ppm/K, 2 ppm/K, 3 ppm/K, 4 ppm/K, 5 ppm/K, 6 ppm/K, 7 ppm/K, 8 ppm/K, 9 ppm/K, 10 ppm/K, 12 ppm/K, 14 ppm/K, 16 ppm/K, 18 ppm/K, or 20 ppm/K greater than the CTE of the substrate. In such cases, the carbon component in the glass coating may allow the glass coating to withstand being under tension during cooling of the composite. Without wishing to be bound by theory, the carbon component may be providing compliance to the coating that assists in accommodating mechanical stresses.

Preferably the CTE of the glass frit (without any carbon) is between 7 and 12 ppm/K. Preferably the CTE of the coating of the invention is between 5 and 15 ppm/K. For example, the CTE of a glass coating as described herein may be between 0 and 6 ppm/K, e.g., between 0 and 2 ppm/K, or between 1 and 4 ppm/K, or between 3 and 5 ppm/K, or between 5 and 9 ppm/K, or between 8 and 10 ppm/K, or between 6 and 12 ppm/K, or between 9 and 15 ppm/K, or between 5 and 12 ppm/K, or may be 0, 1, 2, 3, 4, 5, 6, 7, 8, 9, 10, 11, 12, 13, 14 or 15 ppm/K. In some embodiments, addition of a carbon component to a glass frit causes the CTE of the glass frit, at about 10 ppm/K to change by up to 5 ppm/K, or up to 4 ppm/K, or up to 3 ppm/K, or up to 2 ppm/K, or up to 1 ppm/K, or up to 0.5 ppm/K, to between about 5 and 9.5 ppm/K, e.g., between about 8 and 9.5 ppm/K, e.g., to change to about 9 ppm/K.

As described in this section, the glass coatings may have a CTE of within ±20 ppm/K of the CTE of the substrate on which they are coated. In certain embodiments, the glass coating is applied to a single layered substrate, such as a piece of low thermal expansion glass, or other glass or non-conductive substrate. In such cases, the CTE of the glass coatings may be within ±20 ppm/K of the CTE of the single-layered substrate.

However, as described herein, in other embodiments the glass coating may be applied to a multi-layered substrate. In such cases, the layer upon which the glass coating is applied is to be taken to be the relevant substrate for calculating the relative CTE. Additional layer(s) under the uppermost substrate layer preferably also have CTEs within ±20 ppm/K of the CTE of their adjacent layer(s). To take an example, in one embodiment, the composite of the invention comprises, from uppermost to lowermost, a glass coating, an insulating glass layer, and a metal layer. In this embodiment, the glass coating preferably has a CTE of within ±10 ppm/K of the CTE of the insulating glass layer, and the insulating glass layer preferably has a CTE of within ±10 ppm/K of the CTE of the metal layer. To take another example, in another embodiment, the composite of the invention comprises, from uppermost to lowermost, a glass coating, a first insulating glass layer, a second insulating glass layer, and a metal layer. In this embodiment, the glass coating preferably has a CTE of within ±10 ppm/K of the CTE of the first insulating glass layer, the first insulating glass layer preferably has a CTE of within ±10 ppm/K of the CTE of the second insulating glass layer, and the second insulating glass layer preferably has a CTE of within ±10 ppm/K of the CTE of the metal layer.

Means for measuring the CTE of materials such as the glass coating of the present invention will be known to those skilled in the art. For example, techniques capable of relating sample size (length and/or volume) as a function of temperature may include dilatometry, interferometry and/or thermomechanical analysis. Standards such as ASTM E228—Standard Test Method for Linear Thermal Expansion of Solid Materials with a Vitreous Silica Dilatometer, ASTM E831—Standard Test Method for Linear Thermal Expansion of Solid Materials by TMA, and/or ASTM C359—Linear Thermal Expansion of Porcelain Enamel and Glass Frits and Ceramic Whiteware Materials by the Interferometric Method may be used.

The skilled person will appreciate that the CTE of glasses fired from commercially available glass frits are known from material data sheets. For the present invention, glass frits having a CTE of between 7 and 12 ppm/K, e.g., between 9 and 11 ppm/K, are particularly suitable for use in the present invention in combination with a carbon component for application to a low thermal expansion glass substrate. However, suitable glass frits having CTEs outside this range may also be suitable. The present inventor has discovered that, in at least one embodiment, a glass coating produced from a glass frit combined with one or more carbon components is lower than the CTE of a glass coating produced from the same glass frit without the carbon component over a temperature range of between 50 and 400° C., or between 50 and 100° C., or between 150 and 350° C. In combination with other effects, and without wishing to be bound by theory, this is believed to advantageously allow the glass coatings of the invention to adhere to glasses, and in particular, low thermal expansion glasses, without delaminating during subsequent heating/cooling cycles of the electrothermic coating.

The present inventor has discovered that, in at least one embodiment, a glass frit combined with one or more carbon components has a CTE of within about 15% of the CTE of the same glass frit without the carbon component over a temperature range of between 50 and 400° C., or between 50 and 100° C., or between 150 and 350° C. In combination with other effects, and without wishing to be bound by theory, this is believed to advantageously allow the glass coatings of the invention to resist cracking and minimise internal stresses of the coatings during heating/cooling cycles. Accordingly, in some embodiments, the carbon component in the coating of the invention, e.g., the graphite, is incorporated into the glass frit in such a manner as to produce a glass coating having a CTE that is up to 1 ppm/K lower than the CTE of the same glass frit (without a carbon component), or up to 2 ppm/K lower, or up to 3 ppm/K lower, or up to 4 ppm/K lower, or up to 5 ppm/K lower than the CTE of the same glass frit (without a carbon component) over a temperature range of between 50 and 400° C., or between 50 and 100° C., or between 150 and 350° C. In some embodiments, the carbon component in the coating of the invention, e.g., the graphite, is incorporated into the glass frit in such a manner as to produce a glass coating having a CTE that is within 15% of the CTE of the same glass frit (without a carbon component), or within 14%, or within 13%, or within 12%, or within 11%, or within 10%, or within 9%, or within 8% or within 5% of the CTE of the same glass frit (without a carbon component) over a temperature range of between 50 and 400° C., or between 50 and 100° C., or between 150 and 350° C. This percentage may be measured using the formula $(CTE_{coating} - CTE_{frit})/CTE_{frit} \times 100\%$.

Thermal Coefficient of Resistance (TCR)

Electrical resistivity (also known as resistivity, specific electrical resistance, or volume resistivity) is an intrinsic property that quantifies how strongly a given material opposes the flow of electric current. Resistivity is usually temperature dependent, and the relationship is known as the thermal coefficient of electrical resistance (TCR) (also known as temperature coefficient of resistivity and resistance temperature coefficient). For pure metals, the temperature coefficient of resistance is positive, meaning that resistance increases with increasing temperature. For the elements silicon and germanium, this coefficient is a negative number, meaning that resistance decreases with increasing temperature. Electrothermic compositions having a TCR of about zero, meaning that the resistance hardly changes at all with variations in temperature, may show electrical stability over extended time periods and tend to avoid thermal "run away".

In some embodiments of the invention, the TCR of the glass coating is positive. In some embodiments of the invention, the TCR of the glass coating is negative. TCR values of the coatings may vary across the temperature range of between 0 and 800° C., or between 100 and 650° C., or between 300 and 550° C. by up to 15%, or by up to 10%, or by up to 5%, or by up to 2% in either the positive or negative direction. In other words, the TCR of the coatings may vary by less than about 15% across the operating temperature range of the coating, or by less than 10%, or 5%.

In some embodiments of the invention, the TCR of the glass coating is about zero. In this context, "about zero" means that the TCR is $0\pm(1.0-2.0\times10^{-5})$ per ° C., $0+(1.0-5.0\times10^{-5})$ per ° C., $0\pm(5.0-7.5\times10^{-5})$ per ° C., $0\pm(1.0\times10^{-5}-1.5\times10^{-4})$ per ° C., $0\pm(1.0-1.5\times10^{-4})$ per ° C., $0\pm(1.0-1.5\times10^{-4})$ per ° C., $0\pm(1.5-3.0\times10^{-4})$ per ° C., $0\pm(3.0-5.0\times10^{-4})$ per ° C., $0+(3.0-9.0\times10^{-4})$ per ° C., $0\pm(5.0-9.0\times10^{-4})$ per ° C., $0\pm(1.0-1.5\times10^{-3})$ per ° C., or $0\pm(1.5-3.0\times10^{-3})$ per ° C., or $0\pm(1.0\times10^{-4}-1.0\times10^{-3})$ per ° C., e.g., the TCR is $0\pm0.00001$ per ° C., $0\pm0.00005$ per ° C., $0\pm0.000075$ per ° C., $0\pm0.00010$ per ° C., $0\pm0.00015$ per ° C., $0\pm0.0002$ per ° C., or $0\pm0.0003$ per ° C., $0\pm0.0005$ per ° C., $0\pm0.0009$ per ° C., $0\pm0.001$ per ° C., or $0\pm0.003$ per ° C.

The TCR of the glass coating described herein may be about zero over the temperature range 25 to 75° C., 50 to 100° C., 100 to 300° C., 150 to 300° C., 150 to 400° C., 200 to 300° C., 200 to 400° C., 200 to 500° C., 250 to 400° C., 250 to 500° C., or 300 to 500° C. in an airborne environment. Preferably, the TCR of the glass coating described herein is about zero over the temperature range 200° C. to 550° C. in an airborne environment. However, the TCR may be about zero in a temperature range of from about 200° C. up to about 800, 900, 1000 or 1200° C. in a non-airborne environment. Other ranges will be apparent to the skilled person.

The TCR of a glass coating as described herein may be measured by any suitable means known to a person skilled in the art. For example, it may be calculated by measuring the resistivity values of a coating having a known cross-sectional area as a function of temperature over a particular temperature range (e.g., 25 to 125° C., 100 to 300° C. etc.). Apparatus for measuring resistivity and for calculating TCR of a sample of given geometry will be known to persons skilled in the art, and may include using an ammeter to measure current flowing across a sample when a fixed voltage is applied. The TCR may be constant at every temperature in a given temperature range (i.e., the resistance may vary linearly with temperature) or the TCR may vary with temperature (i.e., the resistance may vary non-linearly with temperature) provided that the TCR is about zero at each temperature in the temperature range (where "about zero" is as defined in this section).

The TCR of glass coatings as described herein may be tuned by selection of the carbon components in the coating, e.g., their electrical properties. For example, use of a small surface area and large surface area carbon black together, or use of a carbon black in combination with graphite, may enable tuning of the TCR of the glass coatings described herein to about zero. Graphites used herein, for example, generally have a positive TCR.

Substrate

The present invention provides a composite product comprising a substrate having a electrothermic glass coating on a surface thereof. Any suitable substrate may be used. The substrate may consist of a single layer, e.g., of glass, or the substrate may be a composite material comprising two or more layers. Accordingly, as previously described, the glass coating of the invention may be applied to a single layered substrate, such as a piece of low thermal expansion glass or other glass, or the glass coating of the invention may be applied to the uppermost layer of a multi-layered substrate, e.g., an insulated metal substrate comprising a lowermost base layer of metal and an uppermost insulating glass layer.

The substrate may be or comprise an electrical conductor or may be or comprise an electrical insulator. Preferably, the substrate is an electrical insulator or comprises an uppermost electrical insulator layer. For example, in certain embodiments, the substrate comprises two or more layers, the uppermost layer (onto which the glass coating of the invention is applied) being an electrical insulator. In these embodiments, the lower layer(s) may be electrical insulators or electrical conductors. For example, the substrate may be a glass (including a glass-ceramic), a metal, an alloy, or a ceramic-based material. Glass, glass-ceramics and ceramic-based materials are generally electrical insulators. Metal and alloy substrates are generally electrical conductors.

For single layer substrates, the substrate is preferably a glass or glass ceramic. For multi-layer substrates, the substrate may comprise a lowermost or base layer of glass (including a glass-ceramic), metal, alloy, or ceramic-based material and one or more insulating glass layers uppermost.

The glass or glass ceramic substrate herein may be any suitable glass or glass ceramic. For example, it may be a low thermal expansion glass as discussed below, or another glass such as Pyrex®. In one embodiment, the substrate is glass or glass ceramic. In one preferred embodiment, the glass or glass ceramic is provided in the form of a panel. Any suitable glass or glass ceramic may be used, but preferably the glass or glass ceramic is a low thermal expansion glass or glass ceramic (i.e., a glass or glass ceramic having a CTE of about $0\pm1$ ppm·K$^{-1}$ between 25 and 200° C.). Some suitable low thermal expansion glasses or ceramic glasses are given in Table 9 with their approximate CTEs and relevant temperature ranges.

TABLE 9

Low thermal expansion glasses or ceramic glasses

| Product | CTE (ppm/K) | Temperature Range (° C.) |
|---|---|---|
| Ceran ® (Schott) | 0 ± 0.15 | 20-700 |
| Nextrema ® (Schott) | −0.8--0.6 | −50-100 |
| | −0.4--0.9 | 20-300 |
| | 0.1-1.6 | 300-700 |

TABLE 9-continued

Low thermal expansion glasses or ceramic glasses

| Product | CTE (ppm/K) | Temperature Range (° C.) |
|---|---|---|
| Zerodur ® (Schott) | 0 ± 0.1 | 0-50 |
| Robax ® (Schott) | 0 ± 0.5 | 20-700 |
|  | 0.28 | 38-1292 |
| Pyroceram ® (Corning) | 0 ± 0.3 | 20-700 |
| Neoceram (Corning) | −0.65 | 0-50 |
|  | −0.6 | 30-380 |
| FireLite ® (TPG) | −0.3 | 30-750 |
| Keralite ® (Corning) | −0.4 | 0-50 |
|  | 0 ± 0.3 | 20-700 |

The substrate may therefore be Ceran® (Schott), Nextrema® (Schott), Robax® (Schott), Zerodur® (Schott), Pyroceram® (Corning), Neoceram (Corning), FireLite® (TPG), or Keralite® (Corning), or any other suitable heat-resistant glass or ceramic substrate. The substrate may be selected from the group consisting of Ceran® (Schott), Nextrema® (Schott), Robax® (Schott), Zerodur® (Schott), Pyroceram® (Corning), Neoceram (Corning), FireLite® (TPG), and Keralite® (Corning). The substrate may be selected from the group consisting of Ceran® (Schott), Nextrema® (Schott), and Robax® (Schott). The substrate may be Ceran® (Schott). The substrate may be Nextrema® (Schott). The substrate may be Robax® (Schott).

The substrate may be a glass or glass ceramic having a CTE of about 0±1 ppm·K$^{-1}$ between 20 and 700° C. The substrate may be a glass or glass ceramic having a CTE of about 0±1 ppm·K$^{-1}$ between 20 and 300° C. The substrate may be a glass or glass ceramic having a CTE of about 0±2 ppm·K$^{-1}$ between 300 and 700° C. The substrate may be a glass or glass ceramic having a CTE of about 0±2 ppm·K$^{-1}$ between 40 and 1200° C.

The substrate may be a high temperature glass or glass ceramic, e.g., a glass or glass ceramic able to withstand temperatures of up to 950° C., or up to 800, 750 or 700° C., such as Nextrema®, Ceran®, Robax®, etc. The substrate may be a fused quartz-based glass ceramic, such as those listed in Table 9. It will be understood that many commercially available low thermal expansion glasses are high temperature glasses having a fused-quartz-based composition.

In one embodiment the substrate is Robax® (Schott). Robax® has a density of approx. 2.6 g/cm$^3$ (at 25° C.), a bending strength approx. 35 MPa and displays resistance to thermal gradients (RTG), which measures how well a material can resist temperature differences within a defined area, e.g. the temperature difference between the hot area in the centre of a panel and the cold edge area (room temperature). Robax® also has resistance to thermal shock (RTS), and when hot, is able to withstand a sudden thermal shock by cold water (15° C.). No breakage caused by thermal stress occurs at a maximum temperature of Tmax≤700° C. A composite material of the invention, which comprises a Robax® substrate and a glass coating of the invention, displays substantially equivalent properties as Robax® itself.

In other embodiments, the substrate is a multi-layer substrate comprising an insulating glass layer uppermost disposed on an electrically insulating or on an electrically conductive base layer lowermost. For example, the substrate may be an insulating glass layer disposed on a glass (or glass-ceramic) as described above. Alternatively, the substrate may be one or more insulating glass layer(s) disposed on a metal, alloy, or a ceramic-based material layer. In one embodiment, the substrate is an insulating glass layer disposed on a glass (including glass-ceramic) layer. In another embodiment, the substrate is an insulating glass layer disposed on a metal or alloy layer. In a further embodiment, the substrate is an insulating glass layer disposed on another insulating glass layer disposed on a metal or alloy layer.

The metal or alloy layer may be any suitable metal or alloy. For example, the metal or alloy may be steel, brass, bronze, copper, iron, or aluminium, stainless steel, chromium steel, chrome, or nickel, zinc, silver, or an oxide of nickel, zinc, or silver.

The insulating glass layer (applied to either a conductive or non-conductive base layer) may be any suitable insulating glass layer. The intermediate insulating glass layer is an electrical insulator and may also have thermal insulating properties. For the avoidance of doubt, the insulating glass layers described herein are devoid of a carbon component. The term "groundcoat" as used herein refers to the insulating glass layer applied directly to the base of the substrate (e.g., metal or glass). Preferably, it is a glass enamel product marketed specifically for use on a certain metal or alloy, meaning it has an appropriate chemical composition and physical properties (such as CTE) to enable it to adhere or fuse to that metal or alloy surface. Although such enamel glass products will be known to persons of skill in the art, products such as sold by Ferro® under the trade name CS117 as suitable for application to stainless steel substrates are suitable in particular for stainless steel. Such products may also be suitable for glass or glass-ceramic base layers, e.g., the present inventor has found that products such as sold by Ferro® under the trade name CS117 as suitable for application to stainless steel substrates are also suitable for application to low thermal expansion glass or glass-ceramic substrate bases. The composition of CS117 is shown in Table 15 below.

TABLE 15

Ferro ® CS117 insulating glass layer frit

| | |
|---|---|
| Nature: | Inorganic chemical product similar to alkali boron silicate |
| Type: | White Titanium enamel |
| Properties: | RTU Acid resistant |
| Substrate: | Normal steel |
| Pretreatment: | Groundcoated steel |
| Application: | 400 g/m$^2$ |
| Firing: | 820° C. |
| Water | 45% |
| Sieving: | 60 Mesh |
| Specific gravity: | 1.70-1.74 g/ml |
| CTE (approx.) at 50° C. | 10 × 10$^{-6}$ K$^{-1}$ |

Another suitable insulating glass composition is shown in Table 16.

TABLE 16

MS 336ec groundcoat insulating glass layer frit

| | |
|---|---|
| Nature: | Inorganic chemical product similar to alkali boron silicate |
| Type: | Ready To Use-AR Blue Covercoat for chemical vessels; Vitreous structure; Supplied as a blue powder |
| Substrate: | Stainless steel |
| Mixing | Stir for 20 minutes Powder 1000 g Demineralised Water 380 g |

TABLE 16-continued

MS 336ec groundcoat insulating glass layer frit

| | |
|---|---|
| Pick up (2 sides) | 950 g/m² ± 150 |
| Application | Wet spraying on fired groundcoat Weight cover coat = 500 g/m² (wet) on one side |
| Firing: | 830° C.-840° C. |
| Sieving: | 60 Mesh |
| Specific gravity: | 1.74 ± 0.02 |

Another suitable insulating glass composition which is clear is shown in Table 17.

TABLE 17

Clear TS 107810 clear insulating glass layer frit

| | |
|---|---|
| Nature: | ZnO•B$_2$O$_3$•SiO$_2$ |
| Type: | Ready To Use-TS Clear Cover coat for chemical vessels; Vitreous structure; Supplied as a white powder |
| Substrate: | Glass and cover coat for stainless steel; steel |
| Mixing | Stir for 20 minutes Powder 1000 g Demineralised Water 380 g |
| Application | 950 g/m² ± 150 Wet spraying on fired groundcoat Weight cover coat = 500 g/m² (wet) on one side |
| Firing: | 850° C.-890° C. |
| Sieving: | 60 Mesh |
| Specific gravity: | 1.94 ± 0.02 |
| CTE (approx.) at 50° C. | 85-95 × 10$^{-7}$ K$^{-1}$ |

Where a glass coating according to the invention is coated on one or more insulating glass layers sandwiched between the base layer of the substrate and the glass coating, the intermediate insulating glass layers can have varying thicknesses and compositions to suit the final composite material. For example, the intermediate insulating glass layer can be pigmented. In another example, the intermediate insulating glass layer can include additives which toughen the overall composite.

In some embodiments, there may be a single layer of insulating glass coating on the base layer of the substrate. In other embodiments, there may be two or more layers of insulating glass coating applied sequentially on the base layer of the substrate, e.g., two layers of insulating glass, or three layers, or four layers, or five layers, or up to 10 layers, or between 1 and 5 layers, or between 1 and 3 layers, or between 2 and 4 layers etc. Each layer is preferably made from the same insulating glass frit. However, different glass frit layers may be used in some embodiments provided they are chemically and physically compatible. As the number of layers of insulating glass increase, the greater the insulative performance of the collective insulating glass layers. Accordingly, in some embodiments, a single layer of insulating glass may be applied to low or non-conductive base layers of the substrate, e.g., those made of glass or glass ceramic. In other embodiments, multiple layers of insulating glass may be applied to conductive base layers of the substrate, e.g., those made of metal or alloy, such that the glass coatings of the invention are effectively insulated from the metal or alloy surface and arcing is prevented. It will be appreciated that some metals may require more layers of insulating glass in order to ensure the glass coatings of the invention are effectively insulated from the metal or alloy surface and arcing is prevented. Typically, 1 to 3 layers of insulating glass is effective to prevent arcing from substrate base layers such as stainless steel.

The composites of the invention may find particular use in, for example, barbeque (BBQ) hot plates. In this example, the BBQ can be fitted with composite electrothermic heating plates instead of heavy steel plates which are heated from below by burning wood or a gas flame. Other examples include industrial kitchens and BBQs at recreational parks. These composites are easier to clean and maintain and are more cost effective than conventional BBQs.

Where there are one or more intermediate layer(s) of insulating glass sandwiched between the substrate base and the electrothermic glass coating of the invention, and where the CTE of the substrate and the glass coating of the invention are very different, the intermediate layer(s) of glass may be formulated to have different CTEs such that there is a CTE profile between the substrate base and the coating. In this example it may be difficult to formulate the coating to have a CTE which matches the substrate, but the one or more glass layers having intermediate CTEs can be used as a 'bridge'.

The substrate as described herein may take any suitable three-dimensional shape. For example, the substrate may be flat or substantially flat, such as being in the form of a panel or shallow prism. The panel may have any suitable shape, such as square, rectangular, trapezoidal, triangular, regular or irregular polygonal, circular, etc. Alternatively, the substrate may be curved, e.g., be provided in the form of a curved panel or prism. The substrate may be in the form of a grill.

The substrate may have any suitable dimensions. For example, the substrate may have a thickness (i.e., in cross-section) of about greater than about 2 mm, greater than about 5 mm, greater than about 7.5 mm, greater than about 10 mm, greater than about 20 mm, greater than about 50 mm, greater than about 100 mm, or between about 2 and about 10 mm, or between about 5 and about 10 mm, or between about 4 and about 7 mm, or between about 20 and 60 mm, or between about 50 and 100 mm, or a thickness of about 2, 3, 4, 5, 6, 7, 8, 9, or 10 mm, or of about 12, 15, 17, 20, 25, 30, 40, 50, 60, 70, 80, 90 or 100 mm. This thickness may be the thickness of the substrate (single layer), or the thickness of the substrate (multi-layer), or the thickness of any one individual layer within a multi-layer substrate structure. In some embodiments, the thickness of the low thermal expansion glass substrate is between about 4 and 6 mm.

Electrothermic Composite Material

The composite material may be over-coated with a layer of non-electrically conductive glass to form a tough exterior layer which is, for example, scratch resistant. The overcoat may be further covered by a non-electrically conductive panel or protective sheet. The overcoat and/or panel are preferably adequately thermally conductive so as to allow transmission of heat from the glass coatings of the invention to the environment.

The glass coatings and composite materials may be activated by application of electrodes to the glass coating. Persons skilled in the art will be aware of suitable means for attaching electrodes to the glass coating such that current flows through the coating and elicits an electrothermic response in the coating. For example, suitable bus-bars may be coated or applied to mutually opposed sides or edges of the substrate, such that the glass coating is applied to the substrate and in electrical communication with the bus-bars. However, as described earlier, there are other methods of activating the glass coatings of the invention.

The glass coating described herein and/or the electrothermic composite material described herein, may be capable of reaching temperatures of up to 2000° C., e.g., at least 1500°

C., at least 1400° C., at least 1300° C., at least 1200° C., at least 1100° C., at least 100° C., at least 900° C., at least 800° C., at least 700° C., at least 600° C., at least 500° C., at least 400° C., at least 300° C., at least 200° C., or at least 100° C., e.g., may be capable of reaching between 100 and 400° C., or between 250 and 400° C., or between 150 and 300° C., or between 100 and 250° C., or between 300 and 450° C., or between 100 and 650° C., or between 100 and 600° C., or between 300 and 800° C., or between 700 and 1500° C., or between 1000 and 1300° C., or between 1200 and 1500° C., or between 1000 and 2000° C., e.g., may be capable of reaching 100, 150, 200, 250, 300, 350, 400, 450, 500, 600, 700, 800, 900, 1000, 1100, 1200, 1300, 1400 or 1500° C. or higher. It will be appreciated that temperatures of up to about 700° C. may be achieved in air, and that temperatures of up to about 1500° C. or 2000° C. may be achieved in an inert atmosphere. It will also be appreciated that glass coatings devoid of graphite (i.e., embodiments where the carbon component is a mixture of two or more different carbon blacks only) cannot be heated above about 600° C. in an airborne environment. Glass coatings containing graphite are suitable for heating above 600° C. The glass coating described herein and/or the electrothermic composite material described herein, may be capable of sustaining these temperatures for a period of greater than 5 min, 10 min, 30 min, 45 min, 1 h, 2 h, 5 h, 10 h, 24 h, 2 days, 5 days, 14 days, a month, 6 months or 12 months without decrease in thermal output, or with less than 5%, or less than 10% decrease in thermal output. For example, the glass coating described herein and/or the electrothermic composite material described herein, may be capable of sustaining a temperature of up to 600° C. for a period of greater than 24 h without decrease in thermal output, or with less than 5%, or less than 10% decrease in thermal output. The glass coating described herein and/or electrothermic composite material described herein preferably resists electrical arcing when metallic cookware is placed on it.

The glass coating described herein and/or the electrothermic composite material described herein may be capable of being cycled between heating to a temperature of at least 250° C., optionally of at least 400° C., and cooling back to room temperature (25° C.) at least 5 times, or at least 10 times, or at least 25 times, or at least 50 times, or at least 75 times, or at least 100 times, without decrease in thermal output, or with less than 10%, optionally less than 5%, optionally less than 2% decrease in thermal output. The glass coating described herein and/or the electrothermic composite material described herein may be capable of being cycled between heating to a temperature of at least 250° C., optionally of at least 400° C., and cooling back to room temperature (25° C.) at least 5 times, or at least 10 times, or at least 25 times, or at least 50 times, or at least 75 times, or at least 100 times, without delaminating from the substrate or showing any signs of thermal fatigue. In this context, signs of thermal fatigue may include cracking, peeling, and/or delamination. In this context, thermal output may be the heat released (i.e., temperature achieved) by the coating under the same applied voltage.

The composite herein is preferably able to operate across a service temperature range of between 100 and 900° C. Without wishing to be bound by theory, the inventor understands that graphite introduced to the glass frit changes the crossover temperature and creating a crystalline pathway within the glass frit mechanism that leads to product longevity under operational stress at these temperatures.

The volume resistivity of the electrothermic composite material described herein may be between about 1 and $2.5 \times 10^8$ Ω·cm, or between about 1.5 and $2.0 \times 10^8$ Ω·cm, or between about 1.6 and $1.8 \times 10^8$ Ω·cm, or greater than about $1 \times 10^8$ Ω·cm, greater than about $1.25 \times 10^8$ Ω·cm, greater than about $1.5 \times 10^8$ Ω·cm, greater than about $1.75 \times 10^8$ Ω·cm or greater than about $2 \times 10^8$ Ω·cm, e.g., about 1, 1.2, 1.4, 1.6, 1.8, 2.0, 2.2, or 2.4 Ω·cm.

Manufacture

Disclosed herein is a method of preparing a glass coating composition for firing into an electrothermic glass coating, the method comprising the steps of:

selecting a carbon component; and preparing the coating composition by mixing the carbon component in a suitable glass frit, wherein the carbon component, the glass frit, and their relative concentrations are selected such that the glass coating is electrically conductive and electrothermic.

The mixing may be effected by any suitable means. However, suitable dispersion of the carbon component in the glass frit may be obtained by mixing in an industrial mixer at initial speeds of up to 300, 400, 500, 600, 700 or 800 rpm for at least 1 min, 2 min, 3 min, 4 min, 5 min or 6 min. Further mixing may be effected at speeds of up to 2000 rpm, or 1800 rpm, or 1600 rpm, or 1500 rpm, or 1400 rpm, or 1200 rpm for a period of at least 2 min, 3 min, 4 min, 6 min, 7 min, or up to 10 min. Alternatively, a three roll mill may be used to mix the carbon component and glass frit together. A vehicle and/or rheology modifying oil may be added to assist dispersion of the carbon component in the glass. In some embodiments, the carbon component and glass frit (and optionally vehicle/rheology modifying oil) are mixed to produce a homogeneous mixture. In some embodiments, the carbon component is homogeneously dispersed in glass frit.

In one embodiment, the carbon component, the glass frit, and their relative concentrations are selected such that the glass coating has a TCR of about zero between 25 and 350° C. In one embodiment, the carbon component, the glass frit, and their relative concentrations are selected such that the glass coating has a CTE of about 7-10 ppm/K between 25 and 350° C.

Described herein is a method for making a composite material, the method comprising the steps of:

combining a carbon component a glass frit to produce a glass coating composition;

applying the glass coating composition to a substrate; and firing the glass coating composition to produce an electrothermic glass coating on the substrate, wherein the glass frit, the carbon component, and their relative concentrations are selected such that the electrothermic glass coating resists delamination from the substrate over repeated electrical heating and cooling cycles.

In one embodiment the method comprises combining, on a solids basis, 1-65 wt % of a carbon component and 35-99 wt % of a glass frit to produce the glass coating composition. In one embodiment, the repeated electrical heating and cooling cycles are between room temperature (25° C.) and up to 200, or 250, or 300 or 350° C.

In one embodiment, the method further comprises the step of applying electrodes to the substrate. In such embodiments, the glass coating composition is applied so as to be in electrical contact with the electrodes. In one embodiment, the method further comprises the step of applying electrodes to the glass coating. In such embodiments, the electrodes are applied so as to be in electrical contact with the glass coating. In one embodiment, the substrate comprises a non-conductive glass layer. In another embodiment, the substrate is a non-conductive glass substrate. In preferred embodiments, the electrodes are applied directly onto a non-conductive glass substrate and then the glass coating composition is applied so as to be in electrical contact with the electrodes and in contact with the substrate.

Also disclosed herein is a method of preparing an electrothermic composite material comprising the steps of:
combining a glass coating composition of the invention with a viscosity modifier;
applying the resultant mixture to a substrate to form a coating, film or layer thereon; and
applying suitable firing conditions to substantially melt the glass coating composition to form a glass coating on the substrate.

Further disclosed herein is a method of preparing an electrothermic composite material comprising the steps of:
providing a base layer;
applying an insulating glass composition to the base layer form a coating, film or layer thereon, wherein the insulating glass composition comprises a glass frit and is devoid of a carbon component;
applying suitable firing conditions to substantially melt the insulating glass
composition to form an insulating glass layer, thereby forming a two-layered substrate;
combining a glass frit and a carbon component;
applying the resultant mixture to the two-layered substrate to form a coating, film or layer thereon; and
applying suitable firing conditions to substantially melt the glass coating composition to the glass layer to form a glass coating.

In this method, the base layer may be a metal or alloy. For example, the base layer may be iron, steel, stainless steel or aluminium. The insulating glass layer may be as described in the above section entitled "Glass frit". The substrate may be as described in the section entitled "Substrate". It will be appreciated that further insulating glass composition layers may be added to the substrate (thereby forming three-, four-, five-, etc. layered substrates) prior to applying a glass coating composition of the invention by repeating the steps of applying an insulating glass composition layer to form a coating, film or layer and applying suitable firing conditions to substantially melt the insulating glass composition to form further insulating glass layers.

It will also be appreciated that electrodes may be applied to the glass coating either prior to applying the glass coating composition of the invention, or after applying the glass coating composition of the invention, provided that the electrodes are in electrical contact with the glass coating of the invention. For example, suitable bus-bars may be coated or applied to mutually opposed sides or edges of the substrate either immediately before or immediately after application of a glass coating according to the invention, such that the glass coating is applied to the substrate and is in electrical communication with the bus-bars.

Described herein is a method for making an electrothermic composite material, the method comprising the steps of:
providing a substrate having a first coefficient of thermal expansion (CTE);
applying a glass coating composition of the invention to the substrate;
firing the glass coating composition to thereby produce said glass coating on the substrate, wherein the glass coating has a second CTE; and
wherein the second CTE is within about 10 ppm/K of the first CTE between 25 and 400° C. Optionally, the glass coating composition comprises a carbon component selected such that that the TCR of the glass coating is about zero between 25 and 350° C.

In one embodiment, the present invention relates to matching the CTE of an electrothermic glass layer with a substrate. The matching which is undertaken ensures that the CTE of the substrate and the electrothermic layer are in the same range. The skilled person will appreciate that due to the presence of a carbon component in the glass coatings of the invention, there can be some variation of the respective CTEs of the electrothermic layer and the substrate such that they need not be identical. In this regard, if the CTE of the substrate and the electrothermic layer are within about 15 ppm/K, or more preferably within 10 ppm/K, they may be effectively "matched" and sufficiently compatible.

The glass coating may be applied to the substrate in the methods described herein using any suitable apparatus. For example, the glass coating may be screen printed on the substrate, or may be applied by roller brush. For example, when thinned to a viscosity of 6-10 Pa·s (at 20° C., shear rate D=200 $s^{-1}$, plate cone system), the glass coating composition may be screen printed onto a substrate. Printing may be effected with any suitable screen printing mesh, but preferably, polyester screens having mesh sizes of 32, 43, 48, or 77 may be used for achieving wet-film thicknesses of 40-25 μm. When thinned to a viscosity of 90-120 s with a 6 mm DIN Cup (20-25° C.), the glass coating composition may be roller coated onto a substrate. Roller coating with 16-24 grooves per inch generally results in a wet-film thickness of 130-80 μm.

The glass coating may be applied to the substrate in a single layer or in multiple layers, e.g., two or more layers of a glass coating, either identical or different glass coatings according to the present invention. Accordingly, in one embodiment, there are a plurality of glass coatings on the substrate coated in a stacked configuration. In embodiments where there are multiple layers of the glass coating on the substrate, it will be appreciated that the overall conductivity increases as further layers are added, and therefore the thermal properties of the electrothermic composite of the invention can be tailored to suit the requirements.

The glass coating may cover the entire surface of a substrate, or may cover a substrate surface only in part. In some embodiments, the glass coating may be patterned on the substrate to form, say, circular arrangements which are sized to suit a cooking utensil (e.g., pan or pot).

The glass coating composition may be applied to the substrate at any suitable thickness. For example, the glass coating composition may be applied to the substrate at a thickness of between about 10 μm and 2000 μm, e.g., between 10 and 50, or between 25 and 35, or between 30 and 50, or between 25 and 50, or between 35 and 60, or between 40 and 75, or between 50 and 100, or between 60 and 85, or between 75 and 90, or between 80 and 100, or between 100 and 200 μm, or between 200 and 500 μm, or between 500 and 1000 μm, or between 1000 and 2000 μm, e.g., of 10, 20, 50, 75, 100, 150, 200, 250, 300, 350, 400, 500, 600, 700, 800, 900, 1000, 1500, or 2000 μm. The glass coating composition may be applied at the aforementioned thicknesses multiple times, e.g., once, twice, three times, five times, etc. to build up the desired thickness of the glass coating. In other embodiments, the glass coating composition is 3, 4, 5, 6, 7 8 9, or 10 mm thick. In other embodiments, the glass coating is applied such that it has a differential thickness across the surface, which may be one or more step changes in thickness, or a gradual change.

The glass coating composition can be applied to a substrate and fired or melted in situ to form a glass coating. For example, the glass coating composition may be applied to a substrate, preferably in a layer of uniform thickness and then dried and fired. Alternatively, pre-formed sheets of coating may be adhered to a desired substrate, e.g., by enamelling the coating to the substrate.

As used herein, the terms "fire", "firing" and "melt" or "melting" are taken to refer to the application of heat to the glass coating composition in order to melt the glass and form a glass coating.

The glass coating compositions may be fired at a temperature for a suitable period to effect annealing of the frit and formation of a glass coating. Firing conditions are well known to persons skilled in the art of such materials. For example, suitable glazing and firing temperature profiles for the glass frits described in this section are presented in FIGS. 1-3.

Typically, the glass coating composition will be applied to a substrate and dried at a temperature of between about 120 and 150° C. in air, e.g., of between 120 and 130° C., or between 125 and 135° C., or between 130 and 145° C., or between 135 and 150° C., or of 120, 125, 130, 135, 140, 145 or 150° C. in air. The drying step advantageously drives off volatile rheology modifiers/vehicles. The drying step may take up to 2 h, 1.5 h, 1 h, 0.5 h or 0.25 h.

Once dried, the glass coating composition may then be fired at temperatures of between about 600 and 750° C. in air, e.g., between 600 and 650° C., or between 625 and 675° C., or between 650 and 750° C., or between 700 and 750° C., e.g., 600, 625, 650, 675, 700, 725 or 750° C. in air. However, firing temperatures of between 600 and 900° C. in air may be suitable in some embodiments, e.g., between 600 and 750° C., or between 725 and 875° C., or between 750 and 900° C., or between 800 and 900° C., e.g., 600, 650, 700, 750, 800, 850, or 900° C. in air. Alternatively, firing temperatures of between about 100 to 2500° C. may be used in a reduced atmosphere kiln with injection of one or more inert gases such as nitrogen or argon (or a mixture of inert gases), e.g., between 100 and 500° C., or between 300 and 800° C., or between 500 and 1500° C., or between 1000 and 2000° C., or between 1500 and 2500° C., e.g., 100, 200, 300, 400, 500, 600, 700, 800, 900, 1000, 1250, 1500, 1750, 2000, 2250 or 2500° C. in a reduced atmosphere kiln with injection of one or more inert gases such as nitrogen or argon (or a mixture of inert gases). Where an inert gas is introduced into the kiln, the gas (or mixture of gases) may be introduced when the kiln is at between 650 and 1500° C. Alternatively, the glass coating composition may be fired under inert atmosphere conditions by encapsulating the composite material in a sealed heat resistant vessel, such as a quartz tube. Such composite materials may remain encased in the sealed heat resistant vessel in use, such that temperatures above 1000° C., or above 1500° C., may be reached by the composite without being susceptible to combustion.

The firing temperature may be reached gradually, such as by ramping the temperature up at a rate of between about 8 and 14° C./min, or between 8 and 10, or between 10 and 12, or between 9 and 13° C./min, or at a rate of 8, 9, 10, 11, 12, 13 or 14° C./min. The maximum firing temperature may be held for any suitable time, e.g., up to 30 min, 25 min, 20 min, 15 min, 10 min, 5 min, 3 min or 1 min, or between 1 and 10 min, or between 3 and 5 min, or between 5 and 15 min. The fired glass coating may then be cooled by any suitable means, e.g., by removing the composite material from the kiln or oven and allowing it to cool to 25° C., 50° C., 100° C., or 125° C., etc. over a period of up to 2 h, 1.5 h, 1 h, 0.75 h, 0.5 h or 0.25 h.

Any suitable kiln or oven may be used to fire the glass coating composition, e.g., a gas or electric, muffle or open flame, or tunnel or intermittent kiln or over. The kiln atmosphere may be any suitable atmosphere, e.g., oxidising, reducing, neutral. Preferably the firing is done in an air atmosphere.

Described herein is a method for determining whether a carbon component is suitable for use in an electrothermic glass coating composition for applying to a glass substrate, the glass coating having a TCR of about zero between 25 and 350° C. or a CTE of within about 10 ppm/K of the CTE of the glass substrate between 25 and 350° C., or both, the method comprising the steps of:

preparing a glass coating composition comprising a carbon component and a glass frit;

determining the thermal coefficient of electrical resistance (TCR) and/or the coefficient of thermal expansion (CTE) of a glass coating formed upon firing the composition; and adjusting the concentration of and/or varying the type of carbon component and/or its concentration in the glass coating composition, and/or adjusting the concentration and/or type of glass frit, such that that the glass coating has a TCR of about zero between 25 and 350° C. and has a coefficient of thermal expansion (CTE) within 10 ppm/K of the CTE of a target glass substrate between 25 and 350° C.

Using the above method, the invention enables a glass coating to be formulated by an iterative process such that it has a TCR of about zero between 25 and 350° C. and/or a coefficient of thermal expansion (CTE) within 10 ppm/K of the CTE of a target substrate between 25 and 350° C. Accordingly, the invention enables composite materials to be produced which have glass coatings having tuneable and tailored TCR and/or CTE values. Preferably the glass coating does not substantially break down or thermally degrade when subjected to an electrical potential.

Relatedly, described herein is a method for determining whether a carbon component is suitable for use in an electrothermic glass coating composition for applying to a glass substrate, the glass coating resisting delamination from the substrate over repeated electrical heating and cooling cycles, the method comprising the steps of:

preparing a glass coating composition comprising a carbon component and a glass frit;

repeatedly heating and cooling the composite to determine its thermal stability; and adjusting the concentration of and/or varying the type of carbon component and/or its concentration in the glass coating composition, and/or adjusting the concentration and/or type of glass frit, such that that the glass coating resists delamination from the substrate over repeated electrical heating and cooling cycles.

In one embodiment of the methods described herein, the glass frit is produced by the following method: forming a conductive frit composition by mixing a carbon component as described herein in the section entitled "Carbon component" and a glass frit as described in the section herein entitled "Glass frit"; applying suitable firing conditions to substantially melt the conductive frit composition to form a glass intermediate; and, grinding the glass intermediate into a conductive glass frit. This conductive glass frit may be used in place of the glass frit herein in any suitable proportion, e.g., in a ratio of glass frit (devoid of carbon):conductive glass frit of 10:90, 20:80, 30:70, 40:60, 50:50, 60:40, 70:30, 80:20 or 90:10, or between 60:40 and 40:60.

Methods and Uses

The present invention provides for use of the electrothermic composite material as described herein as a heating element.

Accordingly, the present invention provides a method for generating heat, the method comprising the steps of:
- (a) providing a composite material comprising: an electrothermic layer on a substrate, wherein the electrothermic layer comprises glass having a carbon component dispersed throughout;
- (b) attaching electrodes to said glass coating;
- (c) connecting said electrodes to a source of electricity; and
- (d) energizing said source of electricity, thereby generating heat from said glass coating, wherein the glass, the carbon component, and their relative concentrations are selected such that the electrothermic layer resists delamination from the substrate over repeated electrical heating and cooling cycles.

In some embodiments, the carbon component and/or glass frit are selected such that that the glass coating has a thermal coefficient of electrical resistance (TCR) of about zero between 25 and 350° C. and/or has a coefficient of thermal expansion (CTE) within 10 ppm/K of the CTE of the substrate between 25 and 350° C.

In relation to the above method, preferably at an applied voltage and current, the heat generated from the glass coating is substantially constant over time. The time period can be selected from weeks, months and years. Preferably the time is greater than 8, 9, 10, 15, 20, 25, 30, 35, 40, 45, or 50 weeks. In other embodiments the time is up to 3, 4, 5, 6, 7, 8, 9, 10, 11 or 12 months, or can be up to 1, 2, 3, 4, 5, or 10 years. The electrical current can be DC or AC.

The inventor has surprisingly found that composites of the invention can be repeatedly heated and cooled without delaminating from the substrate or experiencing thermal fatigue. The inventor has surprisingly found that in some embodiments, composites of the invention can sustainably generate heat at elevated temperatures for extended periods of time without delaminating from the substrate or experiencing thermal fatigue.

The coatings of the invention may emit and transmit heat to the surroundings through radiant, conductive, connective heating processes or through combinations of same. Surroundings that are heated may include air, gases, fluids, and solids of any nature that are in the vicinity of the coatings. This includes the substrates onto which the coatings of the invention are coated, as well as any supporting structures associated therewith. The composite materials of the invention may be used in radiant, convective, and/or conductive heating applications and in the manufacture or assembly of devices for use in these applications. Accordingly, in a preferred embodiment, the composites of the invention are used in the manufacture and/or assembly of a heating device which utilises radiant, convective, or conductive heating means, or combinations of same.

The composites of the invention may be used in a wide variety of applications requiring generation of heat, such as, for example, heating of floors, walls, ceilings, roofs, and gutters. The composites of the invention may be used in radiant heat sources in industry, for example in industrial ovens, such as conveyor ovens, widely used in industry for drying, curing, baking, shrink packaging, etc., or in infra-red radiant space heaters designed to heat relatively large enclosed or open spaces, other radiant heaters, such as incubators, hospital, barn stall heaters, incubation cabinets for bacterial cultures, etc.

Alternatively, the electrothermic coatings of the invention may be used in as radiant heaters in household ovens or other household appliances, such as dishwashers and washing machines etc., in personal comfort heaters are designed for small space heating or conduction heating for individuals or a few objects. Other domestic application include, for example, sauna room heaters, hand dryers, hair dryers, cooking and restaurant appliances, including toasters, food warmers, griddles, electric frying pans, stoves and ovens, electric hot plates, grills and rotisseries and steam table warmers, or in slow heating devices such as water tanks. Preferably, the composites of the invention are utilised as stovetops or BBQ hotplates. The electrothermic coatings of the invention can made into waterproof coatings that are suitable for applications involving water immersion without risk of material degradation or danger of electrical leakage or shock. Suitably, the materials can be used as immersion heating elements, and advantageously provide a low wattage density extended over a large area. Furthermore, in such applications, large bodies of water may be heated without local boiling or "hot spots", thereby obviating the need for circulating pumps. Thus the materials can be used as swimming pool or aquarium heaters, watering trough heaters, pond or lagoon heaters, and drainage ditch heaters.

The composites of the invention may also be used in the automotive or transport industries, where they may be mounted on rigid boards operable from either line current or battery power, or from an engine alternator directly or through a power converter, and can be used in a variety of forms to supply the required radiant heat for a particular application. This category may include under-engine or oil pan heaters, under-hood heaters, battery heaters, interior comfort heaters, and the like.

The composites of the invention may also find use in the renewable energy industry, in particular, to replace expensive silver paint on solar collectors.

The glass coatings of the invention, and/or composite materials comprising same, may have one or more of the following desirable properties: neutral thermal coefficient of resistance (TCR), voltage stability on application of AC or DC current, no thermal runaway or burn out, high performance electrical impendence properties, high heavy duty cycle degradation resistance, high resistance to moisture, heat, environmental, chemical and UV degradation, without loss or change to their electrical, mechanical, or physical, properties. Furthermore, they may be able to maintain constant resistance, voltage stability, and current drawn at any desired temperature in the range of from about from about −100° C. to about 1200° C. without experiencing any change their mechanical, physical, and electrical properties. It will be appreciated that for applications in which the composite of the present invention is designed to be held at elevated temperature for extended periods of time it is advantageous that the glass coating is formulated to have TCR of zero, or substantially zero. However, for applications in which the elevated temperature is only required for short periods of time (minutes, hours, days) the glass coating may not need to be formulated to have TCR of zero.

Solid State Device

Disclosed herein is an electrothermic heating device based on the glass coatings described herein that does not require application to a substrate. Such devices are formed from the same glass coating compositions of the invention as described herein; however, they are able to be moulded and fired as discrete units without being first applied to a substrate. In one embodiment, the solid unit can be applied to, or incorporated into, a substrate. Accordingly, disclosed herein is an electrothermic heating device comprising a glass having a carbon component dispersed throughout, such as a solid rod or tube.

EXAMPLES

Example 1A—Preparation of Glass Coating Composition (Graphite Only)

40 g of glass frit (zinc oxide borosilicate glass powder, GSGF white INT 19 4011 AL-6476, 76% solids; manufactured by Ferro) was added to a stainless steel beaker, to which was added 7 g of surface enhanced flake graphite (sold as product 5773 by Intelliparticle®). 24 g of a rheology modifying oil, such as pine oil (or the product sold as Ferro liquid medium 822) was then added to the resultant mixture and stirred at 400 rpm for 1 min to mix the graphite through. The mixing speed was then increased to 1500-1800 rpm and held for 5 min, then subsequently allowed to cool. After 3 hrs, the settled mixture was again stirred for 5 min at 1800 rpm or until the mixture had warmed to 50° C.

An alternative preparation utilised a clear (i.e., non-pigmented) glass frit—Clear 107813 or Clear TS 116660, manufactured by Ferro—in place of the INT 16 4011 product above.

Example 1B—Preparation of Glass Coating Composition (Graphite and Carbon)

40 g of glass frit (zinc oxide borosilicate glass powder, GSGF white INT 19 4011 AL-6476, 76% solids; manufactured by Ferro) was added to a stainless steel beaker, to which was added 6 g of surface enhanced flake graphite (sold as product 5773 by Intelliparticle®) and 1 g of carbon black (PRINTEX® XE2-B-ECB Conductive Carbon Black—sourced from http://www.thecarycompany.com) and having the following properties:

| PRINTEX ® XE2-B-ECB Carbon Black Properties | |
| --- | --- |
| Average particle size (nm) | 30 |
| BET (NSA) Surface Area (m$^2$/g) | 1000 |
| Oil absorption (mL/100 g) (range) | 420 (380-460) |
| pH (range) | 7.8 (6.3-9.3) |
| Iodine absorption number (g/kg) (range) | 1125 (1025-1225) |

The Iodine absorption number may be as measured by ASTM D1510. The pH may be as measured by ASTM D1512. The oil absorption number may be measured by ASTM D2414.

24 g of a rheology modifying oil, such as pine oil (or the product sold as Ferro liquid medium 822) was then added to the resultant mixture and stirred at 400 rpm for 1 min to mix the graphite and carbon through. The mixing speed was then increased to 1500-1800 rpm and held for 5 min, then subsequently allowed to cool. After 3 hrs, the settled mixture was again stirred for 5 min at 1800 rpm or until the mixture had warmed to 50° C.

An alternative preparation utilised a clear (i.e., non-pigmented) glass frit-zinc oxide borosilicate glass AU20180823-1 manufactured by Ferro—in place of the INT 16 4011 product above.

Example 1C—Preparation of Glass Coating Composition (Graphite and Carbon) (TCR Zero)

60 g of binder (Ferro clear frit 197661E) was added to a stainless steel beaker, to which was added 6 g of surface enhanced flake graphite (sold as product 5773 by Intelliparticle®) and 2.5 g of Printex® L6 conductive carbon black powder having the following properties: average particle size 18 nm, BET (NSA) surface area 270 m$^2$/g, oil absorption 126 ml/100 g (ASTM D2414) and 25 g of rheology modifying oil, such as pine oil (or the oil sold as Ferro® 801022ME). These components were mixed under low speed disperser at 800 rpm for 5 minutes or until warm. The paste was put through 3 roll mill for dispersion.

The resultant glass coating, when applied to a substrate and fired, had a resistance of 9Ω at room temperature. The composite was plugged in and heated to 350° C., and when measured hot, showed a resistance of 10.5Ω. The glass plate was then allowed to cool back to room temperature and the resistance was re-measured at ambient temperature 9Ω. The coating thus has a TCR of close to zero (~0.0005).

Example 1D—Preparation of Glass Coating Composition (Carbon and Carbon)

60 g of binder (Ferro clear frit AU20180823-1) was added to a stainless steel beaker, to which was added 3.5 g of thermal black (having a BET surface area of 13 m$^2$/g and a DBP absorption of 39 cm$^3$/100 g) and 2.5 g of Printex® L6 conductive carbon black powder having the following properties: average particle size 18 nm, BET (NSA) surface area 270 m$^2$/g, oil absorption 126 ml/100 g (ASTM D2414) and 25 g of rheology modifying oil, such as pine oil (or the oil sold as Ferro® 801022ME). These components were mixed under low speed disperser at 800 rpm for 5 minutes or until warm. The paste was put through 3 roll mill for dispersion.

The resultant glass coating, when applied to a substrate and fired, had a resistance of 35Ω at room temperature. The composite was plugged in and heated to 350° C. and when measured hot showed a resistance of 30.5 ohms. The glass plate was then allowed to cool back to room temperature and the resistance was 35Ω. The coating thus has a TCR of close to zero (~0.0004).

Example 2—Application and Firing of Glass Coating Composition

Conductive paste (CN37-801 or CN37-802 AgPdPt conductor paste, manufactured by Ferro) was applied to both sides of a glass sheet (e.g., Ceran® or Extrema® glass, manufactured by Schott) to act as electrodes. The resultant sheet was fired at 750° C., subsequently allowed to cool, then removed from the oven. A T 43 mesh screen was then used to screen print the conductive graphite paste from Example 1A or 1B, or a size 32 mesh was used to screen print a single coat of the paste from Example 1C or 1D, onto the glass and both electrodes, after which time the coated glass was placed into a preheated 150° C. (1A and 1B) or 80° C. (1C and 1D) oven for half an hour to drive off the rheology modifying oil. The temperature was then ramped up to 650° C. (1A and 1B) or 690° C. (1C and 1D) over a period of approximately 45 mins and the glass fired for 3 to 5 mins (1A and 1B) or 20 mins (1C and 1D), after which time the conductive glass element produced was allowed to cool to room temperature gradually inside the kiln.

Example 3—Performance of Glass Coating and Composite Materials

The an electrothermic composite material produced with the coating of Example 1A and the method of Example 2 was tested as follows. An Extrema® glass substrate (Schott)) was coated with a glass coating of the invention. Electrical current was applied to the coating (276 volts and a current of 2 amps) to produce a surface temperature of 510° C. A pot of water was placed in contact with the coating and water was brought to the boil. Separately, a steak was placed in contact with the coating which was cooked throughout in 5 minutes. No delamination or cracking of the glass coating from the glass substrate was found prior to, during, or after these experiments.

Similar results were observed for an identical example with a Ceran® glass substrate.

Performance of materials made according to Examples 1A-1D is shown in Table 18 below. The number of heating/cooling cycles reflects the number of times the composite material was heated to the maximum temperature, or a temperature of at least 100° C., and then cooled to room temperature, with no visible signs of deterioration:

|  | Sample | | | |
| --- | --- | --- | --- | --- |
|  | 1A | 1B | 1C | 1D |
| Glass coating thickness (μm) | 32 mesh | 32 mesh | 32 mesh | 32 mesh |
| Resistance at room temp. (Ω at 25° C.) | 35 | 27 | 6 | 1.9 |
| Maximum temp. of element (° C.) | 300 | 300 | 300 | 300 |
| Resistance at maximum temp. (Ω) | 30 | 23 | 5 | 1.5 |
| Number of heating/cooling cycles tested on Ceran ® (Schott) | 50 | 43 | 16 | 50 |
| Number of heating/cooling cycles tested on Nextrema ® (Schott) | 47 | 30 | 37 | 46 |
| Number of heating/cooling cycles tested on stainless steel (with insulating layer) | 20 | 15 | 22 | 10 |
| Number of heating/cooling cycles tested on ceramic tiles | 40 | 32 | 27 | 10 |

The coatings of the present invention are understood to be the first coatings able to be enamelled directly onto high temperature/low thermal expansion glasses such as Ceran® and Nextrema® and heated repeatedly, e.g., to above 220° C., and even above 1000° C., without observing any delamination (cracking, peeling) of the coating. Furthermore, no electrical leakage arc is observed for these composites in such embodiments (as per Example 4 below).

Example 4—Performance of Conductive Glass Element

A test was performed to ascertain the electrical strength and electrical leakage current of a composite according to the invention.

The test sample substrate was a clear glass ceramic sheet (Nextrema®, manufactured by Schott), proposed for use in a direct heating application for cooking purposes. The glass was enamelled directly on one side with a glass coating as per the invention, serving as a distributed heating "element". The glass coating was as per Example 1B and applied/fired as per Example 2 except that a 77 mesh screen was used (25 micron wet film thickness).

The sample assembly contained no switches, or accessible earthed parts apart from the cooking vessel, which was earthable only via a leakage path. To enable an electrical heating current to be applied to the heating area, two silver electrodes were laid down directly on the glass, extending the full length of the test sample, parallel to the length dimension. Electrical connection was made with spring-loaded clips to the bare silver at one end. The silver electrodes were 11 mm wide and uniform along their length.

Dimensions:
Overall glass: 475 mm×300 mm;
Glass thickness: 5 mm (nominal);
Enamelled effective element area: 450 mm×270 mm.

The Electrical Strength and Electric Leakage tests were based on the following standards: AS/NZS 60335.1-2011 (IEC 60335-1 Ed 5.2, MOD); and AS/NZS 60335.2.6-2014 (IEC 60225-2-6 Ed 6, MOD).

The glass sample was laid horizontally on four housebricks, above a wooden laboratory bench-top, with the heating side (electrothermic composition) facing the bench-top. The bricks were positioned so that they supported the glass at its long edges. The underside of the glass was spaced 110 mm above the wooden laboratory bench. A temporary steel heat reflector (95.5 cm×21 cm with internal glass-wool insulation) was positioned below the glass, supported independently, to maximise the heating rate to the required temperature. The top of the heat reflector was between 12 mm and 20 mm below the glass underside. The reflector was positioned centrally along the axis of the glass plate. The above arrangement was located inside a supply-interlocked, high-voltage test cage and not moved. The interlock facility was used for the high-voltage testing. All tests were in an air-conditioned laboratory (23±2° C.; 45±5% relative humidity).

A cooking vessel (steel saucepan, in near-new condition) was placed on the glass top. The thermal (and electrical) contact area with the glass was circular, with diameter 14.1 cm, hence forming an effective contact area of 156 cm². In accordance with Table 101 of IEC 60335-2-6, the diameter of the vessel implied an appropriate cooking zone between 145 mm and 190 mm diameter, so that 1.5 L of tap water was added to the vessel. The depth of the water was approximately 73 mm at the start of heating. A cover was used to partially shield steam from the high-voltage voltmeter's measuring device. The left-hand wall of the vessel was positioned 190 mm from the left-hand edge of the element and the outer vessel wall was 72 mm from the nearest glass edge and the facing vessel wall was 69 mm from the bottom edge of the glass.

The test sequence comprised the steps of:
(1) pre-heat cook top to bring water to boiling point;
(2) conduct Electrical Leakage test at (nominal) 115% of input power; and
(3) conduct Electrical Strength Test at (nominal) 3000 Vac rms, at 50 Hz, for 60 s duration.

Test currents and voltages were: sine wave form at a frequency of 50 Hz±0.2%.

Test Results—Pre-Heating

The water was brought to its boiling point. At the end of this period, the input voltage was measured to be 275 $V_{rms}$ and the input current was 5.1 $A_{rms}$. The input active power was 1402 W. The test supply voltage was derived from the local 50 Hz mains and controlled by a variable autotransformer. The voltage represented 115% of a nominal 240 V mains voltage.

Electrical Leakage Current Test (IEC 60335-1 and IEC 60335-2-6, Clauses 13)

Figure 1:
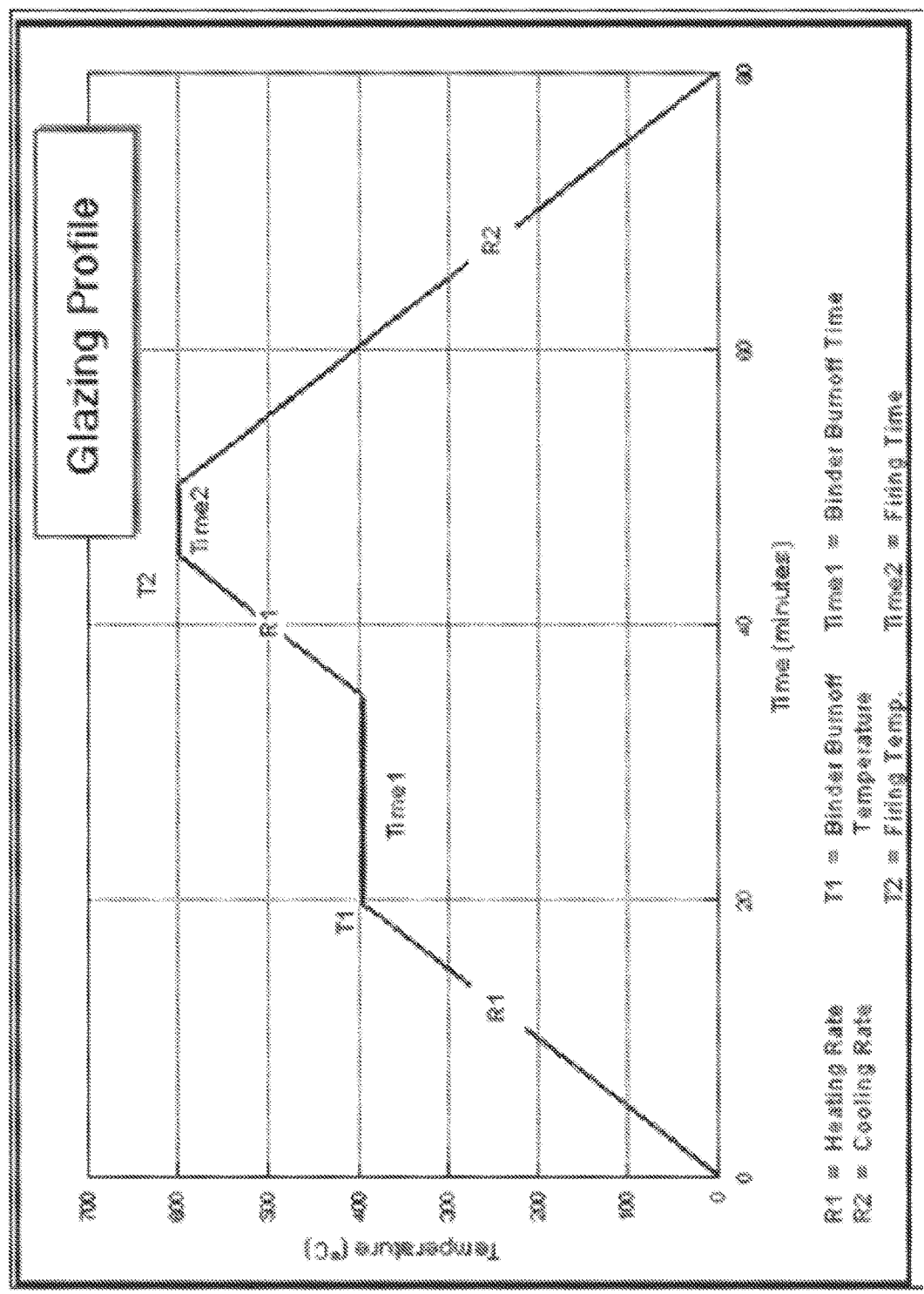
FIG. 1 shows a possible glazing profile for the glass coating in certain embodiments of the invention.

Whilst energised, the leakage currents were measured at the above voltage, using the circuit "C" of FIG. 1 of IEC 60335-1, connected in series between either the active or neutral supply lead and the vessel, the vessel being regarded itself as an accessible earthed metal part.

Figure 4:
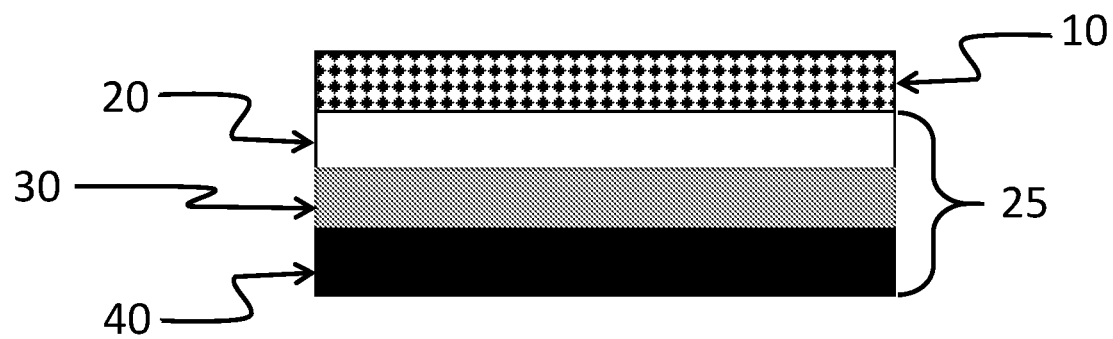
FIG. 4 shows a cross-sectional view of an electrothermic composite material according to one embodiment of the present invention having a glass coating and a multi-layer (3 layer) substrate.

The leakage measuring circuit is described in detail as FIG. 4 of IEC 60990 (see also Annex G of IEC 60990:2016) and is designed to simulate the weighted touch response of a human being. The leakage current (amperes) is taken by these standards to be equal to the peak voltage (volts) measured divided by 500 (ohms). The current sensing part of the circuit "C" is the 500Ω resistor, which acts as a current shunt.

Compliance Requirement:

The maximum permissible leakage current was taken to be 0.35 mA (peak value), as per IEC 60335-2-6, Clause 13.2, last paragraph, when measured in hot condition, at 115% input power. Maximum leakage current measured between active live conductor and vessel: 44.0 $mV_{rms}$/500.6Ω=0.088 $mA_{rms}$, or 0.12 mA peak. Maximum leakage current measured between neutral live conductor and vessel: 18.3 m $V_{rms}$/500.6 Ω=0.037 $mA_{rms}$, or 0.05 mApeak. Accordingly, the glass sample complied with both tests.

Electrical Strength Test (IEC 60335-1 and IEC 60335-2-6, Clauses 13)

Immediately after the leakage current test, as soon as was possible (within approximately 30 s), the mains supply leads were disconnected from the element. The feed points of the element were then shorted together with a link wire and connected to the laboratory earth. A high-voltage lead connected to the high-voltage test supply was connected to the vessel, which remained filled with water. A clamp-type milli-ammeter was placed around the earth return lead, to monitor the current passing between the vessel and earth.

The high-voltage test voltage supplied by a high-voltage transformer with an instantaneous trip setting such that a 100 mA current on the high-voltage side of the transformer would trip the supply. The test transformer has a short-time, short-circuit rated current of at least 200 mA.

Compliance Requirement:

The sample must withstand a 3000 V, 50 Hz test voltage for 60 seconds without tripping a 100 mA-tripping high-voltage supply, as per IEC 60335-2-6, Clause 13.3. Applied Test voltage (range): between 3.2 $kV_{rms}$ and 3.5 $kV_{rms}$. Test voltage duration: 90 seconds. Current measured: 6.1 $mA_{rms}$. Trip: none. Accordingly, the glass sample complied with the electrical strength test.

Resistivity

An effective minimum (hot) resistivity was calculated to be 178 MΩ·cm, or $1.78 \times 10^8$ Ω·cm. This result was derived from the measured values of maximum applied voltage (3.47 $kV_{rms}$, U), the maximum a.c. current measured during the Electric Strength test (6.1 $mA_{rms}$, I), the vessel's effective electrical contact area (156 $cm^2$, A) and the glass thickness (5 mm, d), using the formulas: R=U/I, and rho=R·A/d.

Conversely, the current expected to flow through the glass of the above resistivity can be found using the formula: I=(UA/(rho·d)=6.1 mArms (since U=3.47 $kV_{rms}$, A=156 $cm^2$, rho=178 MΩ·cm, and d=0.5 cm. The above resistivity calculations assume that the circuit is purely resistive. To verify this, the power factor was measured to be 1.000 and the active power was found to be equal to the apparent power, to within 1 watt, 1 VA.

Example 5—BBQ Steel Based Hotplate

A steel BBQ plate had two coats of Ferro CS117 white ground coat applied in the kiln and fired at a temperature of 830° C. The silver electrodes (paste SP37) were then applied to the plate and baked at 750° C. Then using a 32 mesh screen, a paste according to Example 1A was applied and air dried. The dried material was placed into an oven preheated to 160° C. and held for 5 mins and then the kiln was raised to 690° C. and held for 5 mins. The composite was then allowed to cool in the kiln. The resistance at room temperature was recorded at 35Ω.

In another example the above process was followed and then a clear topcoat was applied at a higher temperature of 710° C.

Example 6—Effect of Carbon Component Morphology

In the same paste, three pastes having different morphologies (1=flake like, 2=needle like and 3=ball like) were screened onto Ceran® glass 200 mm×200 mm. Silver electrodes were applied and fired. The three pastes were consequently screened over the top using a 77 mesh and fired at 620° C. The three samples were then removed from the kiln and cooled to room temperature. The three samples were tested for conductivity: one read 66 ohms, the second 68 ohms, and the third 67 ohms. AC voltage was than applied (100 V) and each panel was brought up to 300° C. and held for 10 minutes. Number one consumed 1.5 A at 320° C., number two consumed 1.5 A and reached 305° C., and the third consumed 2.4 A and reached 300° C.

After firing the three different structures produced slightly different amounts of heat consuming less current versus the third consuming more current and reaching only 300° C. The morphology of the structure seems to have an effect the amount watts required to match the heat produced by the element to bring the element to the same temperature, indicating that the flake like and needle like structures are more efficient than the ball like producing heat with less energy.

Example 7—Composite Embodiments

With reference to FIG. 4, in one embodiment, the electrothermic composite material of the invention may comprise a glass coating 10 applied to a substrate 20, where the substrate 20 is itself part of a multi-layer substrate structure 25 comprising layer 20, layer 30 and base layer 40. In one embodiment, substrate layer 20 is a glass layer comprising a glass frit and is devoid of a carbon component. In one embodiment, layer 30 is a glass layer comprising a glass frit and is devoid of a carbon component. In one embodiment, base layer 40 is a metal or metal alloy.

Figure 5:
FIG. 5 shows a cross-sectional view of an electrothermic composite material according to one embodiment of the present invention having a glass coating and a multi-layer (2 layer) substrate.

With reference to FIG. 5, in another embodiment, the electrothermic composite material of the invention may comprise a glass coating 11 applied to a substrate 21, where the substrate 21 is itself part of a dual-layer substrate structure 28 comprising layer 21 and base layer 41. In one embodiment, substrate layer 21 is a glass layer comprising a glass frit and is devoid of a carbon component. In one embodiment, base layer 41 is a metal or metal alloy. In another embodiment, base layer 41 is a glass. In a further embodiment, base layer 41 is a low thermal expansion glass.

Figure 6:
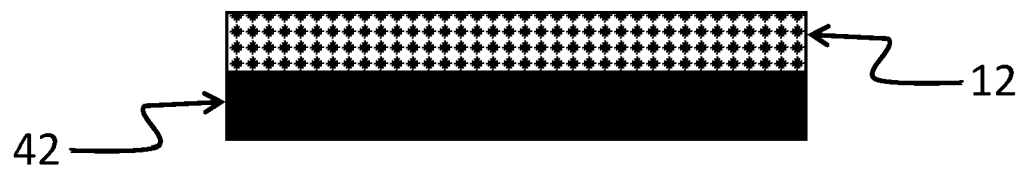
FIG. 6 shows a cross-sectional view of an electrothermic composite material according to one embodiment of the present invention having a glass coating and a single layer substrate.

With reference to FIG. 6, in a further embodiment, the electrothermic composite material of the invention may comprise a glass coating 12 applied to a substrate 42. In one embodiment, substrate 42 is a glass. In another embodiment, substrate 42 is a low thermal expansion glass.

Figure 7:
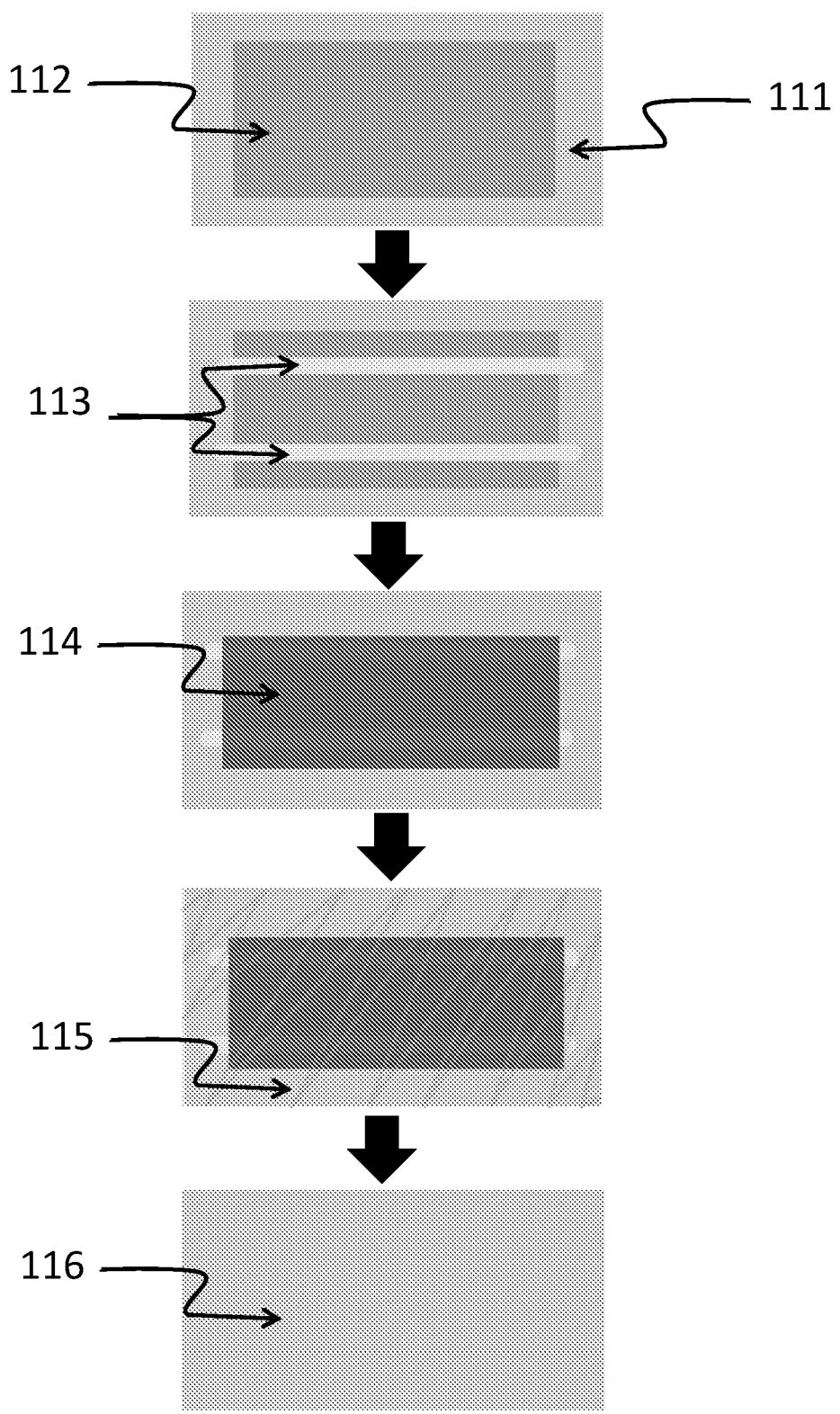
FIG. 7 shows a coating methodology according to one embodiment of the invention for coating a non-conductive glass panel.

With reference to FIG. 7, in one embodiment, a layer of insulating clear glass frit 112 is applied onto a non-electrically conductive plate 111 and fired to produce a clear glass layer. After cooling, a pair of silver electrodes 113 is applied on top of the clear glass layer 112. A layer of a coating according to the invention 114 is then applied over the glass layer and electrodes and fired as described above in Example 2 to produce an electrothermic layer. A non-conductive glass overcoat 115 (is then fired over the electrothermic layer, and a non-electrically conductive clear glass frit 116 is placed on top of the overcoat and enamelled.

Figure 8:
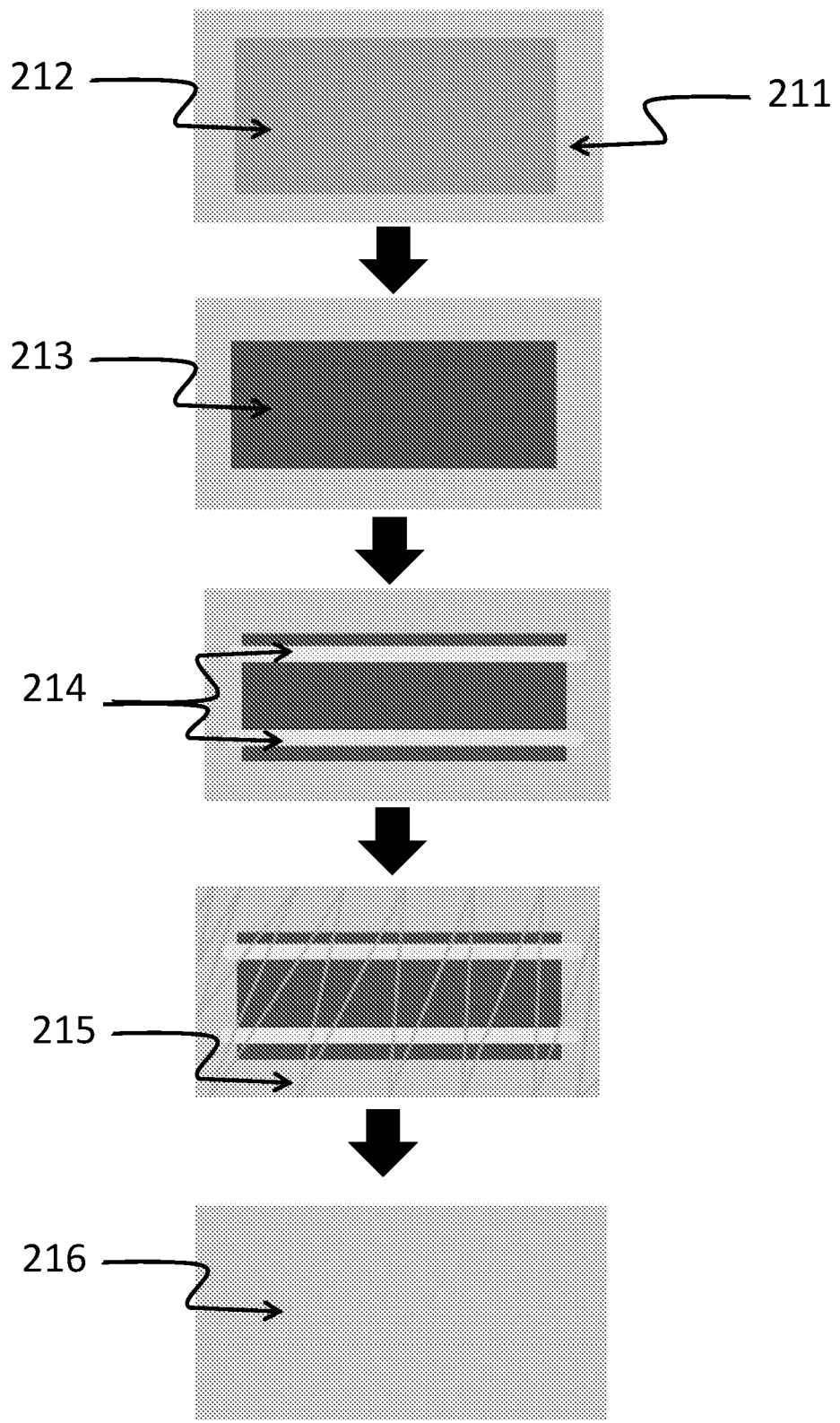
FIG. 8 shows a coating methodology according to another embodiment of the invention for coating a non-conductive glass panel.

With reference to FIG. 8, in another embodiment, a layer of insulating clear glass frit 212 is applied onto a non-electrically conductive plate 211 and fired to produce a clear glass layer. After cooling, a layer of a coating according to the invention 213 is then applied over the glass layer and fired as described above in Example 2 to produce an electrothermic layer. A pair of silver electrodes 214 is applied on top of the electrothermic layer 213. A non-conductive clear glass frit 215 (is then fired over the electrodes and electrothermic layer, and a non-electrically conductive material clear glass plate 216 is placed on top of the overcoat.

Figure 9:
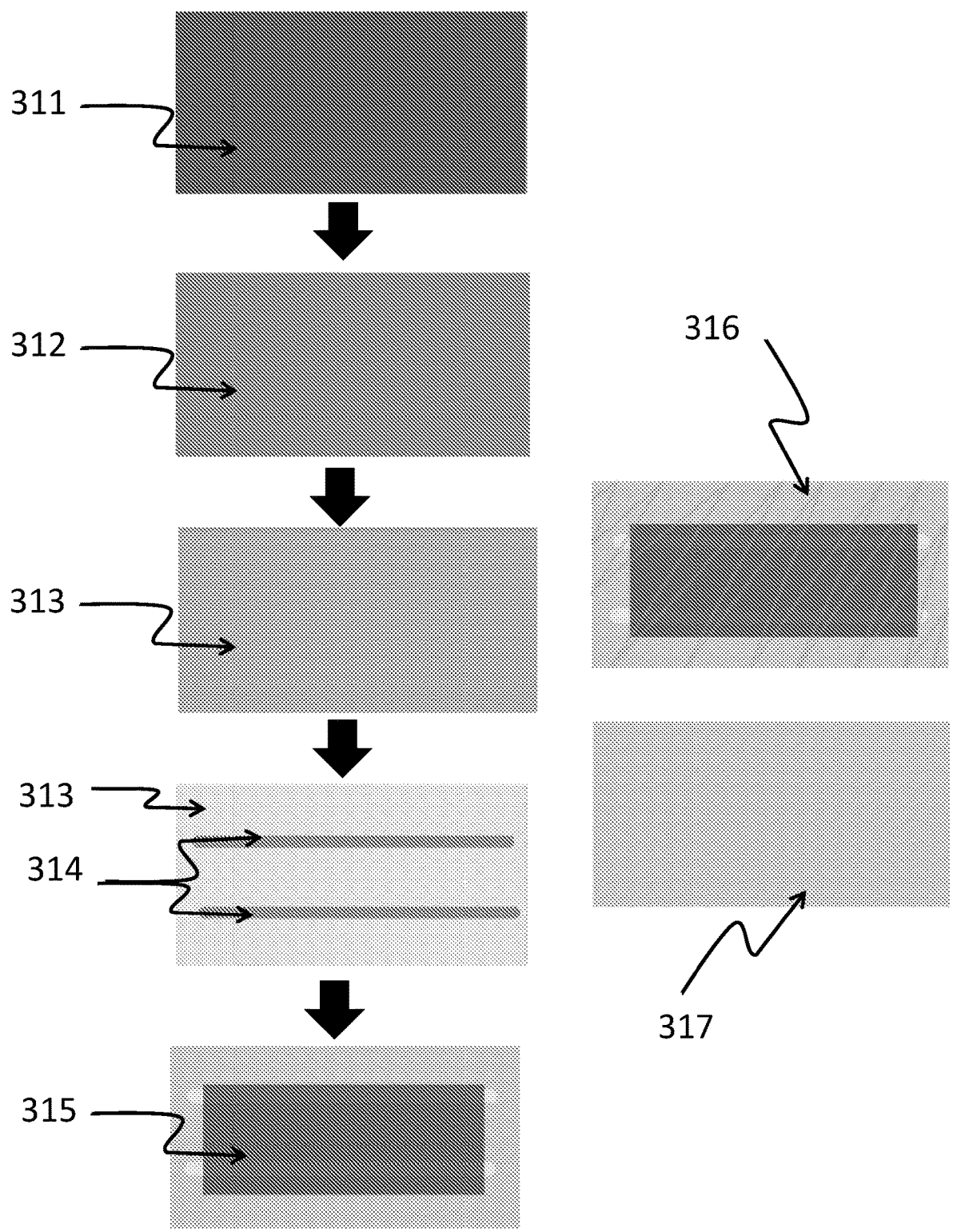
FIG. 9 shows a coating methodology according to another embodiment of the invention for coating a conductive metal panel.

With reference to FIG. 9, in another embodiment, a first coat of insulate 312 (an insulating glass coating) is applied to an electrically conductive (e.g., metal) plate 311 and fired. A second coat of insulate 313 being the same as the first insulating coat is optionally applied and enamelled onto the first coat in the kiln. After cooling, a pair of silver electrodes 314 is applied on top of the insulate layer 313. A layer of a coating according to the invention 315 is then applied over the electrodes and insulate layer(s) and fired as described above in Example 2 to produce an electrothermic layer. A non-conductive clear glass overcoat 316 is then applied over the electrothermic layer, and a non-electrically conductive material plate 317 such as high temperature Ceran® glass is placed on top and mechanically sandwiched.

Example 8—Solid State Devices

The mixture of Examples 1A-1D was made following the steps above. Instead of screen printing the mixtures onto a substrate with conductive paste electrodes as in Example 2, the mixture was poured into a ceramic mould and allowed to dry at in an oven at 80° C. until such time as sufficient rheology modifying oil had evaporated and the mixture had a putty-like texture. The putty-like mixture was then shaped into a desired 3D shape, such as ball, block, plate or coil, and a tungsten metal electrode pierced through the shape such that two ends of the electrode protruded from the shape. The shape was then fired for 3 to 5 mins (1A and 1B) or 20 mins (1C and 1D) at 650° C. (1A and 1B) or 690° C. (1C and 1D) after which time the conductive glass element produced was allowed to cool to room temperature gradually inside the kiln.

A 6 cm×6 cm×2 mm block produced by this method, when plugged into low voltage, heated immediately up to 200° C. and had a resistance of 4.2Ω.

Another example is as follows: 60 g clay, 6 g of surface enhanced graphite (product 5773 sold by Intelliparticle®), 2 g Printex® L6 conductive carbon and 5 g water were placed into a dough mixer and mixed at 200 rpm for 2 to 5 minutes. The high viscosity dough like mixture was then pulled from the cup and rolled. The dough was then placed in the glass tube with two titanium electrodes sticking out of either end and allowed to air cure. The dried dough was then placed into the oven preheated to 150 C and then fired at 690° C. at which time it was pulled from the oven. Argon is then injected into the glass cylinder. Other glazes and glass frits can be used and fired at much higher temperatures. Variations of this method include drying the dough in the shape of a saucepan with metal strips embedded either side, baking at 690° C. then applying direct or alternating current for heating. Any shape can be formed, including cylinders, plates, rods or other irregular/regular shapes.

Example 9—Encapsulation of Carbon/Graphite in Glass 6 g of Printex® L6 conductive carbon black powder having the following properties: average particle size 18 nm, BET (NSA) surface area 270 m$^2$/g, oil absorption 126 ml/100 g (ASTM D2414) was blended into 60 g of clear frit and mixed under dispersion with 8 grams of medium (80-1102ME) and blended until uniform and warm. The mixture was then poured into a ceramic mould and fired in the kiln at 690° C. The mould was then pulled from the kiln and the glass block ground down to 14 μm. The ground powder blend ("carbon ground glass") was then added 50/50 in the same process above [i.e., 30 g frit, 15 g carbon ground glass, and 15 g of graphite sold as product 5773 by Intelliparticle®) were combined as per Example 1C] and refired at 690° C. as described in Example 2. The resulting ohms recorded from this sample was 37Ω.

6 g of surface enhanced flake graphite (sold as product 5773 by Intelliparticle®) was blended into 60 g of clear frit and mixed under dispersion with 8 grams of medium (80-1102ME) and blended until uniform and warm. The mixture was then poured into a ceramic mould and fired in the kiln at 690° C. The mould was then pulled from the kiln and the glass block ground down to 14 μm. The ground powder blend ("graphite ground glass") was then added 50/50 in the same process above [i.e., 30 g frit, 15 g graphite ground glass, and 15 g of graphite sold as product 5773 by Intelliparticle® were combined as per Example 1A] and refired at 690° C. as described in Example 2. The resulting ohms recorded from this sample was 37Ω.

Example 10—Delamination Testing

A composition made as described below: 40 g of glass frit (zinc oxide borosilicate glass powder, GSGF white INT 19 4011 AL-6476, manufactured by Ferro) was added to a stainless steel beaker, to which was added 6 g of surface enhanced flake graphite (sold as product 5773 by Intelliparticle®). 24 g of a rheology modifying oil, such as pine oil (or the product sold as Ferro liquid medium 822) was then added to the resultant mixture and stirred at 400 rpm for 1 min to mix the graphite through. The mixing speed was then increased to 1500-1800 rpm and held for 5 min, then subsequently allowed to cool. After 3 hrs, the settled mixture was again stirred for 5 min at 1800 rpm or until the mixture had warmed to 50° C.

This mixture was then screen printed (77 mesh) onto a variety of 110 mm by 110 mm substrates in a 50 mm by 110 mm strip down the centre of the substrates and the samples air dried, pre-baked at 150° C. for 30 minutes and fired at 650° C. The samples were then cooled to room temperature and inspected for signs of delamination and cracking.

A comparative composition identical to this (with either 40 g of glass frit or 50 g of glass frit) but without any carbon components was also made and screen printed onto the same variety of substrates. The substrates were then fired and cooled as above.

The results of the delamination testing are given in Table 19.

TABLE 19

Delamination testing results

| Sample | Substrate | Delamination? |
|---|---|---|
| Glass coating of the invention | Bronze | No |
|  | Ceran ® | No |
|  | Copper | No |
|  | Stainless steel | No |
|  | Steel | No |
| Comparative example (frit only) | Bronze | Yes |
|  | Ceran ® | No |
|  | Copper | No |
|  | Stainless steel | Yes |
|  | Steel | No |

The results of Table 19 demonstrate that the glass frit alone was only able to bond to the substrate for which it was sold (stainless steel) and bronze, but that the same glass frit with graphite was able to bond to all substrates tested without signs of delamination or cracking once the samples cooled. It is thus surmised that the graphite modifies the chemical and/or physical properties of the frit such that it is able to bond to a wide range of substrates without delaminating on cooling after firing.

Example 11—High Temperature Sample

Conductive silver paste (CN37-801 or CN37-802 AgPdPt conductor paste, manufactured by Ferro) was applied to the left and right sides of a glass sheet (e.g., Ceran® or Extrema® glass, manufactured by Schott) to act as electrodes. The resultant sheet was fired at 600-800° C., subsequently allowed to cool, then removed from the oven. A T 43 mesh screen was then used to screen print the conductive graphite paste from Example 1A onto the glass and both electrodes, after which time the coated glass was placed into a preheated 150° C. oven for half an hour to drive off the rheology modifying oil. The temperature was then ramped up to 840-950° C. over a period of approximately 45 mins, with introduction of argon into the oven at 730° C. and the glass fired for 3 to 5 mins, after which time the conductive glass element produced was allowed to cool in the kiln.

This resulted in a sample with excellent adhesion to the glass substrate over two cycles and excellent conductivity (resistance 1.9Ω).

Example 12—Mixed Frit Sample

A frit with a firing temperature of 650° C. (30 g) was mixed with a 850° C. firing temperature glass frit (30 g), 10 g of medium 801022ME, 6 g of graphite (sold as product 5773 by Intelliparticle®) and 2.5 g of Printex® L6 carbon black.

The paste was baked onto a low thermal expansion glass substrate with silver electrodes left & right. The composite was then fired at 690° C. in oven, no hold. The result was a coating that did not delaminate from the glass on cooling and had a room temperature resistance of 9Ω between electrodes.

Example 13

Additional testing has revealed the following data.

| cg % | 6 | 6.67 | 7 | 7.5 | 8 | 8.5 | 9 | 9.5 | 10 | 10.50 | 11 | 11.5 | 12 | 13 | 14 |
|---|---|---|---|---|---|---|---|---|---|---|---|---|---|---|---|
| 0.5 |  |  |  |  |  |  |  |  |  |  |  |  |  |  |  |
| 1 |  |  |  |  |  |  |  |  |  | 9 |  |  |  |  |  |
| 1.33 |  |  |  |  | 30 |  |  |  |  |  |  |  |  |  |  |
| 1.5 |  |  |  |  | X |  |  |  |  |  | 12 | 13 |  |  |  |
| 2 |  |  |  | X | Y |  | X |  |  |  |  |  |  |  |  |
| 2.5 |  | 20 |  |  | X |  |  |  |  |  |  |  |  |  |  |
| 3 |  |  |  |  |  |  |  | Y |  |  |  |  |  |  |  |
| 3.5 |  |  |  |  |  |  |  |  |  |  |  |  |  |  |  |
| 4 |  |  |  |  | X |  |  | X |  |  |  |  | X |  |  |
| 4.5 |  |  |  |  |  |  |  |  |  |  |  |  |  |  |  |
| 5 |  |  |  |  |  |  |  |  |  |  |  |  |  |  |  |

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Also, all citations referred herein are expressly incorporated herein by reference. The foregoing examples show how the present invention can be practiced. They should be construed as illustrative of the invention and not a limitation of it.

The invention claimed is:

1. An electrothermic composite material comprising an electrothermic layer on a substrate,
   wherein the electrothermic layer comprises a glass coating having a carbon component dispersed throughout,
   wherein the carbon component comprises a graphite having a crystallinity of at least 99% and wherein the graphite has been heat treated to a temperature of at least 1200° C.;
   wherein the glass coating is formed by firing a mixture of 1-65 wt % carbon component on a solids basis in a glass frit on a solids basis;

wherein the glass frit is selected from the group consisting of silicate, borosilicate, non-alkaline earth borosilicate, alkaline earth-containing borosilicate, transition metal borosilicate, alkaline earth aluminosilicate, alkali aluminosilicate, alkaline-free aluminoborosilicate, alkali-lead silicate, soda lime glass, lithium-aluminium-silicate glass ceramic, and combinations thereof;

wherein the substrate is a glass or glass ceramic having a coefficient of thermal expansion (CTE) between 0 and 20 ppm/K between 25 and 300° C.; and wherein the electrothermic layer resists delamination from the substrate over at least 5 electrical heating and cooling cycles heating from 25 to 250° C.

wherein the CTE of the glass frit is different from the CTE of the substrate.

2. The composite material according to claim 1, wherein the substrate is a glass or glass ceramic having a coefficient of thermal expansion (CTE) within 0 to 10 ppm/K between 25 and 300° C.

3. The composite material according to claim 1, wherein the substrate is a glass or glass ceramic having a coefficient of thermal expansion (CTE) within 0 to 5 ppm/K between 0 and 650° C.

4. The composite material according to claim 1, wherein the substrate is a glass or glass ceramic having a coefficient of thermal expansion (CTE) within 0 to 2 ppm/K between 0 and 800° C.

5. The composite material according to claim 1, wherein the glass frit is selected from a silicate, borosilicate, zinc borosilicate, and combinations thereof.

6. The composite material according to claim 5, wherein the glass frit comprises one or more oxides selected from the group consisting of $P_2O_5$, $Al_2O_3$, $ZrO_2$, $SiO_2$, $Na_2O$, $K_2O$, $BaO$, $TiO_2$, $ZnO$, $Co_2O_3$, $NiO$, $Cr_2O_3$, $MnO_2$, $CuO$, and combinations thereof.

7. The composite material according to claim 6, wherein the glass coating has a CTE of within 1 to 20 ppm/K different from the CTE of the substrate between 25 and 300° C.

8. The composite material according to claim 1, wherein the glass coating comprises, on a solids basis, 5-30 wt % of a carbon component in a glass frit.

9. The composite material according to claim 1, wherein the carbon component is a mixture of a graphite and a carbon black in a relative proportion of graphite:carbon black of between 7:1 and 5:1.

10. The composite material according to claim 1, wherein the graphite has a nitrogen surface area (NSA) of between 5 and 50 $m^2$/g and/or a particle size of between 1 and 20 μm.

11. The composite material according to claim 1, wherein the graphite is selected from the group consisting of: natural graphite, synthetic graphite, amorphous graphite, calcined petroleum coke, crystalline flake graphite, natural flake graphite, surface enhanced flake graphite, expandable graphite, purified flake graphite, purified crystalline flake graphite, purified petroleum coke, purified synthetic graphite, purified-vein graphite, synthetic graphite, primary artificial graphite, secondary artificial graphite, spherical natural graphite, and vein graphite.

12. The composite material according to claim 1, wherein the carbon component comprises one or more carbon blacks, and at least one of the carbon blacks has a nitrogen surface area (NSA) of between 5 and 300 $m^2$/g and/or a particle size of between 1 and 100 nm.

13. The composite material according to claim 12, wherein the carbon black is selected from the group consisting of: conventional thermal blacks, furnace blacks, lamp blacks, channel blacks, surface-modified carbon blacks, surface functionalised carbon blacks, heat-treated carbons, and nano carbons.

14. The composite material according to claim 1, wherein the glass frit has a firing temperature in air of between 600 and 750° C. and/or an annealing point of between 300 and 1150° C.

15. The composite material according to claim 1, wherein the glass frit has a CTE of between 7 and 12 ppm/K at 25° C.

16. The composite material according to claim 1, wherein the glass frit is a mixture of two or more glass frits having different firing temperatures.

17. The composite material according to claim 1, wherein the glass coating does not contain any metal oxide pigment particles or any elemental metal particles.

18. The composite material according to claim 1, wherein the glass coating has a thermal coefficient of resistance (TCR) of 0±0.001 per ° C. between 100 and 300° C.

19. The composite material according to claim 1, wherein the electrothermic layer resists delamination from the substrate over at least 10 cycles heating from 25 to 350° C.

20. A method for generating heat, the method comprising the steps of:
(a) providing a composite material according to claim 1;
(b) placing electrodes in electrical communication with the glass coating;
(c) connecting the electrodes to a source of electricity; and
(d) energising the source of electricity,
thereby generating heat from the glass coating.

* * * * *